(12) United States Patent  (10) Patent No.: US 9,396,103 B2
Sinclair et al.  (45) Date of Patent: Jul. 19, 2016

(54) METHOD AND SYSTEM FOR STORAGE ADDRESS RE-MAPPING FOR A MEMORY DEVICE

(75) Inventors: Alan W. Sinclair, Falkirk (GB); Barry Wright, Edinburgh (GB)

(73) Assignee: SanDisk Technologies LLC, Plano, TX (US)

( * ) Notice: Subject to any disclaimer, the term of this patent is extended or adjusted under 35 U.S.C. 154(b) by 2288 days.

(21) Appl. No.: 12/036,014

(22) Filed: Feb. 22, 2008

(65) Prior Publication Data

US 2008/0307192 A1   Dec. 11, 2008

Related U.S. Application Data

(60) Provisional application No. 60/942,900, filed on Jun. 8, 2007.

(51) Int. Cl.
*G06F 12/02*   (2006.01)

(52) U.S. Cl.
CPC .... *G06F 12/0246* (2013.01); *G06F 2212/1016* (2013.01); *G06F 2212/7202* (2013.01); *G06F 2212/7205* (2013.01)

(58) Field of Classification Search
None
See application file for complete search history.

(56) References Cited

U.S. PATENT DOCUMENTS

| 5,535,369 A | 7/1996 | Wells et al. |
| 5,570,315 A | 10/1996 | Tanaka et al. |
| 5,630,093 A | 5/1997 | Holzhammer et al. |
| 5,774,397 A | 6/1998 | Endoh et al. |
| 5,860,124 A | 1/1999 | Matthews et al. |
| 5,960,169 A | 9/1999 | Styczinski |
| 6,046,935 A | 4/2000 | Takeuchi et al. |
| 6,069,827 A | 5/2000 | Sinclair |
| 6,098,190 A * | 8/2000 | Rust et al. ............... 714/763 |

(Continued)

FOREIGN PATENT DOCUMENTS

| CN | 1701308 A | 11/2005 |
| EP | 1 143 455 A2 | 10/2001 |

(Continued)

OTHER PUBLICATIONS

Co-Pending U.S. Appl. No. 12/110,050, filed Apr. 25, 2008 for "Method and System for Storage Access Re-Mapping for a Multi-Bank Memory Device", 81 pages.

(Continued)

*Primary Examiner* — Charles Rones
*Assistant Examiner* — Ryan Dare
(74) *Attorney, Agent, or Firm* — Brinks Gilson & Lione

(57) ABSTRACT

A method and system for storage address re-mapping is disclosed. The method includes allocating logical addresses in blocks of clusters and re-mapping logical addresses into storage address space, where short runs of data dispersed in logical address space are mapped in a contiguous manner into blocks in storage address space. Valid data is flushed from blocks having both valid and obsolete data to make new blocks available for receiving data when an available number of new blocks falls below a desired threshold. The system includes a host file system, processor executable instructions residing on a host separately from the host file system or residing on a flash memory device such as an embedded solid state disk, or a backend memory manager of the flash memory device that is configured to map data from a logical address space to complete blocks in storage address space in a contiguous manner.

33 Claims, 26 Drawing Sheets

(56) References Cited

U.S. PATENT DOCUMENTS

| | | | |
|---|---|---|---|
| 6,373,746 | B1 | 4/2002 | Takeuchi et al. |
| 6,456,528 | B1 | 9/2002 | Chen |
| 6,522,580 | B2 | 2/2003 | Chen et al. |
| 6,622,199 | B1 | 9/2003 | Spall et al. |
| 6,715,027 | B2 | 3/2004 | Kim et al. |
| 6,725,321 | B1 | 4/2004 | Sinclair et al. |
| 6,771,536 | B2 | 8/2004 | Li et al. |
| 6,781,877 | B2 | 8/2004 | Cernea et al. |
| 6,831,865 | B2 | 12/2004 | Chang et al. |
| 7,154,781 | B2 | 12/2006 | Lakhani et al. |
| 7,333,387 | B2 | 2/2008 | Hwang |
| 7,420,867 | B2 | 9/2008 | Brox |
| 7,433,993 | B2 | 10/2008 | Sinclair |
| 7,552,280 | B1 | 6/2009 | Naamad et al. |
| 7,930,468 | B2 | 4/2011 | Caulkins |
| 8,095,735 | B2 | 1/2012 | Brewer et al. |
| 2003/0109093 | A1 | 6/2003 | Harari et al. |
| 2003/0147278 | A1 | 8/2003 | Tanaka et al. |
| 2003/0229753 | A1 | 12/2003 | Hwang et al. |
| 2004/0030847 | A1 | 2/2004 | Tremaine |
| 2004/0260957 | A1 | 12/2004 | Jeddeloh et al. |
| 2005/0144361 | A1* | 6/2005 | Gonzalez et al. ............. 711/103 |
| 2005/0144363 | A1 | 6/2005 | Sinclair |
| 2005/0193161 | A1 | 9/2005 | Lee et al. |
| 2005/0195635 | A1 | 9/2005 | Conley et al. |
| 2005/0204187 | A1 | 9/2005 | Lee et al. |
| 2005/0278479 | A1 | 12/2005 | Wu et al. |
| 2006/0020744 | A1 | 1/2006 | Sinclair et al. |
| 2006/0031593 | A1 | 2/2006 | Sinclair |
| 2006/0047800 | A1 | 3/2006 | Caveney et al. |
| 2006/0161724 | A1 | 7/2006 | Bennett et al. |
| 2006/0161728 | A1 | 7/2006 | Bennett et al. |
| 2006/0285397 | A1 | 12/2006 | Nishihara et al. |
| 2007/0016756 | A1 | 1/2007 | Hsieh et al. |
| 2007/0030734 | A1 | 2/2007 | Sinclair et al. |
| 2007/0033323 | A1 | 2/2007 | Gorobets |
| 2007/0033330 | A1 | 2/2007 | Sinclair et al. |
| 2007/0033378 | A1 | 2/2007 | Sinclair et al. |
| 2007/0136555 | A1 | 6/2007 | Sinclair |
| 2007/0239928 | A1 | 10/2007 | Gera et al. |
| 2007/0276988 | A1 | 11/2007 | Luo et al. |
| 2008/0034154 | A1 | 2/2008 | Lee et al. |
| 2008/0094952 | A1 | 4/2008 | Brondijk et al. |
| 2008/0148004 | A1* | 6/2008 | Iren et al. ...................... 711/170 |
| 2008/0307192 | A1* | 12/2008 | Sinclair et al. ................ 711/218 |
| 2008/0320209 | A1 | 12/2008 | Lee et al. |
| 2009/0157994 | A1 | 6/2009 | Hampel et al. |
| 2009/0172258 | A1 | 7/2009 | Olbrich et al. |
| 2009/0172263 | A1 | 7/2009 | Olbrich et al. |
| 2009/0196102 | A1 | 8/2009 | Kim |
| 2009/0271562 | A1 | 10/2009 | Sinclair |

FOREIGN PATENT DOCUMENTS

| | | |
|---|---|---|
| EP | 1 389 755 A2 | 2/2004 |
| EP | 1 693 759 A2 | 8/2006 |
| TW | 200712878 A | 4/2007 |
| TW | 200728977 A | 8/2007 |
| TW | I288328 | 10/2007 |
| WO | 2005/066793 A2 | 7/2005 |
| WO | 2007/002866 A2 | 1/2007 |

OTHER PUBLICATIONS

International Search Report and Written Opinion for PCT/US2008/065631 dated Oct. 30, 2008, 9 pages.

Co-Pending U.S. Appl. No. 12/036,023, filed Feb. 22, 2008 for "Method and System for Memory Block Flushing".

F. Shu, "Solid State Drive Identify Proposal for ATA8-ACS", Microsoft Corporation, dated Apr. 21, 2007, printed from the Internet at http://www.t13.org/documents/UploadedDocuments//docs2007/e07153r0-Solid_State_Drive_Identify_Proposal.doc on Feb. 22, 2008, 4 pages.

F. Shu, "Notification of Deleted Data Proposal for ATA8-ACS2", Microsoft Corporation, dated Apr. 21, 2007, printed from the Internet at http://www.t13.org/documents/UploadedDocuments//docs2007/e07154r0-Notification_for_Deleted_Data_Proposal_for_ATA-ACS2.doc on Feb. 22, 2008, 4 pages.

PCT Preliminary Report on Patentability and Written Opinion of International Searching Authority for related application PCT/US2008/065631 mailed Dec. 23, 2009 (5 pages).

Office Action issued in Chinese application No. 201210274159.3, dated Aug. 5, 2014 (including English translation) (13 pages).

Office Action issued in Chinese application No. 201210274564.5, dated Aug. 5, 2014 (including English translation) (20 pages).

Supplementary European Search Report issued in European patent application No. 08756648.5, dated Jun. 6, 2012 (7 pages).

Taiwanese Search Report issued in corresponding Taiwanese application No. 097121253, dated Apr. 18, 2012 (1 page).

International Search Report for international application No. PCT/US2009/040153 mailed on Jul. 10, 2009 (6 pages).

Office Action issued in U.S. Appl. No. 12/036,023, dated Apr. 12, 2011 (16 pages).

Office Action issued in U.S. Appl. No. 12/036,023, dated Nov. 8, 2011 (17 pages).

Office Action issued in U.S. Appl. No. 12/110,050, dated Jul. 7, 2011 (18 pages).

Written Opinion for international application No. PCT/US2009/040153 mailed on Jul. 10, 2009 (6 pages).

Notice of Allowance issued in U.S. Appl. No. 12/036,023, dated Sep. 28, 2012 (7 pages).

Notice of Allowance issued in U.S. Appl. No. 12/632,549, dated Feb. 28, 2013 (10 pages).

Office Action issued in European application No. 09733928.7, dated Aug. 22, 2012 (6 pages).

Office Action issued in U.S. Appl. No. 12/036,023, dated Jun. 21, 2012 (17 pages).

Office Action issued in U.S. Appl. No. 12/110,050, dated Mar. 14, 2012 (21 pages).

Office Action issued in U.S. Appl. No. 12/110,050, dated Nov. 19, 2012 (25 pages).

Search Report issued in Taiwanese application No. 098113544, dated Mar. 4, 2014 (2 pages).

Chang, et al., "An Efficient Management Scheme for Large-Scale Flash Memory Storage Systems", dated Mar. 14-17, 2004 (7 pages).

International Preliminary Report on Patentability for international application No. PCT/US2010/056122, mailed Jun. 12, 2012 (6 pages).

International Search Report issued in international application No. PCT/US2010/056122, mailed May 20, 2011 (5 pages).

Office Action issued in U.S. Appl. No. 12/632,549, dated Feb. 7, 2012 (13 pages).

Office Action issued in U.S. Appl. No. 12/632,549, dated Aug. 20, 2012 (15 pages).

Written Opinion issued in international application No. PCT/US2010/056122, mailed May 20, 2011 (6 pages).

Notice of Allowance issued in U.S. Appl. No. 12/036,023, dated Jan. 10, 2013 (8 pages).

* cited by examiner

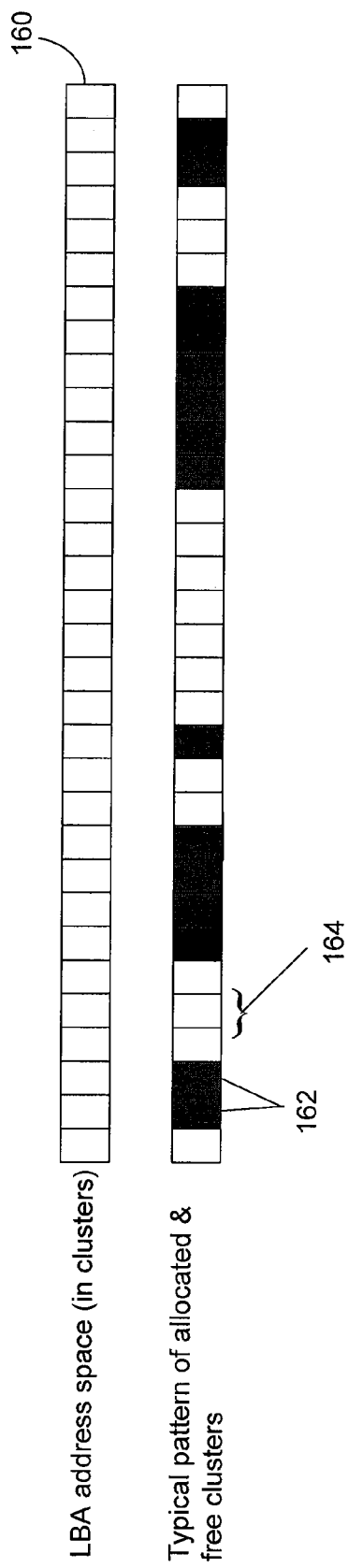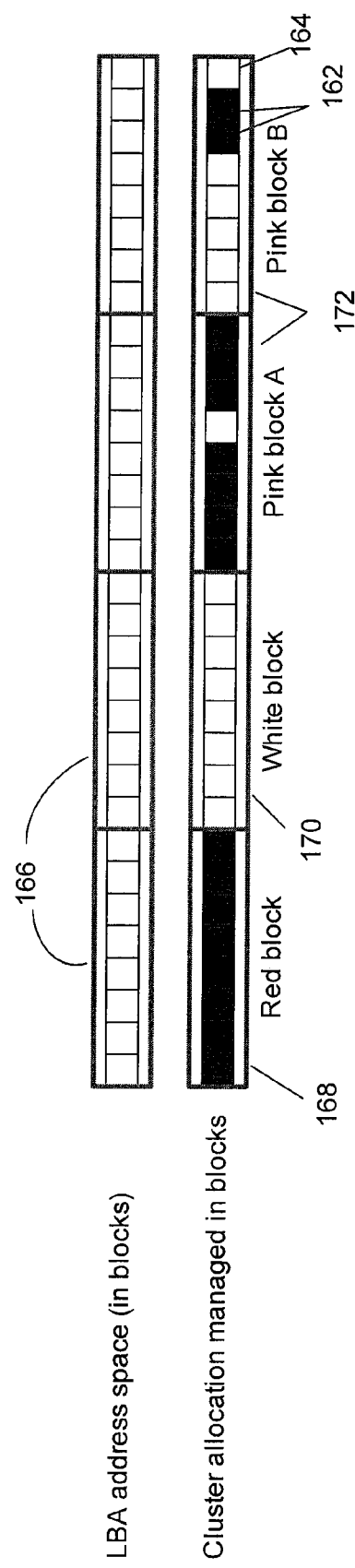
Fig. 6
Fig. 7

METHOD AND SYSTEM FOR STORAGE ADDRESS RE-MAPPING FOR A MEMORY DEVICE

CROSS-REFERENCE TO RELATED APPLICATIONS

This application claims the benefit of U.S. provisional application Ser. No. 60/942,900 filed Jun. 8, 2007, the entirety of which is hereby incorporated by reference herein.

TECHNICAL FIELD

This application relates generally to data communication between operating systems and memory devices. More specifically, this application relates to the operation of memory systems, such as re-programmable non-volatile semiconductor flash memory, and a host device to which the memory is connected or connectable.

BACKGROUND

When writing data to a conventional flash data memory system, a host typically assigns unique logical addresses to sectors, clusters or other units of data within a continuous virtual address space of the memory system. The host writes data to, and reads data from, addresses within the logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system operates without knowledge of this mapping.

A drawback of memory systems that operate in this manner is fragmentation. For example, data written to a solid state disk (SSD) drive in a personal computer (PC) operating according to the NTFS file system is often characterized by a pattern of short runs of contiguous addresses at widely distributed locations within the logical address space of the drive. Even if the file system used by a host allocates sequential addresses for new data for successive files, the arbitrary pattern of deleted files causes fragmentation of the available free memory space such that it cannot be allocated for new file data in blocked units.

Flash memory management systems tend to operate by mapping a block of contiguous logical addresses to a metablock of physical addresses. When a short run of addresses from the host is updated in isolation, the full logical block of addresses containing the run must retain its long-term mapping to a single metablock. This necessitates a garbage collection operation within the logical-to-physical memory management system, in which all data not updated by the host within the logical block is relocated to consolidate it with the updated data. This is a significant overhead, which may severely restrict write speed and memory life.

BRIEF SUMMARY

Given the limited number of write cycles that flash memory currently has in comparison with magnetic memory used in known disk drives, it is desirable to improve the performance of systems utilizing flash memory to compensate for the problem of short logical address runs and fragmentation. In order to address this, a method and system for storage address re-mapping in a memory device is set forth.

According to a first aspect, a method of transferring data between a host system and a re-programmable non-volatile mass storage system is described. The method includes receiving data associated with host logical block address (LBA) addresses at the mass storage system from the host system. A block of contiguous storage LBA addresses is allocated for receiving the host LBA addresses, where the block of contiguous storage LBA addresses contains only obsolete data. The method also includes re-mapping each of the host LBA addresses for the received data to the block of contiguous storage LBA addresses, where each storage LBA address is sequentially assigned in a contiguous manner to the received data in an order the received data is received regardless of the host LBA address.

According to a second aspect, a method of transferring data between a host system and a re-programmable non-volatile mass storage system is described. The method includes receiving data associated with host logical block address (LBA) addresses from a file system on the host system. The received host LBA addresses are re-mapped in an order received to a block of contiguous storage LBA addresses and an additional block of contiguous storage LBA addresses addressing only unwritten capacity upon allocation is allocated, and remaining received host LBA addresses contiguously re-mapped to the additional block, only after the block of contiguous storage LBA addresses is fully programmed. New blocks of contiguous storage LBA addresses addressing only unwritten capacity are also created.

In another aspect of the invention, a method of transferring data between a host system and a re-programmable non-volatile mass storage system is disclosed that includes receiving data associated with host logical block address (LBA) addresses at the mass storage system from the host system and contiguously re-mapping the received host LBA addresses in an order received to a block of contiguous storage LBA addresses. The method also includes allocating an additional block of contiguous storage LBA addresses, the additional block addressing only unwritten capacity upon allocation, and contiguously re-mapping remaining received host LBA addresses to the additional block only when the block of contiguous storage LBA addresses is fully programmed. Furthermore, the method includes generating a storage address table mapping host LBA addresses to storage LBA addresses as the data associated with the host LBA addresses is re-mapped to contiguous storage LBA addresses.

According to another aspect, a method of transferring data between a host system and a re-programmable non-volatile mass storage system is disclosed including the steps of receiving data associated with host logical block address (LBA) addresses from the host system at an application on the mass storage system and contiguously re-mapping the received host LBA addresses in an order received to a block of contiguous storage LBA addresses. The method further includes allocating an additional block of contiguous storage LBA addresses, the additional block addressing only unwritten capacity upon allocation, and contiguously re-mapping additional received host LBA addresses to the additional block only when the block of contiguous storage LBA addresses is fully programmed. Steps of identifying previously fully programmed blocks of contiguous storage LBA addresses presently addressing valid and obsolete data, prior to receiving new data associated with previously received host LBA addresses, and creating new blocks of contiguous storage LBA addresses addressing only unwritten capacity from the identified previously fully programmed blocks of contiguous storage LBA addresses are also included.

In one aspect of the invention, a mass storage memory system is disclosed that comprises re-programmable non-volatile memory cells arranged in a plurality of blocks of memory cells that are erasable together, an interface adapted to receive data from a host system addressed with host logical block address (LBA) addresses and a controller in communication with the interface. The controller is configured to allocate a block of contiguous storage LBA addresses for receiving the data from the host system, and configured to re-map each of the host LBA addresses for the received data to the block of contiguous storage LBA addresses, where the controller is arranged to sequentially assign each contiguous storage LBA address to the received data in an order the received data is received regardless of a host LBA address associated with the received data.

According to another aspect of the invention, a mass storage memory system includes re-programmable non-volatile memory cells arranged in a plurality of blocks of memory cells that are erasable together, an interface adapted to receive data addressed in a host logical block address (LBA) format from a host system, and a controller in communication with the interface. The controller includes processor executable instructions for executing the steps of receiving data associated with host LBA addresses at the mass storage system from the host system, contiguously re-mapping the received host LBA addresses in an order received to a block of contiguous storage LBA addresses, allocating an additional block of contiguous storage LBA addresses, where the additional block contains only unwritten capacity upon allocation, and contiguously re-mapping remaining received host LBA addresses to the additional block only if the block of contiguous storage LBA addresses is fully programmed. The processor executable instructions also include instructions for creating new blocks of contiguous storage LBA addresses containing no valid data.

As disclosed in another aspect of the invention, a non-volatile mass storage system for re-mapping data associated with host LBA addresses to storage LBA addresses includes re-programmable non-volatile memory cells, where the memory cells are arranged in a plurality of blocks of memory cells that are erasable together, an interface adapted to receive data addressed in a host LBA format from a host system, and a controller in communication with the interface. The controller is configured to contiguously re-map the received host LBA addresses in an order received to a block of contiguous storage LBA addresses, allocate an additional block of contiguous storage LBA addresses where the additional block addresses only unwritten capacity upon allocation, and contiguously re-map additional received host LBA addresses to the additional block only when the block of contiguous storage LBA addresses is fully programmed. The controller is further configured to generate a storage address table mapping host LBA addresses to storage LBA addresses as the data associated with the host LBA addresses is re-mapped to contiguous storage LBA addresses and to generate a block information table identifying a status of each of a plurality of blocks of storage LBA addresses.

In another aspect, a non-volatile mass storage system includes means for receiving data associated with host LBA addresses at the mass storage system from a host system, means for allocating a block of contiguous storage LBA addresses for receiving the host LBA addresses, where the block of contiguous storage LBA addresses is associated with only unwritten capacity upon allocation, and means for re-mapping each of the host LBA addresses for the received data to the block of contiguous storage LBA addresses, wherein each storage LBA address is sequentially assigned in a contiguous manner to the received data in an order the received data is received regardless of the host LBA address.

In yet another aspect of the invention a method of transferring data between a host system and a re-programmable non-volatile mass storage system comprises receiving data associated with host LBA addresses at a host re-mapping module on the host system. The host re-mapping module allocates a block of contiguous storage LBA addresses for receiving the host LBA addresses where the block of contiguous storage LBA addresses is associated with only unwritten capacity upon allocation, and re-maps each of the host LBA addresses for the received data to the block of contiguous storage LBA addresses such that each storage LBA address is sequentially assigned in a contiguous manner to the received data in an order the received data is received regardless of host LBA address. The received data re-mapped to the block of contiguous storage LBA addresses and the assigned storage LBA addresses are transmitted from the host system to the mass storage system.

In another aspect, a method of transferring data between a host system and a re-programmable non-volatile mass storage system comprises receiving data associated with host logical block address (LBA) addresses at a host re-mapping module residing on the host system and contiguously re-mapping the received host LBA addresses in an order received to a block of contiguous storage LBA addresses. An additional block of contiguous storage LBA addresses addressing only unwritten capacity upon allocation is allocated. Remaining received host LBA addresses are contiguously re-mapped to the additional block only if the block of contiguous storage LBA addresses is fully programmed. The method further includes creating new blocks of contiguous storage LBA addresses addressing only obsolete data and transmitting the received data re-mapped to the block of contiguous storage LBA addresses, and the assigned storage LBA addresses, from the host system to the mass storage system.

According to one aspect of the invention, a method of transferring data between a host system and a re-programmable non-volatile mass storage system includes receiving data associated with host LBA addresses at a host re-mapping module on the host system, contiguously re-mapping the received host LBA addresses in an order received to a block of contiguous storage LBA addresses at the host system, allocating an additional block of contiguous storage LBA addresses that addresses only unwritten capacity upon allocation, and contiguously re-mapping additional received host LBA addresses to the additional block only when the block of contiguous storage LBA addresses is fully programmed. The method further includes generating a storage address table at the host system which maps host LBA addresses to storage LBA addresses as the data associated with the host LBA addresses is re-mapped to contiguous storage LBA addresses.

In another aspect of the invention a host system for transferring data to a re-programmable non-volatile mass storage system is disclosed. The host system includes an interface configured to permit communication with the mass storage device and a host processor configured to store data on the mass storage system via the interface in accordance with instructions from a host re-mapping module. The host re-mapping module includes processor executable instructions for causing the host processor to receive data associated with host logical block address (LBA) addresses at the host re-mapping module on the host system, allocate a block of contiguous storage LBA addresses for receiving the host LBA addresses, the block of contiguous storage LBA addresses addressing only unwritten capacity upon allocation, re-map each of the host LBA addresses for the received data to the block of contiguous storage LBA addresses, where each storage LBA address is sequentially assigned in a contiguous manner to the received data in an order the received data is received regardless of host LBA address, and transmit the received data re-mapped to the block of contiguous storage LBA addresses and the assigned storage LBA addresses from the host system to the mass storage system.

According to another aspect of the invention, a host system for transferring data to a re-programmable non-volatile mass storage system is disclosed. The host system includes an interface configured to permit communication with the mass storage device, and a host processor configured to store data on the mass storage system via the interface in accordance with instructions from a host re-mapping module. The host re-mapping module includes processor executable instructions for causing the host processor to receive data associated with host logical block address (LBA) addresses at the host re-mapping module, contiguously re-map the received host LBA addresses in an order received to a block of contiguous storage LBA addresses at the host system, allocate an additional block of contiguous storage LBA addresses associated with only unwritten capacity upon allocation, and contiguously re-map additional received host LBA addresses to the additional block only when the block of contiguous storage LBA addresses is fully programmed. The processor executable instructions of the host re-mapping module are also arranged to cause the host processor to generate a storage address table at the host system mapping host LBA addresses to storage LBA addresses as the data associated with the host LBA addresses is re-mapped to contiguous storage LBA addresses.

In another aspect of the invention, a method of transferring data between a host system and a re-programmable non-volatile mass storage system includes receiving data at a host file system to be stored on the mass storage system, allocating a first block of contiguous host LBA addresses to associate with the received data, the first block having at least one available host LBA address, and associating each available host LBA address in the first block to the received data, where each available host LBA address is sequentially assigned to the received data in an order the received data is received The method further includes allocating a second block of contiguous host LBA addresses, the second block of contiguous host LBA addresses having at least one available host LBA address, where the second block is allocated only after associating of each of the at least one available host LBA addresses in the first block.

According to another aspect, a host system for transferring data to a re-programmable non-volatile mass storage system is disclosed. The host system includes an interface configured to permit communication with the mass storage device, and a host processor configured to store data on the mass storage system via the interface in accordance with instructions from a host memory. The host memory has processor executable instructions for implementing a host file system that causes the processor to allocate a first block of contiguous host LBA addresses to associate with data received at the host file system, associate each available host LBA address in the first block to the received data, where each available host LBA address is sequentially assigned to the received data in an order the received data is received, and allocate a second block of contiguous host LBA addresses for associating with received data only after associating each of the at least one available host LBA addresses in the first block.

In another aspect, a computer readable medium is disclosed having computer executable instructions for transferring data from a host system to a re-programmable non-volatile mass storage system. The computer executable instructions are arranged to cause a processor to execute the steps of receiving data at a host file system to be stored on the mass storage system, allocating a first block of contiguous host LBA addresses to associate with the received data, and associating each available host LBA address in the first block to the received data, where each available host LBA address is sequentially assigned to the received data in the order the received data is received. The computer executable instructions are also arranged to cause the processor to execute the step of allocating a second block of contiguous host LBA addresses for associating with received data only after association of each of the available host LBA addresses in the first block.

In yet another aspect of the invention, a method of transferring data between a host system and a re-programmable non-volatile mass storage system includes receiving data associated with host LBA addresses at the mass storage system from the host system. The method includes storing the received data in an order received, regardless of host LBA address order, in contiguous physical addresses of a write block having contiguous physical addresses, allocating a white block, the white block comprising a block of contiguous physical addresses containing only unwritten capacity, as a next write block to store the received data when the write block is fully programmed, and updating a storage address table mapping host LBA addresses for the received data to physical addresses in each write block, where the storage address table is maintained in at least one block of physical addresses. The method further includes creating a new white block, where creating a new white block includes selecting a pink block from a plurality of pink blocks, wherein each of the plurality of pink blocks is a contiguous block of fully programmed physical addresses having both valid data and obsolete data and the selected pink block has less than threshold amount of valid data. All valid data from the selected pink block is relocated to a relocation block such that, upon relocation of all valid data from the selected pink block, the selected pink block becomes a new white block.

According to one aspect of the invention, a method of transferring data between a host system and a re-programmable non-volatile mass storage system is disclosed. The method includes receiving data associated with host logical block address (LBA) addresses at the mass storage system from the host system and storing the received data in an order received, regardless of host LBA address order, in contiguous physical addresses of a write block having contiguous physical addresses. A run of host LBA addresses for the received data is mapped to at least two runs of physical addresses onto a single page of a storage address table (SAT), where the SAT is composed of at least one block of contiguous physical addresses in the mass storage system.

In another aspect, a method of generating blocks of contiguous physical addresses with only unwritten capacity in a re-programmable non-volatile mass storage system is disclosed, where the mass storage system has a plurality of blocks of contiguous physical addresses. The method includes determining an amount of valid data contained in each pink block in the plurality blocks, where each pink block comprises a fully programmed block of contiguous physical addresses having both valid data and obsolete data and selecting one of the pink blocks based on the determined amount of valid data. The method further includes copying valid data from the selected one of the pink blocks to contiguous physical addresses in a relocation block, where the relocation block comprises a block of contiguous physical addresses with which to contiguously relocate valid data from the selected one of the pink blocks, and where the valid data is copied from the selected one of the pink blocks in an order of occurrence regardless of a host LBA address associated with the valid data.

A mass storage memory system is disclosed in another aspect of the invention. The mass storage system includes re-programmable non-volatile memory cells arranged in a plurality of blocks of memory cells that are erasable together, an interface adapted to receive data from a host system addressed with host LBA addresses, and a controller in communication with the interface. The controller is configured to allocate a first block of contiguous physical addresses for receiving the data from the host system, to map each of the host LBA addresses for the received data to the block of contiguous physical addresses, where the received data is sequentially written to contiguous physical addresses in an order the received data is received regardless of a host LBA address associated with the received data. The host controller is further configured to allocate a second block of contiguous physical addresses for receiving additional received data in a contiguous manner, the second block of contiguous physical addresses having only unwritten capacity upon allocation, where the controller allocates data to the second block only upon completely assigning the first block of contiguous physical addresses. Also, the controller is further configured to generate correlation data correlating host LBA address and physical address locations and to store the correlation data in a storage address table in the mass storage memory system, where the correlation data maps each run of host LBA addresses to one or more runs of physical addresses corresponding to data associated with the run of host LBA addresses.

According to another aspect of the invention, a method of moving data within a storage device in which data is identified by a logical address within a continuous logical address range is disclosed. The method includes dividing the continuous logical address range into contiguous blocks of logical addresses of equal size and identifying a block of logical addresses containing at least one logical address that is allocated to valid data stored in the device. The method also includes re-mapping the valid data to at least one logical address that is not contained within the block of logical addresses, reading the valid data associated with the at least one logical address allocated to valid data and writing the valid data to the at least one logical address, such that the identified block contains no address that is allocated to valid data.

Other features and advantages of the invention will become apparent upon review of the following drawings, detailed description and claims.

BRIEF DESCRIPTION OF THE DRAWINGS

FIG. 6 illustrates a typical pattern of allocated and free clusters in LBA address space.

FIG. 7 illustrates a pattern of allocation of clusters by blocks according to one disclosed implementation.

DETAILED DESCRIPTION

Figure 1:
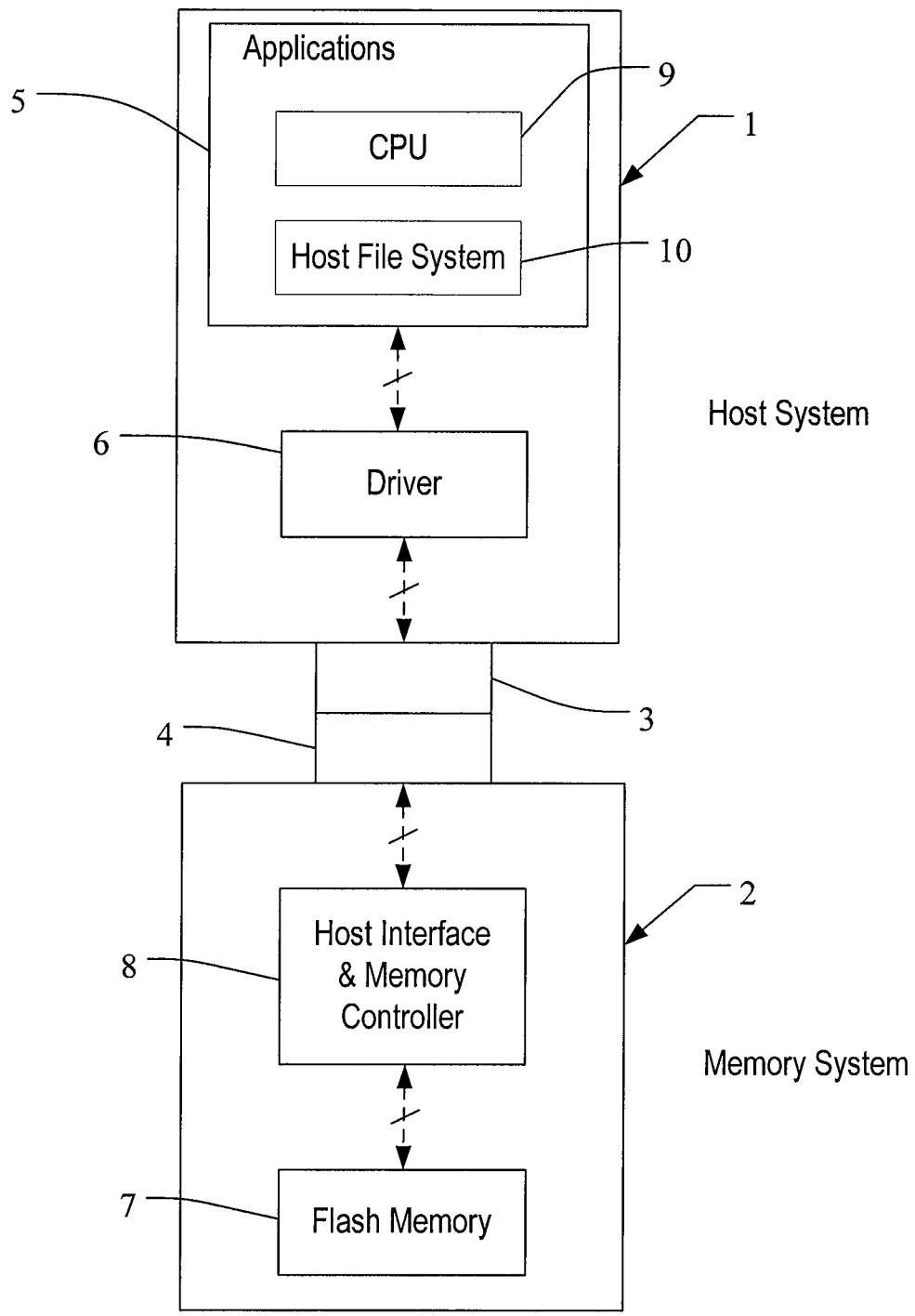
FIG. 1 illustrates a host connected with a memory system having non-volatile memory.

A flash memory system suitable for use in implementing aspects of the invention is shown in FIGS. 1-6. A host system 1 of FIG. 1 stores data into and retrieves data from a flash memory 2. The flash memory may be embedded within the host, such as in the form of a solid state disk (SSD) drive installed in a personal computer. Alternatively, the memory 2 may be in the form of a card that is removably connected to the host through mating parts 3 and 4 of a mechanical and electrical connector as illustrated in FIG. 1. A flash memory configured for use as an internal or embedded SSD drive may look similar to the schematic of FIG. 1, with the primary difference being the location of the memory system 2 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include the CompactFlash (CF), the MultiMediaCard (MMC), Secure Digital (SD), miniSD, Memory Stick, Smart-Media and TransFlash cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

The host system 1 of FIG. 1 may be viewed as having two major parts, insofar as the memory 2 is concerned, made up of a combination of circuitry and software. They are an applications portion 5 and a driver portion 6 that interfaces with the memory 2. In a PC, for example, the applications portion 5 can include a processor 9 running word processing, graphics, control or other popular application software, as well as the file system 10 for managing data on the host 1. In a camera, cellular telephone or other host system that is primarily dedicated to performing a single set of functions, the applications portion 5 includes the software that operates the camera to take and store pictures, the cellular telephone to make and receive calls, and the like.

The memory system 2 of FIG. 1 includes flash memory 7, and circuits 8 that both interface with the host to which the card is connected for passing data back and forth and control the memory 7. The controller 8 typically converts between logical addresses of data used by the host 1 and physical addresses of the memory 7 during data programming and reading.

Figure 2:
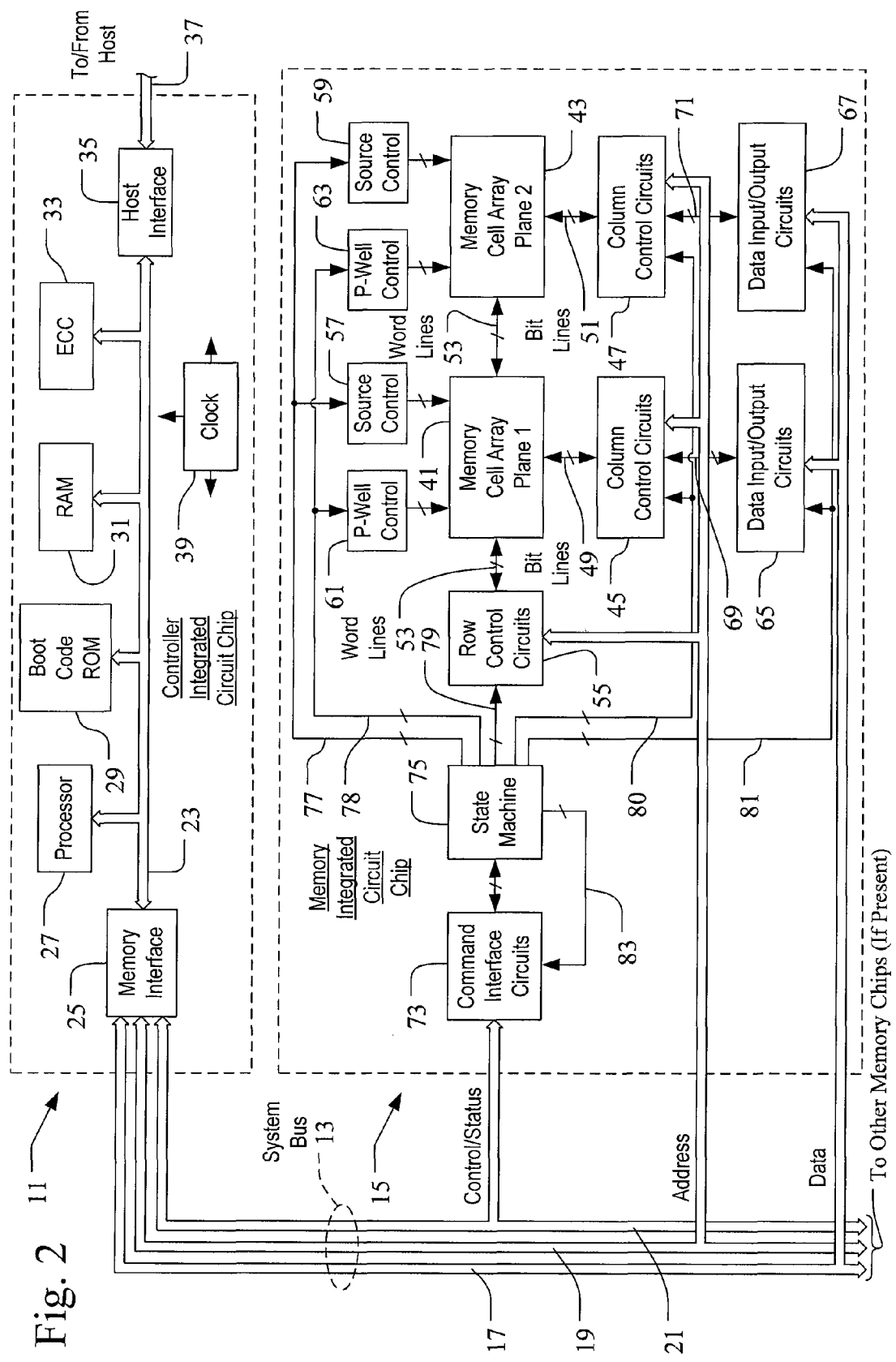
FIG. 2 is an example block diagram of an example flash memory system for use as the non-volatile memory of FIG. 1.

Referring to FIG. 2, circuitry of a typical flash memory system that may be used as the non-volatile memory 2 of FIG. 1 is described. The system controller is usually implemented on a single integrated circuit chip 11 that is connected in parallel with one or more integrated circuit memory chips over a system bus 13, a single such memory chip 15 being shown in FIG. 2. The particular bus 13 that is illustrated includes a separate set of conductors 17 to carry data, a set 19 for memory addresses and a set 21 for control and status signals. Alternatively, a single set of conductors may be time shared between these three functions. Further, other configurations of system buses can be employed, such as a ring bus that is described in U.S. patent application Ser. No. 10/915,039, filed Aug. 9, 2004, entitled "Ring Bus Structure and It's Use in Flash Memory Systems."

A typical controller chip 11 has its own internal bus 23 that interfaces with the system bus 13 through interface circuits 25. The primary functions normally connected to the bus are a processor 27 (such as a microprocessor or micro-controller), a read-only-memory (ROM) 29 containing code to initialize ("boot") the system, read-only-memory (RAM) 31 used primarily to buffer data being transferred between the memory and a host, and circuits 33 that calculate and check an error correction code (ECC) for data passing through the controller between the memory and the host. The controller bus 23 interfaces with a host system through circuits 35, which, in the case of the system of FIG. 2 being contained within a memory card, is done through external contacts 37 of the card that are part of the connector 4. A clock 39 is connected with and utilized by each of the other components of the controller 11.

The memory chip 15, as well as any other connected with the system bus 13, may contain an array of memory cells organized into multiple sub-arrays or planes, two such planes 41 and 43 being illustrated for simplicity but more, such as four or eight such planes, may instead be used. Alternatively, the memory cell array of the chip 15 may not be divided into planes. When so divided however, each plane has its own column control circuits 45 and 47 that are operable independently of each other. The circuits 45 and 47 receive addresses of their respective memory cell array from the address portion 19 of the system bus 13, and decode them to address a specific one or more of respective bit lines 49 and 51. The word lines 53 are addressed through row control circuits 55 in response to addresses received on the address bus 19. Source voltage control circuits 57 and 59 are also connected with the respective planes, as are p-well voltage control circuits 61 and 63. If the memory chip 15 has a single array of memory cells, and if two or more such chips exist in the system, the array of each chip may be operated similarly to a plane or sub-array within the multi-plane chip described above.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 2. Status information from the state machine 75 is communicated over lines 83 to the interface 73 for transmission to the controller 11 over the bus portion 21.

A NAND architecture of the memory cell arrays 41 and 43 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278. An example NAND array is illustrated by the circuit diagram of FIG. 3, which is a portion of the memory cell array 41 of the memory system of FIG. 2. A large number of global bit lines are provided, only four such lines 91-94 being shown in FIG. 2 for simplicity of explanation. A number of series connected memory cell strings 97-104 are connected between one of these bit lines and a reference potential. Using the memory cell string 99 as representative, a plurality of charge storage memory cells 107-110 are connected in series with select transistors 111 and 112 at either end of the string. When the select transistors of a string are rendered conductive, the string is connected between its bit line and the reference potential. One memory cell within that string is then programmed or read at a time.

Figure 3:
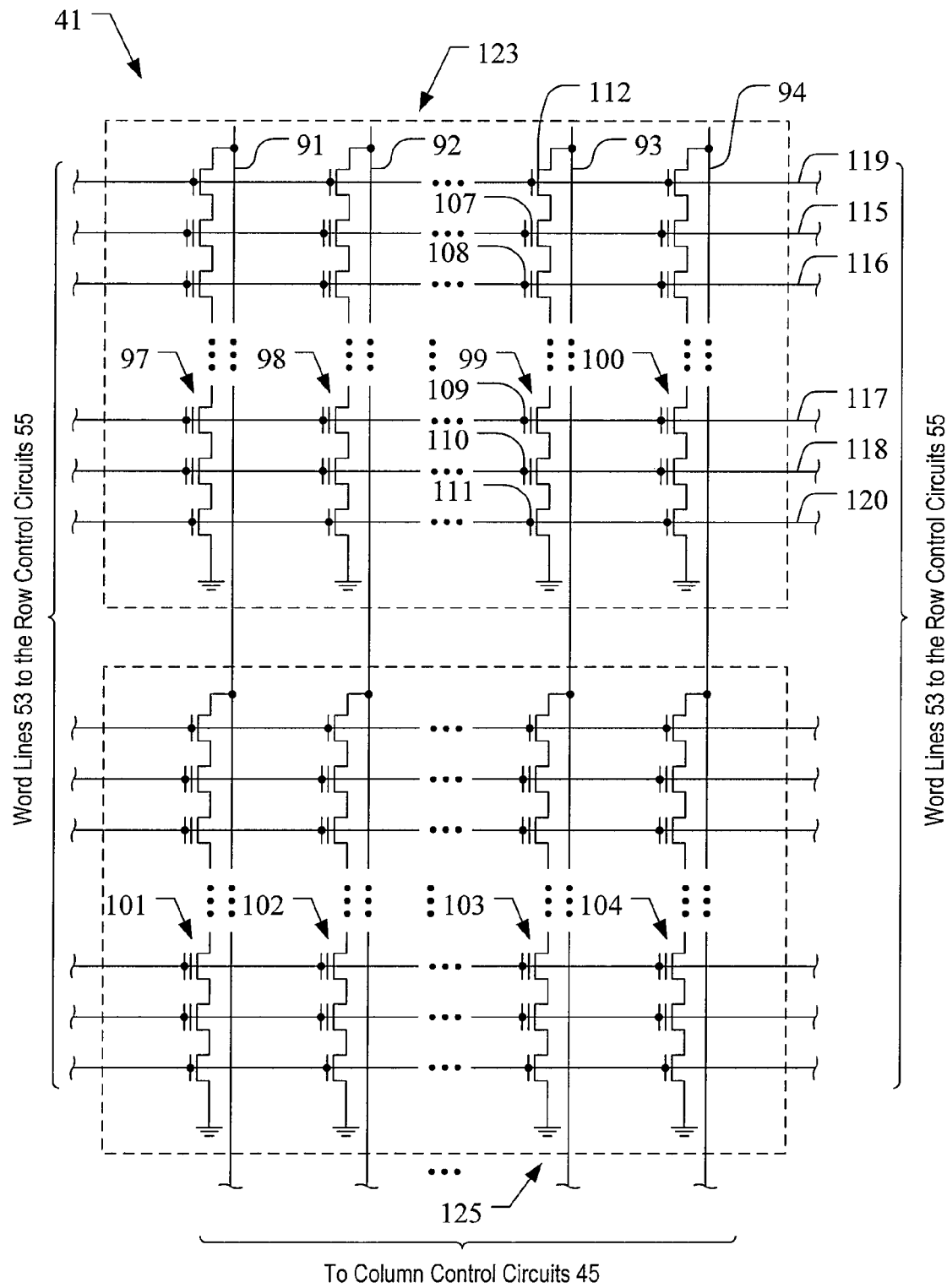
FIG. 3 is a representative circuit diagram of a memory cell array that may be used in the system of FIG. 2.

Word lines 115-118 of FIG. 3 individually extend across the charge storage element of one memory cell in each of a number of strings of memory cells, and gates 119 and 120 control the states of the select transistors at each end of the strings. The memory cell strings that share common word and control gate lines 115-120 are made to form a block 123 of memory cells that are erased together. This block of cells contains the minimum number of cells that are physically erasable at one time. One row of memory cells, those along one of the word lines 115-118, are programmed at a time. Typically, the rows of a NAND array are programmed in a prescribed order, in this case beginning with the row along the word line 118 closest to the end of the strings connected to ground or another common potential. The row of memory cells along the word line 117 is programmed next, and so on, throughout the block 123. The row along the word line 115 is programmed last.

A second block 125 is similar, its strings of memory cells being connected to the same global bit lines as the strings in the first block 123 but having a different set of word and control gate lines. The word and control gate lines are driven to their proper operating voltages by the row control circuits 55. If there is more than one plane or sub-array in the system, such as planes 1 and 2 of FIG. 2, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in U.S. patent application publication no. 2003/0109093.

Figure 4:
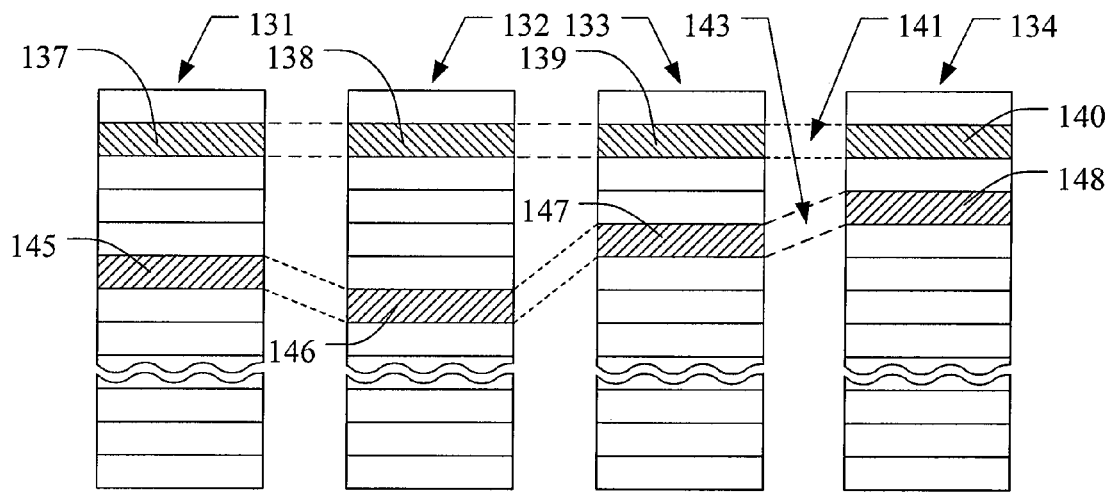
FIG. 4 illustrates an example physical memory organization of the system of FIG. 2.

FIG. 4 conceptually illustrates an organization of the flash memory cell array 7 (FIG. 1) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 4 by rectangles, such as blocks 137, 138, 139 and 140, located in respective planes 131-134. There can be dozens or hundreds of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 137-140 are shown to form one metablock 141. All of the cells within a metablock are typically erased together. The blocks used to form a metablock need not be restricted to the same relative locations within their respective planes, as is shown in a second metablock 143 made up of blocks 145-148. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
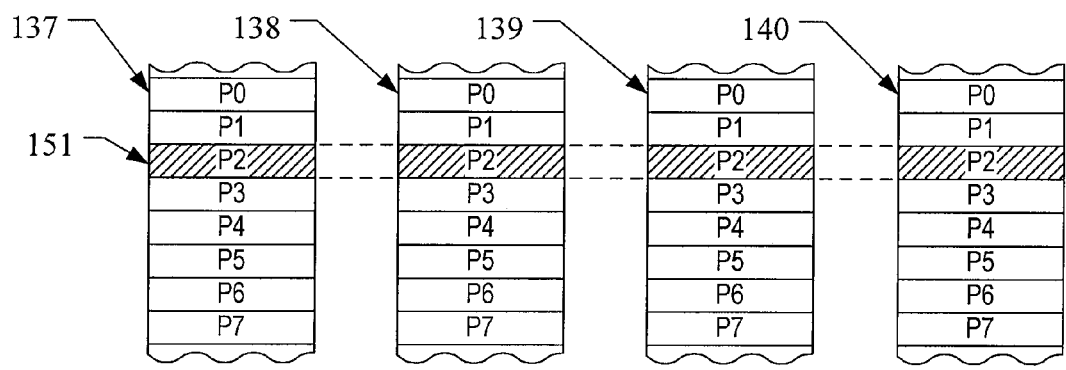
FIG. 5 shows an expanded view of a portion of the physical memory of FIG. 4.

The individual blocks are in turn divided for operational purposes into pages of memory cells, as illustrated in FIG. 5. The memory cells of each of the blocks 137-140, for example, are each divided into eight pages P0-P7. Alternatively, there may be 16, 32 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 151 is illustrated in FIG. 5, being formed of one physical page from each of the four blocks 137-140. The metapage 151, for example, includes the page P2 in each of the four blocks but the pages of a metapage need not necessarily have the same relative position within each of the blocks. A metapage is the maximum unit of programming.

A common logical interface, shown in FIG. 6, between the host 1 and the memory system 2 utilizes a continuous logical address space 160 large enough to provide addresses for all the data that may be stored in the memory system 2. Referring to the host 1 and memory system 2 described above, data destined for storage in flash memory 7 is typically received in a logical block address (LBA) format. The host address space is typically divided into increments of clusters of data. Each cluster may be designed in a given host system to contain a number of sectors of data, somewhere between 4 and 64 sectors being typical. A standard sector contains 512 bytes of data. Referring to FIG. 6, a typical pattern of allocated clusters 162 and free clusters 164 in logical address space 160 for a NTFS file system is shown.

An organizational structure for addressing the fragmentation of logical address space 160 seen in FIG. 6 is shown in FIG. 7. The systems and methods for storage address re-mapping described herein allocate LBA addresses in terms of blocks of clusters 166, referred to generally as "blocks" in the discussion below. A write operation is handled by always writing data into individual blocks 166, and completely filling that block 166 with data before proceeding to the next available block. In the following description, blocks 166 completely filled with valid data are referred to as red blocks 168, while blocks with no valid data, and thus containing only unwritten capacity are referred to as white blocks 170. The unwritten capacity in a white block 170 may be in the erased state if the memory system employs an "erase after use" type of procedure. Alternatively, the unwritten capacity in the white block 170 may consist of obsolete data that will need to be erased upon allocation if the memory system employs an "erase before use" type of procedure. Blocks that have been fully programmed and have both valid 162 and invalid (also referred to as obsolete) 164 clusters of data are referred to as pink blocks 172.

In order to divide and manage the logical address space 160 in terms of blocks of logical addresses, the host and memory system may need to exchange information on the block size of physical blocks in flash memory. The size of a logical block is preferably the same size as the physical block and this information may be communicated when a memory system is connected with a host. This communication may be set up to occur as a hand-shaking operation upon power-up or upon connection of a memory system to the host. In one embodiment, the host may send an "Identify Drive" query to the memory system requesting block size and alignment information, where block size is the size of the individual physical blocks for the particular memory system and the alignment information is what, if any, offset from the beginning of a physical block needs to be taken into account for system data that may already be taking up some of each physical block.

The Identify Drive command may be implemented as reserved codes in a legacy LBA interface command set. The commands may be transmitted from the host to the memory system via reserved or unallocated command codes in a standard communication interface. Examples of suitable interfaces include the ATA interface, for solid state disks, or ATA-related interfaces, for example those used in CF or SD memory cards. If the memory system fails to provide both the block size and offset information, the host may assume a default block size and offset. If the memory system responds to the Identify Drive command with only block size information, but not with offset information, the host may assume a default offset. The default block size may be any of a number of standard block sizes, and is preferably set to be larger than the likely actual physical block size. The default offset may be set to zero offset such that it is assumed each physical block can receive data from a host starting at the first address in the physical block. If the host is coupled to a predetermined internal drive, such as an SSD, there may be no need to perform this step of determining block size and offset because the capabilities of the memory device may already be known and pre-programmed. Because even an internal drive may be replaced, however, the host can be configured to always verify memory device capability. For removable memory systems, the host may always inquire of the block size and offset through an Identify Drive command or similar mechanism.

The systems and methods for allocating and writing to free blocks 166 of clusters described herein may include functionality or hardware distributed in a number of different combinations between the host system and the memory system. FIGS. 8-11 illustrate examples of how the storage address mapping or re-mapping algorithms that accomplish the block allocation of clusters may be implemented at four different levels within the hierarchy of a system comprising a file in a host and a solid state storage device.

Figure 8:
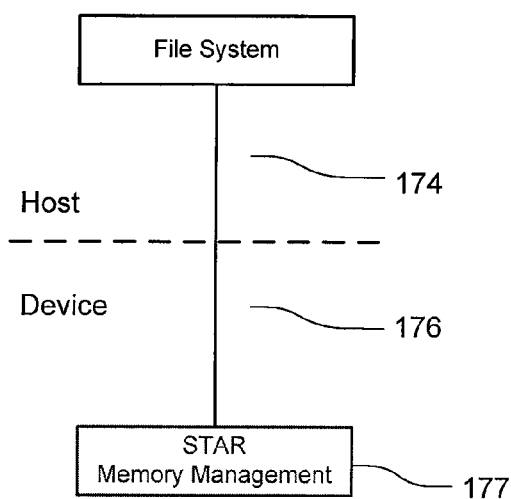
FIG. 8 illustrates an implementation of storage address re-mapping between a host and a memory drive where the memory manager of the device incorporates the storage addressing re-mapping function.
Figure 9:
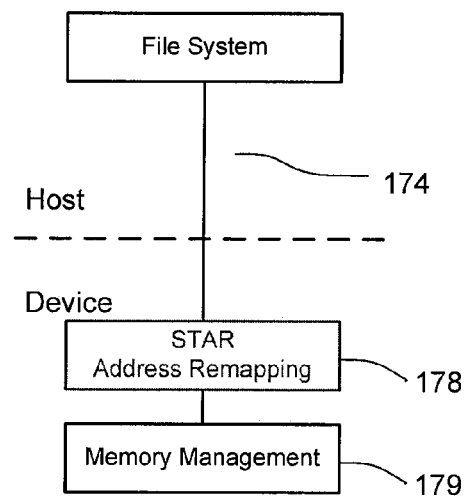
FIG. 9 illustrates an alternate implementation of storage address re-mapping shown in FIG. 8.
Figure 10:
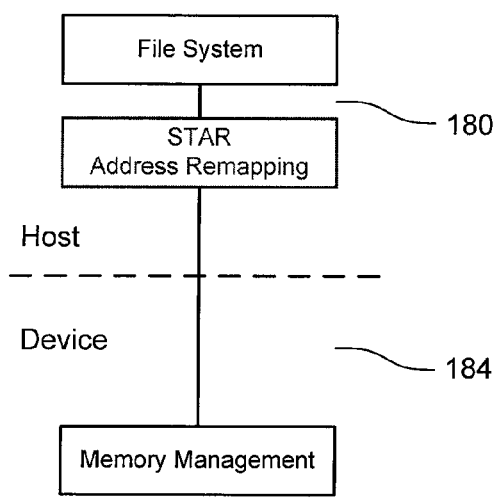
FIG. 10 illustrates an implementation of storage address re-mapping where the functionality is located on the host.
Figure 11:
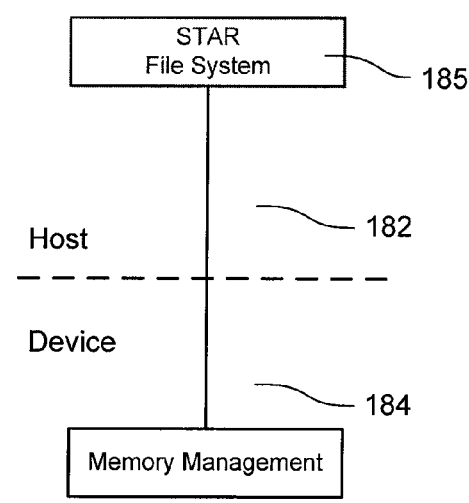
FIG. 11 illustrates an alternate implementation of the storage address re-mapping of FIG. 10.

The arrangements of FIGS. 8 and 9 are of embodiments where the storage address mapping or re-mapping functionality is contained totally within the storage device 176, 178. In these first two arrangements, the storage device 176, 178 may operate with a legacy host 174 with no modifications required on the host 174. Conversely, the arrangements illustrated in FIGS. 10 and 11 are of embodiments where the storage address mapping or re-mapping functionality is contained totally within the host 180, 182. In these latter two embodiments, the host 180, 182 may operate with a legacy storage device 184 that needs no modification.

In the example of FIG. 8, the storage address mapping algorithm may be integrated in the memory management 177 of the storage device 176, wherein the LBA addresses from the host 174 are directly mapped to physical blocks in the flash memory such that a first block of physical memory is completely filled with data before proceeding to a next block. Alternatively, in FIG. 9, a storage address re-mapping mechanism may be implemented in the storage device 178, but separate from the memory manager 179 for the device 178. In the implementation of FIG. 9, each logical address from the host 174 would be re-mapped to a second logical address, referred to herein as a storage logical block address (storage LBA), also referred to herein as a device logical block address (DLBA), utilizing the technique of writing data in terms of complete blocks 166, and then the memory manager 179 would translate the data organized under the DLBA arrangement to blocks of physical memory. The DLBA address space is structured in DLBA blocks of uniform size, equal to that of a physical metablock. The implementation of FIG. 10 would move the functionality of storage address re-mapping from the storage device 184 to an application on the host 180. In this implementation, the function of mapping LBA addresses to DLBA addresses would be similar to that of FIG. 9, with the primary difference being that the translation would occur on the host 180 and not in the memory device 184. The host 180 would then transmit both the DLBA address information generated at the host, along with the data associated with the DLBA addresses, to the memory device 184. Finally, a data allocation arrangement embedded in the host operating system 182 itself is shown in FIG. 11. In this last implementation, the file system 185 of the host 182, such as the NTFS file system within the WINDOWS XP or VISTA operating systems, may be arranged to generate the storage addresses in terms of complete logical blocks of clusters without the need for an intermediate, logical address to logical address, translation. Thus, the implementation of FIG. 11 includes a modified algorithm in the host file system so that the LBA addresses are initially generated to fill complete blocks before beginning to fill additional blocks.

In any of the arrangements of FIGS. 8-11, a white block 170 is allocated as the sole location for writing data, and it is sequentially filled with data at the current position of its write pointer in the order it is provided by the host. When a block of storage addresses becomes fully allocated to valid data, it becomes a red block 168. When files are deleted by the host or portions of a file are updated by the host, some addresses in a red block 168 may no longer be allocated to valid data, and thus the block becomes a pink block 172. As discussed in greater detail herein, a white block 170 allocated to receive data from the host is referred to as a write block and a white block allocated to receive data during a flush operation is referred to as a relocation block. Multiple write pointers may be defined for different purposes. For example, in different applications the logical address space may be subdivided into multiple sequential ranges based on address ranges or on file size. Each separate range of logical address space may be configured to have its own write block and associated write pointer in storage address space. The division of logical address space address runs may, in addition to run sequence or file size, be implemented based on a type of data. For example, there may be a desire to separate the NTFS MFT table data that is updated often from the data that is infrequently updated.

A storage address re-mapping algorithm manages the creation of white blocks 170 by relocating, also referred to herein as flushing, valid data from a pink block 172 to a special write pointer known as the relocation pointer. If the storage address space is subdivided by range or file size as noted above, each range of storage addresses may have its own relocation block and associated relocation pointer. Flush operations are normally performed as background operations, to transform pink blocks into red blocks and white blocks. A pink block is selected for a flush operation according to its characteristics. Referring again to FIG. 7, in one implementation a pink block with the least amount of valid data (i.e. the fewest shaded clusters in FIG. 7) would be selected because fewer addresses with valid data results in less data needing relocation when that particular pink block is flushed. Thus, in the example of FIG. 7, pink block B would be selected in preference to pink block A because pink block B has fewer addresses with valid data. In other implementations, the pink block selected for a flush operation may be any one of a group of pink blocks that are associated with less than some threshold amount of valid data. The threshold may be less than the average amount of valid data contained in the total set of pink blocks. A subset of the pink blocks at or below the threshold amount of valid data may be maintained in a list from which the host or memory system may select pink blocks. For example, a dynamic list of a defined number (e.g. sixteen) or percentage (e.g. 30 percent) of pink blocks currently satisfying the threshold requirement may be maintained and any pink block may be selected from that list for flushing without regard to whether the selected pink block in that list has the absolute least amount of valid data. The number or percentage of pink blocks that form the list that the memory system or host will select from may be a fixed value or a user selectable value. The list may include the group of pink blocks representing, in ranked order, the pink blocks with the absolute least amount of valid data from the available pink blocks or may simply include pink blocks that fall within the threshold requirement.

Alternatively, or in combination, selection of pink blocks may also be made based on a calculated probability of accumulating additional obsolete data in a particular pink block 172. The probability of further obsolete data being accumulated in pink blocks 172 could be based on an assumption that data that has survived the longest in the memory is least likely to be deleted. Thus, pink blocks 172 that were relocation blocks would contain older surviving data than pink blocks 172 that were write blocks having new host data. The selection process of pink blocks 172 for flushing would then first target the pink blocks 172 that were recently relocation blocks because they would be less likely to have further data deleted, and thus fewer additional obsolete data could be expected. The pink blocks 172 that were formerly write blocks would be selected for flushing later based on the assumption that newer data is more likely to be deleted, thus creating more obsolete data.

Figure 12:
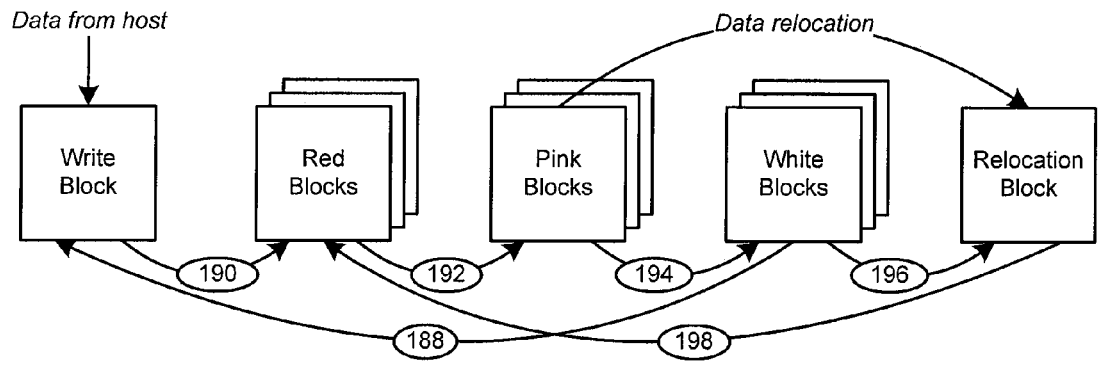
FIG. 12 is a state diagram of the allocation of blocks of clusters.

A flow of data and the pattern of block state changes within the storage address re-mapping algorithm are shown in FIG. 12. As noted above, the storage address re-mapping technique allocates address space in terms of blocks of clusters and fills up a block 166 of clusters before allocating another block of clusters. This may be accomplished by first allocating a white block to be the current write block to which data from the host is written, wherein the data from the host is written to the write block in sequential order according to the time it is received (at step 188). When the last page in the current write block is filled with valid data, the current write block becomes a red block (at step 190) and a new write block is allocated from the white block list. It should be noted that the current write block may also make a direct transition to a pink block if some pages within the current write block have already become obsolete before the current write block is fully programmed. This transition is not shown, for clarity; however it could be represented by an arrow from the write block to a pink block.

Referring again to the specific example of data flow in FIG. 12, when one or more pages within a red block are made obsolete by deletion of an LBA run, the red block becomes a pink block (at step 192). When the storage address re-mapping algorithm detects a need for more white blocks, the algorithm initiates a flush operation to move the valid data from a pink block so that the pink block becomes a white block (at step 194). In order to flush a pink block, the valid data of a pink block is sequentially relocated to a white block that has been designated as a relocation block (at steps 194' and 196). Once the relocation block is filled, it becomes a red block (at step 198). As noted above with reference to the write block, a relocation block may also make the direct transition to a pink block if some pages within it have already become obsolete. This transition is not shown, for clarity, but could be represented by an arrow from the relocation block to a pink block in FIG. 12.

Figure 13:
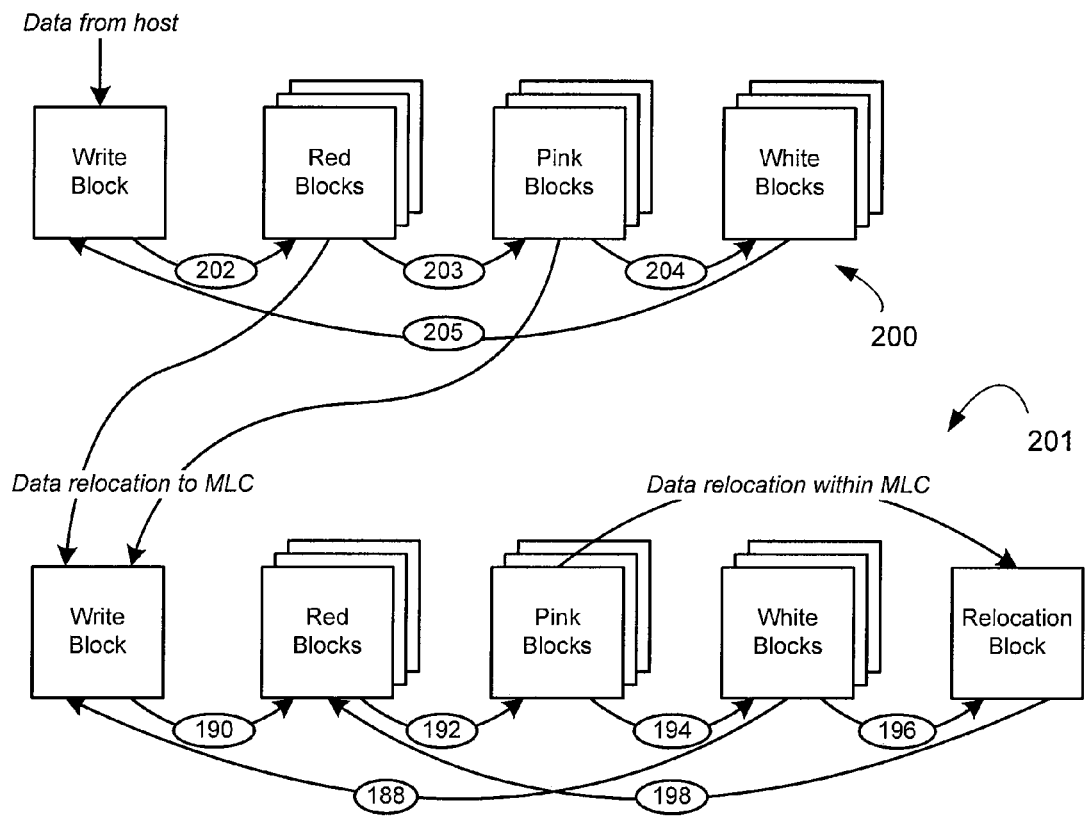
FIG. 13 is an alternative implementation of the state diagram of FIG. 12, when the flash memory includes binary and MLC partitions.

FIG. 13 illustrates an alternative data flow example where the storage address re-mapping functionality is applied to a flash memory having binary 200 and multi-level cell (MLC) 201 partitions. The block state changes in the MLC partition 200 are the same as in FIG. 12, however the block state changes (at steps 202-205) in the binary partition 200 differ from those of the MLC partition 201. In the binary partition 200, data is received from the host is received at a write block that is sequentially written to until it is filled and becomes a red block (at 202). If pages for a red block become obsolete, the block becomes a pink block (at 203). Pink blocks may be flushed as discussed herein to create new white blocks (at 204) which are then assigned as new write blocks (at 205) in the binary partition. However, valid data from the pink blocks in the binary partition 200 may be sent to the MLC partition 201 as well as valid data from red blocks.

In a memory system 2 where the flash memory 7 is divided into a two-tier system with a binary partition 200 acting as a cache to receive data from a host and a MLC partition 201 that acts a main storage area which receives data from the binary partition, as shown in FIG. 13, the "host" of FIGS. 8-11 may be the binary partition. Thus, the storage address re-mapping techniques discussed herein may relate to operations completely within tiers of the memory system 2 where the previous tier, in this example the binary partition 200, is considered the host and current tier, here the MLC partition 201, is considered the storage device. It is contemplated that this relationship may be extended to memory systems having more than a two-tier arrangement, where the preceding tier is analogous to a host and the current tier is treated as the storage device. In other embodiments utilizing a binary and MLC partition, the host 1 may write directly to the MLC partition 201 without having to first go through the binary partition 200.

Figure 14:
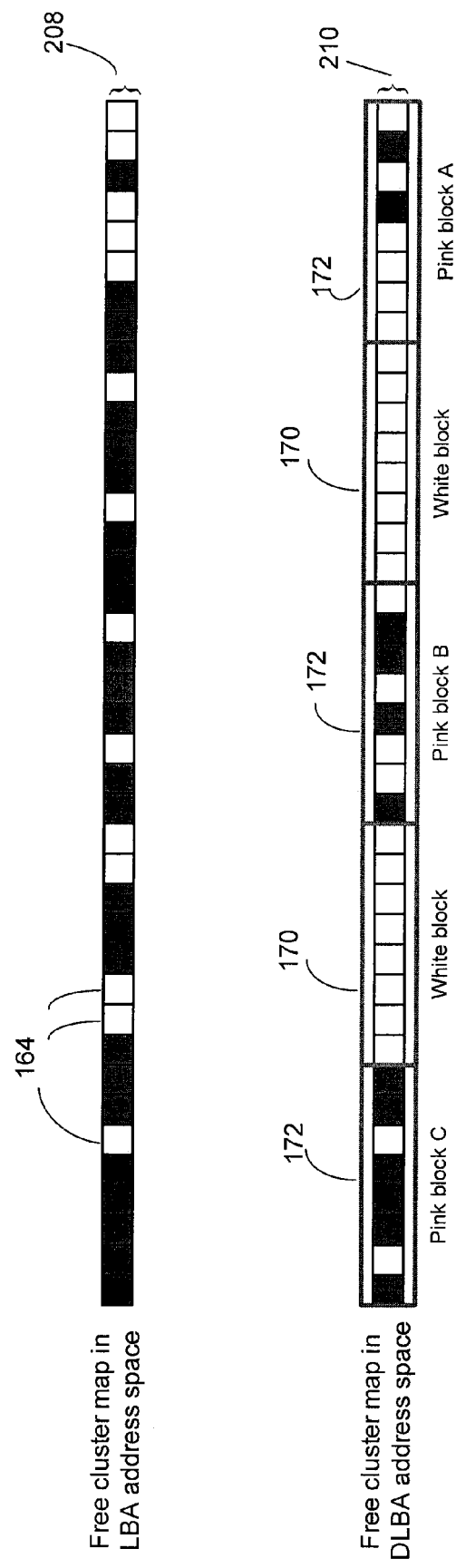
FIG. 14 is an example of LBA address space and an associated DLBA address space that may be utilized in the implementations of FIGS. 9 and 10.

Referring to the implementations of storage address re-mapping illustrated in FIGS. 9 and 10, where a logical-to-logical, LBA to DLBA, translation is executed by an application on either the storage device (FIG. 9) or on the host (FIG. 10), a detailed example of address manipulation according to the state diagram of FIG. 12 is now discussed with reference to FIGS. 14-17. Assuming that a system has been operating according to the storage address re-mapping algorithm represented by FIG. 12, a hypothetical section of the host free cluster map in LBA address space 208 and the free cluster map in DLBA address space 210 at a given time may be represented as shown in FIG. 14. In the LBA address space 208, free clusters 164 are dispersed at essentially random locations. In the DLBA address space 210, two white blocks 170 are available and there are three pink blocks 172 having differing numbers of obsolete (free) clusters 164.

Figure 15:
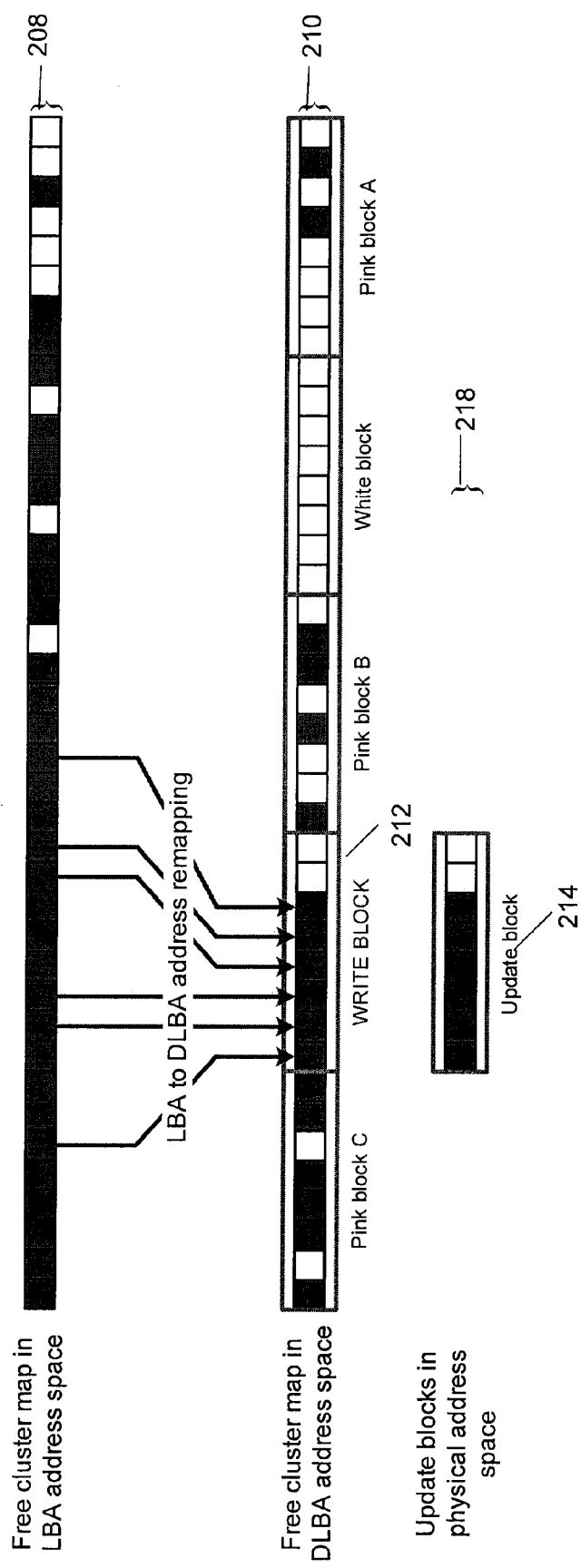
FIG. 15 illustrates an example of LBA to DLBA mapping for data received from a host.

When the host next has data to write to the storage device, it allocates LBA address space 208 wherever it is available. FIG. 15 shows how the storage address re-mapping algorithm allocates one of the available white blocks 170 to be the write block 212, and how each LBA address is mapped to a sequential cluster in the DLBA space available in the write block 212. The write block 212 in DLBA space is written to in the order the LBA addresses are written, regardless of the LBA address position. In this example it is assumed that the time order in which the host used free LBA clusters is the same as the address order for ease of illustration, however the storage address re-mapping algorithm would assign DLBA addresses in the write block 212 in the time order LBA addresses are used, regardless of the LBA address number order. Data is written in a write block in one or more DLBA runs. A DLBA run is a set of contiguous DLBA addresses that are mapped to contiguous LBA addresses in the same LBA run. A DLBA run must be terminated at a block boundary in DLBA address space 210. When a write block 212 becomes filled, a white block 170 is allocated as the next write block 212.

DLBA blocks are aligned with blocks 214 in physical address space of the flash memory, and so the DLBA block size and physical address block size are the same. The arrangement of addresses in the DLBA write block 212 are also then the same as the arrangement of the corresponding update block in physical address space. Due to this correspondence, no separate data consolidation, commonly referred to as garbage collection, is ever needed in the physical update block. In common garbage collection operations, a block of logical addresses is generally always reassembled to maintain a specific range of LBA addresses in the logical block, which is also reflected in the physical block. More specifically, when a memory system utilizing common garbage collection operations receives an updated sector of information corresponding to a sector in particular physical block, the memory system will allocate an update block in physical memory to receive the updated sector or sectors and then consolidate all of the remaining valid data from the original physical block into the remainder of the update block. In this manner, standard garbage collection will perpetuate blocks of data for a specific LBA address range so that data corresponding to the specific address range will always be consolidated into a common physical block. The flush operation discussed in more detail below does not require consolidation of data in the same address range. Instead, the flush operation disclosed herein performs address mapping (implementations of FIGS. 8 and 11) or re-mapping (implementations of FIGS. 9 and 10) to create new blocks of data that may be a collection of data from various physical blocks, where a particular LBA address range of the data is not intentionally consolidated.

Figure 16:
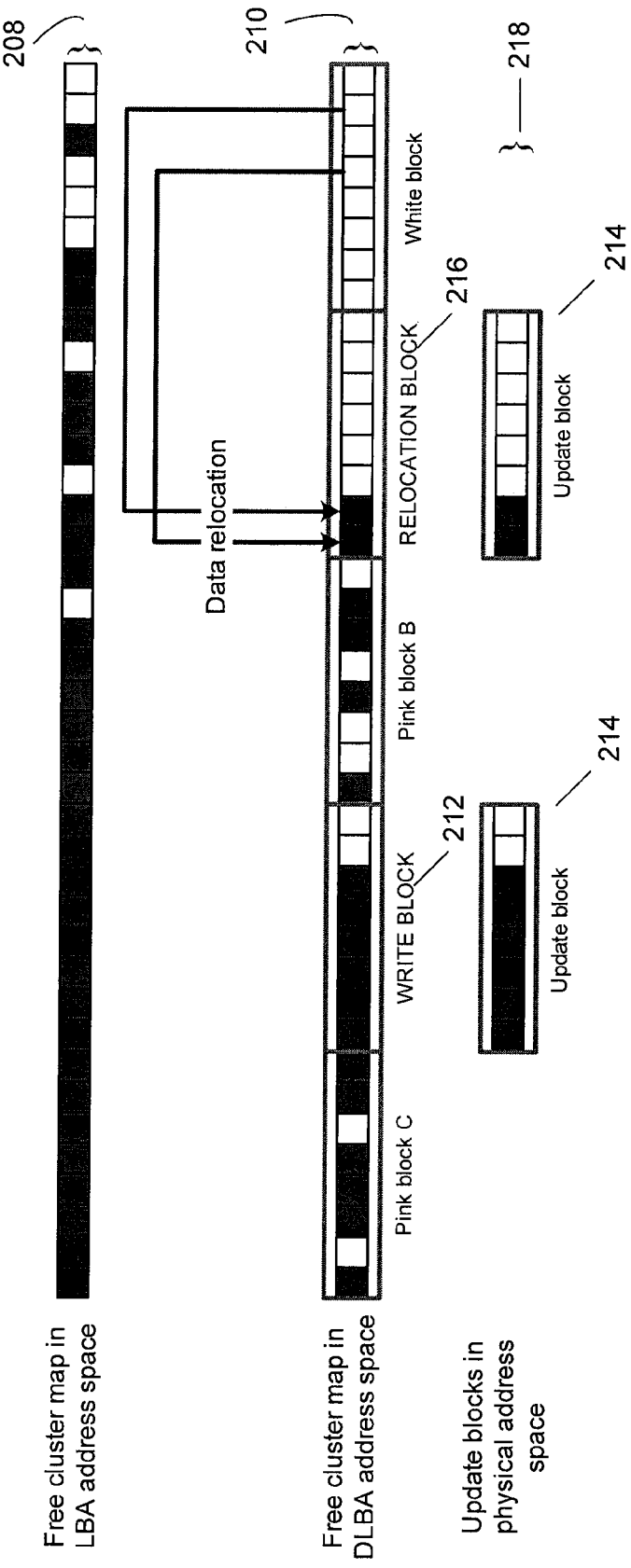
FIG. 16 illustrates a flush operation in DLBA address space and corresponding updates bocks in physical address space.

As mentioned previously, the storage address re-mapping algorithm operates to ensure that a sufficient supply of white blocks are available for the sequential write algorithm to operate. The storage address re-mapping algorithm manages the creation of white blocks by flushing data from pink blocks to a special write block known as the relocation block 216 (FIG. 16). The pink block currently selected for flushing is referred to as the flush block.

Referring now to FIGS. 15-16, an illustration of a block flush process is shown. The storage address re-mapping algorithm designates a white block as the relocation block 216, to which data is to be flushed from selected pink blocks to create additional white blocks. Valid data, also referred to as red data, in the flush block (pink block A of FIG. 15) is relocated to sequential addresses in the relocation block 216, to convert the flush block to a white block 170. A corresponding update block 214 in the physical address space 218 is also assigned to receive the flushed data. As with the update block 214 used for new data received from the host, the update block 214 for receiving flushed data will never require a garbage collection operation to consolidate valid data because the flush operation has already accomplished the consolidation in DLBA address space 210.

Figure 17:
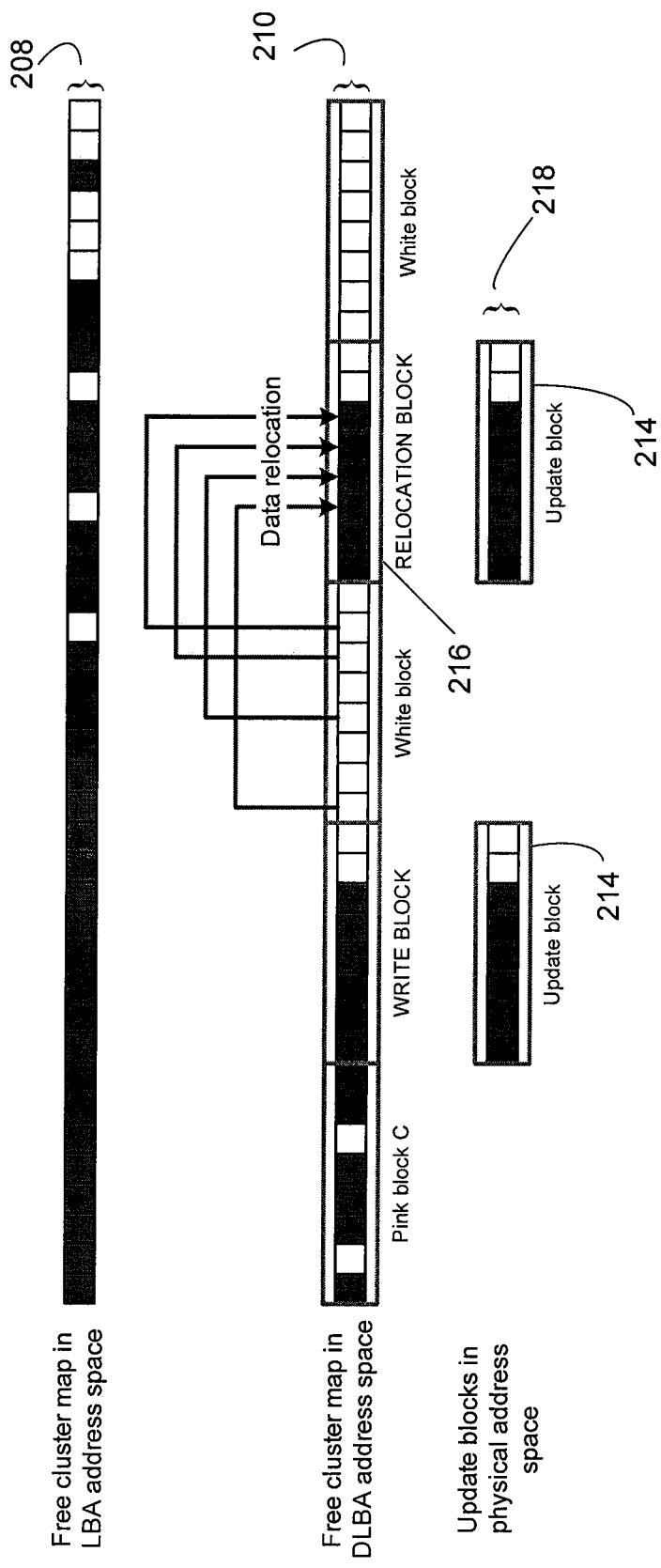
FIG. 17 illustrates a second flush operation following the flush operation of FIG. 16.

A next flush block (pink block B of FIG. 16) is identified from the remaining pink blocks as illustrated in FIG. 17. The pink block with the least red data is again designated as the flush block and the red data (valid data) of the pink block is transferred to sequential locations in the open relocation block. A parallel assignment of physical addresses in the update block 214 is also made. Again, no data consolidation is required in the physical update block 214 mapped to the relocation block 216. Flush operations on pink blocks are performed as background operations to create white blocks at a rate sufficient to compensate for the consumption of white blocks that are designated as write blocks. The example of FIGS. 14-17 illustrate how a write block and a relocation block may be separately maintained, along with respective separate update blocks in physical address space, for new data from the host and for relocated data from pink blocks. Similar to the process of allocating of a new write block for associating new data received from a host only when a current write block is fully programmed, a new relocation block is preferably only allocated after the prior relocation block has been fully programmed. The new relocation block preferably only contains unwritten capacity, i.e. is only associated with obsolete data ready to erase, or is already erased and contains no valid data, upon allocation.

In the embodiment noted above, new data from a host is associated with write blocks that will only receive other new data from the host and valid data flushed from pink blocks in a flush operation is moved into relocation blocks that will only contain valid data from one or more pink blocks. In other implementations, the new data and the relocated data may be transferred to a single write block without the need for separate write and relocation blocks. As noted above, in other embodiments the selection a pink block for flushing may be made where any pink block from a list of pink blocks associated with an amount of red data that is below a threshold, such as an average amount for the current pink blocks may be chosen or the pink block may be any from pink blocks having a specific ranking (based on the amount of valid data associated with the pink block) out of the available pink blocks.

The flush operation relocates relatively "cold" data from a block from which "hot" data has been made obsolete to a relocation block containing similar relatively cold data. This has the effect of creating separate populations of relatively hot and relatively cold blocks. The block to be flushed is always selected as a hot block containing the least amount of data. Creation of a hot block population reduces the memory stress factor, by reducing the amount of data that need be relocated.

In one embodiment, the pink block selected as the flush block may be the most sparsely populated pink block, that is, the pink block containing the least amount of valid data, and is not selected in response to specific write and delete operations performed by the host. Selection of pink blocks as flush blocks in this manner allows performance of block flush operations with a minimum relocation of valid data because any pink block so selected will have accumulated a maximum number of unallocated data addresses due to deletion of files by the host.

Figure 18:
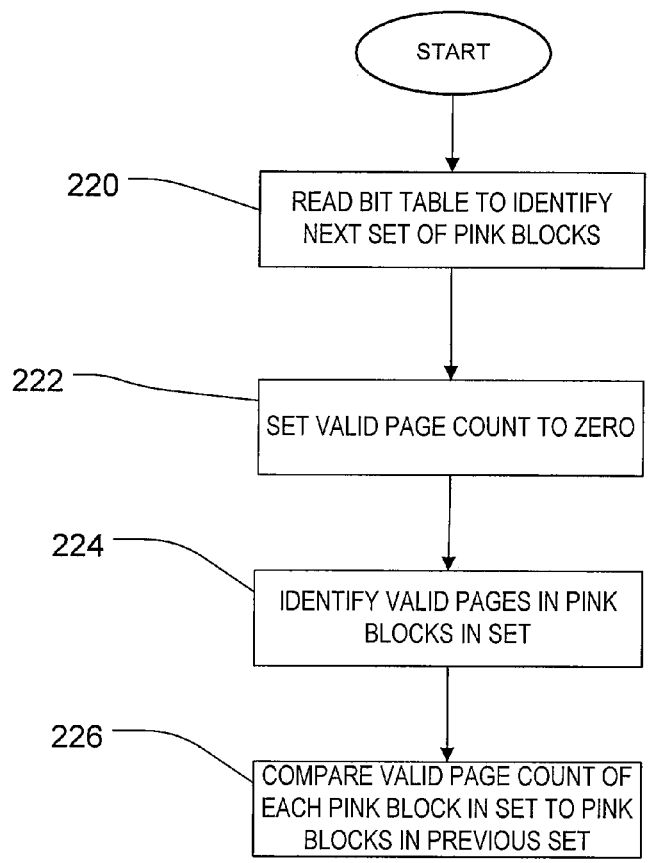
FIG. 18 is a flow diagram of a block flush process for blocks containing data from a host.

One example of a pink block selection process may be to select any pink block that is among the 5% of pink blocks with the lowest number of valid pages or clusters. In a background process, a list of the 16 pink blocks with the lowest page or cluster count values is built. The pink block identification process may complete one cycle in the time occupied by "P" scheduled block flush operations. A cycle in a flush block identification process is illustrated in FIG. 18. A block information table (BIT) containing lists of block addresses for white, pink and other types of DLBA address blocks is maintained by the storage address re-mapping function, as described in greater detail below, and is read to identify the next set of Q pink blocks, following the set of blocks identified during the previous process cycle (at step 220). The first set of pink blocks should be identified in the first process cycle after device initialization. In order to ensure the availability of flush blocks, the value of Q should be greater than that of P. In one implementation, the value of Q may be 8 and P may be 4. A valid page count value is set to zero for each of the pink blocks in the set (at step 222). Storage address table (SAT) page entries that are maintained to track the LBA and DLBA relationships are scanned one at a time, to identify valid data pages that are located in any pink block in the set (at step 224). The storage address table is described in greater detail below. Valid page count values are incremented accordingly. After all SAT pages have been scanned, the valid page count values for each of the pink blocks in the set are evaluated against those for pink blocks in the list for low valid page count values, and blocks in the list are replaced by blocks from the set, if necessary (at step 226). After completion of a block flush operation, a block should be selected for the next block flush operation. This should be the block with the lowest valid page count value in the list.

Prior to beginning a block flush operation such as described with respect to FIGS. 16-17, the selected block must be mapped to determine the locations of valid DLBA runs that must be relocated. This is achieved by a search algorithm that makes use of LBA addresses in the headers of selected pages of data that are read from the block, and the SAT entries for these LBA addresses. The search algorithm makes use of a map of known valid and obsolete DLBA runs that it gradually builds up. A valid DLBA run is added to the block map when SAT entries define its presence in the block. An obsolete DLBA run is added to the block map when SAT entries for a range of LBAs in data page headers in the block being mapped define the presence of a valid DLBA in another block. The search process continues until all DLBA addresses in the block have been unambiguously mapped as valid or obsolete.

In a block flush operation, all pages within valid DLBA runs identified in the block mapping process noted above are relocated from the selected block to the relocation pointer in the relocation block. Entries for the relocated DLBAs are recorded in the SAT list. The search for valid and obsolete DLBA runs may be executed by the controller 8 of the memory system 2 in the case of the arrangement illustrated in FIG. 9, and the block DLBA map may be stored in RAM associated with the controller. For the arrangement of FIG. 10, a CPU at the host system 1 may execute the search and store the resulting block DLBA information in RAM associated with the host system CPU.

The storage address re-mapping algorithm operates on the principle that, when the number of white blocks has fallen below a predefined threshold, flush operations on pink blocks must be performed at a sufficient rate to ensure that usable white block capacity that can be allocated for the writing of data is created at the same rate as white block capacity is consumed by the writing of host data in the write block. The number of pages in the write block consumed by writing data from the host must be balanced by the number of obsolete pages recovered by block flush operations. After completion of a block flush operation, the number of pages of obsolete data in the pink block selected for the next block flush operation is determined, by reading specific entries from the BIT and SAT, as noted above. The next block flush operation is scheduled to begin immediately after the writing of this number of valid pages of data to the write block.

Storage Address Tables

In order to implement the storage address re-mapping described above, a storage address table (SAT) is used to track the location of data within the storage address space. Information in the SAT is also written as part of a sequential update to a complete flash metablock. Accordingly, in one implementation, the SAT information is written to a separate write block from the write block used for data received from the host and separate from the relocation block used for flush operations. In other implementations, the SAT information may be stored in a different group of blocks, for example blocks in a binary flash partition rather than an MLC flash partition occupied by non-SAT information. Alternatively, the SAT and non-SAT data may be stored, but segregated by block, in the same type of flash block. In yet other embodiments, SAT and non-SAT data may be intermingled in the same block.

The SAT relates to the embodiments of FIGS. 8-10, but not to FIG. 11 where the host file system writes data sequentially in logical blocks of addresses and no translation from a first logical address to a second logical address is necessary. Also, although the following discussion is focused on the re-mapping from a host LBA to a second LBA space termed the DLBA (also referred to as the storage LBA) relevant to the host and memory device configurations of FIGS. 9-10, this same SAT technique is applicable to the embodiment of FIG. 8 where data associated with the host LBA is mapped directly to physical blocks without an intervening logical-to-logical translation. The SAT information is preferably stored in flash memory in the memory device regardless of the embodiment discussed. For the embodiment of FIG. 10, where the re-mapping from host LBA to DLBA takes place on the host 180, the SAT information is transmitted for storage in flash memory in the memory device 184. For the embodiment of FIG. 8 where the storage address re-mapping algorithm is implemented in the memory manager within the memory device, the term DLBA refers to the physical address in flash memory 7 rather than to a second logical address space as used in the embodiments of FIGS. 9-10, and blocks of DLBA addresses represent metablocks in physical memory.

The storage address table (SAT) contains correlation information relating the LBA addresses assigned by a host file system to the DLBA addresses. More specifically, the SAT is used to record the mappings between every run of addresses in LBA address space that are allocated to valid data by the host file system and one or more runs of addresses in the DLBA address space 210 that are created by the storage address re-mapping algorithm. As noted above, the unit of system address space is the LBA and an LBA run is a contiguous set of LBA addresses which are currently allocated to valid data by the host file system. An LBA run is often bounded by unallocated LBA addresses, however an LBA run may be managed as multiple smaller LBA runs if required by the SAT data structure. The unit of device address space is the DLBA, and a DLBA run is a contiguous set of DLBA addresses that are mapped to contiguous LBA addresses in the same LBA run. A DLBA run is terminated at a block boundary in DLBA address space. Each LBA run is mapped to one or more DLBA runs by the SAT. The length of an LBA run is equal to the cumulative length of the DLBA runs to which it is mapped.

The SAT entry for an LBA run contains a link to an entry for the first DLBA run to which it is mapped. Subsequent DLBA runs to which it may also be mapped are sequential entries immediately following this run. A DLBA run contains a backward link to its offset address within the LBA run to which it is mapped, but not to the absolute LBA address of the LBA run. An individual LBA address can be defined as an LBA offset within an LBA run. The SAT records the LBA offset that corresponds to the beginning of each DLBA run that is mapped to the LBA run. An individual DLBA address corresponding to an individual LBA address can therefore be identified as a DLBA offset within a DLBA run. Although the LBA runs in the SAT may be for runs of valid data only, the SAT may also be configured to store LBA runs for both valid and obsolete data in other implementations.

The SAT is implemented within blocks of LBA addresses known as SAT blocks. The SAT includes a defined maximum number of SAT blocks, and contains a defined maximum number of valid SAT pages. The SAT therefore has a maximum number of DLBA runs that it may index, for a specified maximum number of SAT blocks. Although a maximum number of SAT blocks are defined, the SAT is a variable size table that is automatically scalable up to the maximum number because the number of entries in the SAT will adjust itself according to the fragmentation of the LBAs assigned by the host. Thus, if the host assigns highly fragmented LBAs, the SAT will include more entries than if the host assigns less fragmented groups of LBAs to data. Accordingly, if the host LBAs become less fragmented, the size of the SAT will decrease. Less fragmentation results in fewer separate runs to map and fewer separate runs leads to fewer entries in the SAT because the SAT maps a run of host LBA addresses to one or more DLBA runs in an entry rather than rigidly tracking and updating a fixed number logical addresses.

Figure 19:
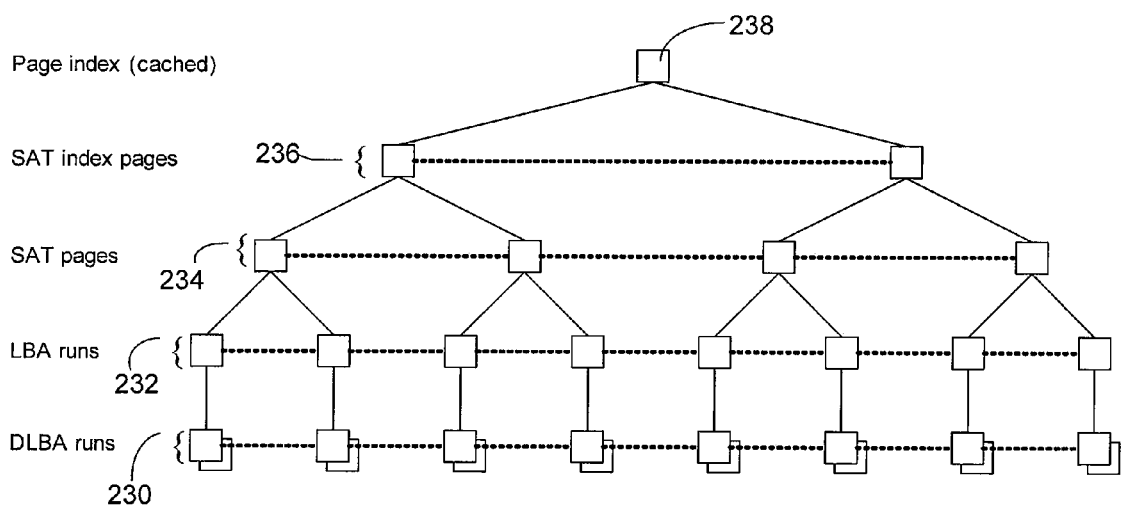
FIG. 19 illustrates a storage address table (SAT) hierarchy in an arrangement where host logical addresses are re-mapped to a second logical address space.

Due to the run to run mapping arrangement of the SAT, a run of host LBA addresses may be mapped to two or more DLBA runs, where the host LBA run is a set of contiguous logical addresses that is allocated to valid data and the DLBA (or storage LBA) run is a contiguous set of DLBA addresses within the same metablock and mapped to the same host LBA run. A hierarchy of the SAT indexing and mapping structures is illustrated in FIG. 19. The LBA 230 and corresponding DLBA 232 runs are shown. LBA to DLBA mapping information is contained in the SAT pages 234. LBA to SAT page indexing information is contained in the SAT index pages 236 and a master page index 238 is cached in RAM associated with the host processor for the implementation of FIG. 10 and in RAM associated with the controller 8 for the implementations of FIGS. 8-9.

The SAT normally comprises multiple SAT blocks, but SAT information may only be written to a single block currently designated the SAT write block. All other SAT blocks have been written in full, and may contain a combination of valid and obsolete pages. A SAT page contains entries for all LBA runs within a variable range of host LBA address space, together with entries for the runs in device address space to which they are mapped. A large number of SAT pages may exist. A SAT index page contains an index to the location of every valid SAT page within a larger range of host LBA address space. A small number of SAT index pages exist, which is typically one. Information in the SAT is modified by rewriting an updated page at the next available location in a single SAT write block, and treating the previous version of the page as obsolete. A large number of invalid pages may therefore exist in the SAT. SAT blocks are managed by algorithms for writing pages and flushing blocks that are analogous to those described above for host data.

SAT Block

Figure 20:
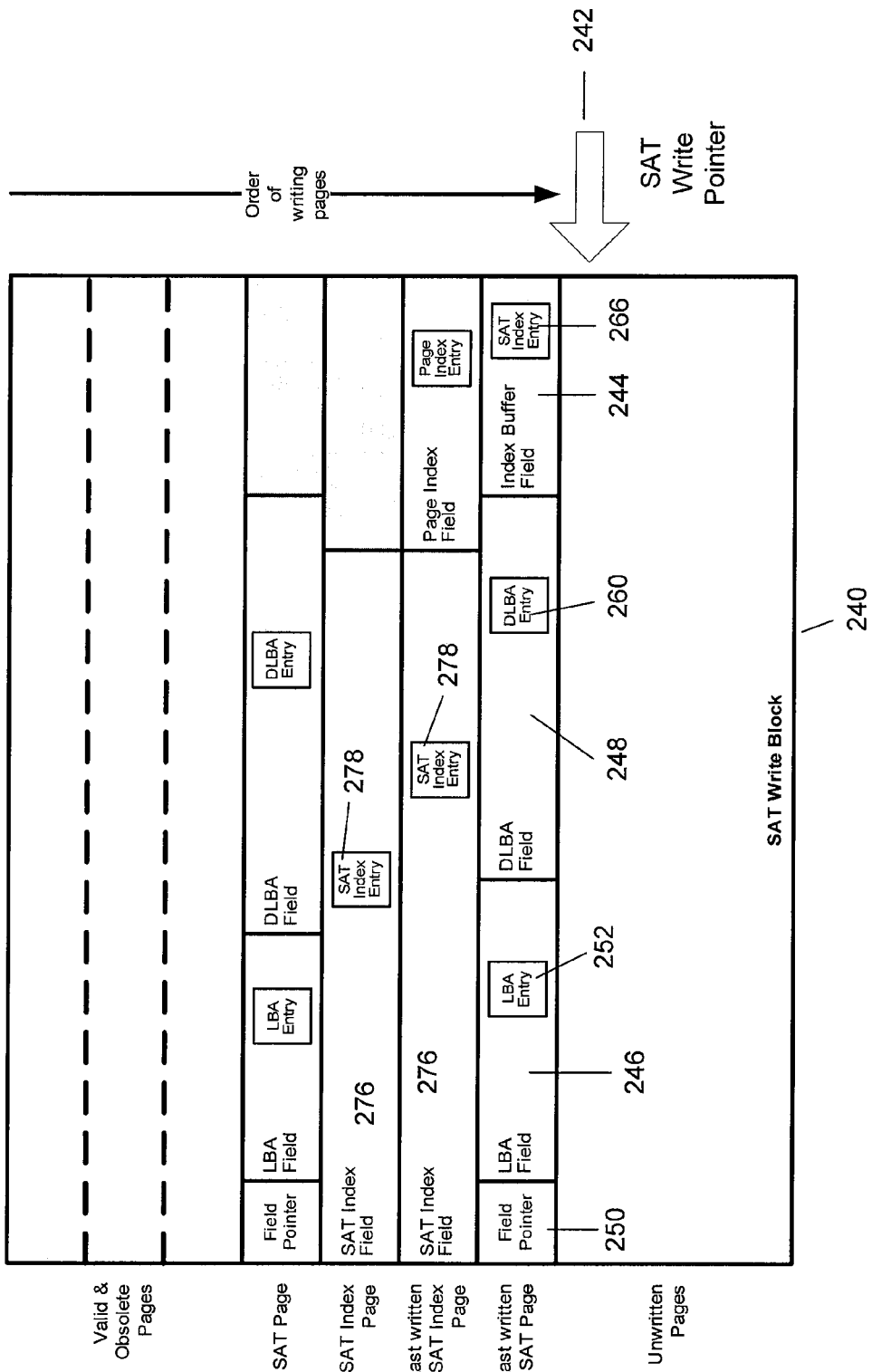
FIG. 20 illustrates a storage address table (SAT) write block used in tracking logical to logical mapping.

Each SAT block is a block of DLBA addresses that is dedicated to storage of SAT information. A SAT block is divided into table pages, into which a SAT page 234 or SAT index page 236 may be written. A SAT block may contain any combination of valid SAT pages 234, valid SAT index pages 236 and obsolete pages. Referring to FIG. 20, a sample SAT write block 240 is shown. Data is written in the SAT write block 240 at sequential locations defined by an incremental SAT write pointer 242. Data may only be written to the single SAT block that is designated as the SAT write block 240. In the same fashion as for host data write blocks described previously (e.g. item 212 in FIGS. 15-17), when the SAT write block 240 has been fully written, a white block is allocated as the new SAT write block 240. A SAT page location is addressed by its sequential number within its SAT block.

SAT Page

A SAT page 234 is the minimum updatable unit of mapping information in the SAT. An updated SAT page 234 is written at the location defined by the SAT write pointer 242. A SAT page 234 contains mapping information for a set of LBA runs with incrementing LBA addresses, although the addresses of successive LBA runs need not be contiguous. The range of LBA addresses in a SAT page 234 does not overlap the range of LBA addresses in any other SAT page 234. SAT pages 234 may be distributed throughout the complete set of SAT blocks without restriction. The SAT page 234 for any range of LBA addresses may be in any SAT block. A SAT page 234 may include an index buffer field 244, LBA field 246, DLBA field 248 and a control pointer 250. Parameter backup entries also contain values of some parameters stored in volatile RAM.

Figure 21:
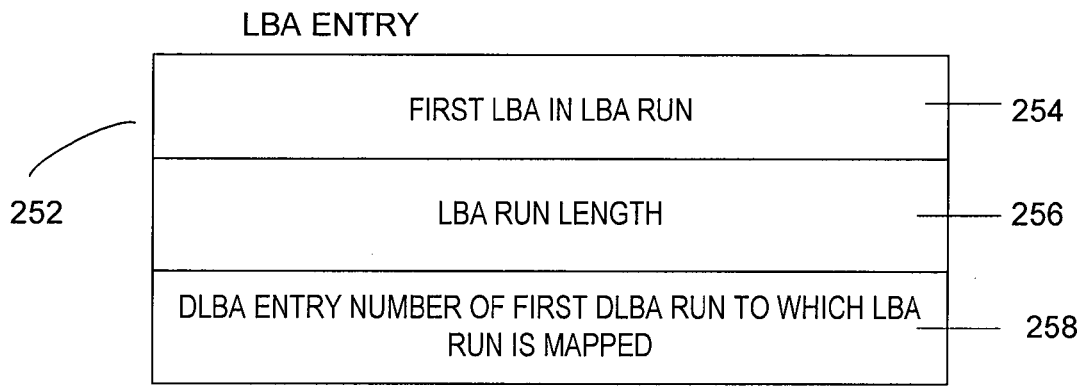
FIG. 21 is an LBA entry for use in a SAT page of the SAT table of FIG. 20.

The LBA field 246 within a SAT page 234 contains entries for runs of contiguous LBA addresses that are allocated for data storage, within a range of LBA addresses. The range of LBA addresses spanned by a SAT page 234 does not overlap the range of LBA entries spanned by any other SAT page 234. The LBA field is of variable length and contains a variable number of LBA entries. Within an LBA field 246, an LBA entry 252 exists for every LBA run within the range of LBA addresses indexed by the SAT page 234. An LBA run is mapped to one or more DLBA runs. As shown in FIG. 21, an LBA entry 252 contains the following information: first LBA in run 254, length of LBA run 256, in sectors, and DLBA entry number, within the DLBA field in the same SAT page 234, of the first DLBA run to which LBA run is mapped 258.

Figure 22:
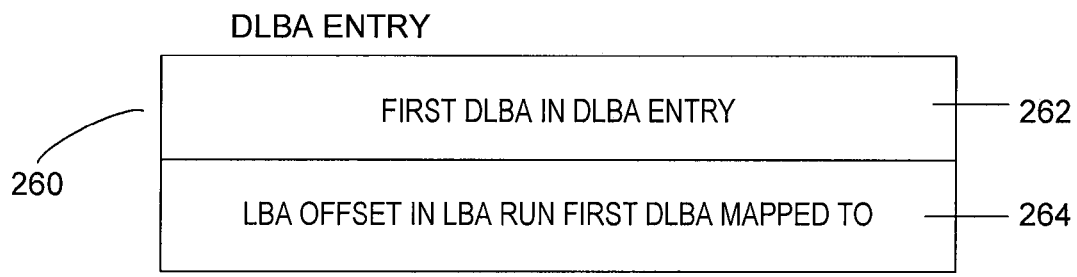
FIG. 22 is a DLBA entry for use in a SAT page of the SAT table of FIG. 20.
Figure 23:
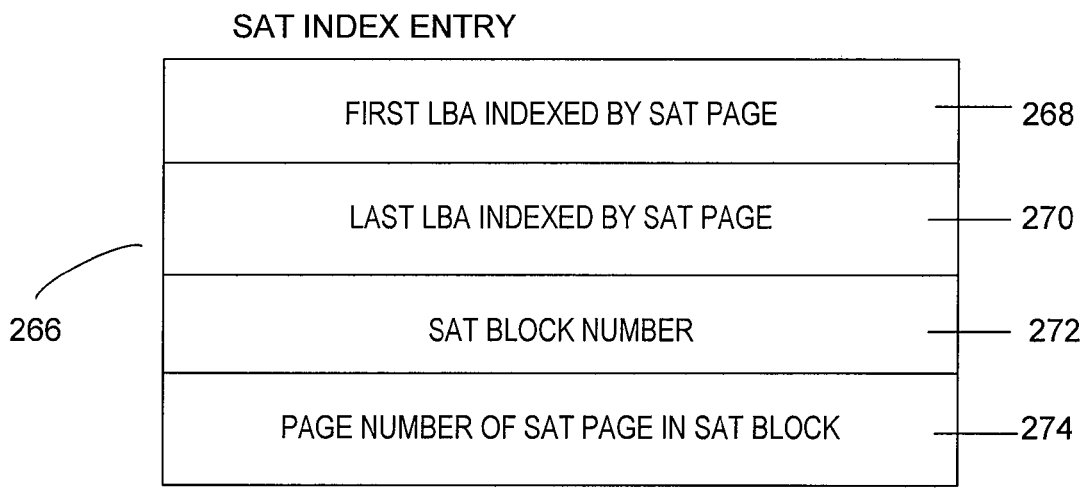
FIG. 23 is an SAT index entry for use in a SAT page of the SAT table of FIG. 20.

The DLBA field 248 within a SAT page 234 contains entries for all runs of DLBA addresses that are mapped to LBA runs within the LBA field in the same SAT page 234. The DLBA field 248 is of variable length and contains a variable number of DLBA entries 260. Within a DLBA field 248, a DLBA entry 260 exists for every DLBA run that is mapped to an LBA run within the LBA field 246 in the same SAT page 234. Each DLBA entry 260, as shown in FIG. 22, contains the following information: the first DLBA address in run 262; and LBA offset in the LBA run to which the first DLBA address is mapped 264. The SAT page/index buffer field that is written as part of every SAT page 234, but remains valid only in the most recently written SAT page 234, contains SAT index entries 266.

A SAT index entry 266 exists for every SAT page 234 in the SAT which does not currently have a valid entry in the relevant SAT index page 236. A SAT index entry is created or updated whenever a SAT page 234 is written, and is deleted when the relevant SAT index page 236 is updated. It contains the first LBA indexed 268 by the SAT page 234, the last LBA indexed 270 by the SAT page 234, SAT block number 272 containing the SAT page 234, and a page number 274 of the SAT page 234 within the SAT block. The SAT index field 276 has capacity for a fixed number of SAT index entries 278. This number determines the relative frequencies at which SAT pages 234 and SAT index pages 236 may be written. In one implementation, this fixed number may be 32.

The SAT page field pointer 250 defines the offset from the start of the LBA field to the start of the DLBA field. It contains the offset value as a number of LBA entries. Parameter backup entries in an SAT page 234 contain values of parameters stored in volatile RAM. These parameter values are used during initialization of information in RAM (associated with the controller 8 for the implementations of FIGS. 8-9, or associated with the host CPU for the implementation of FIG. 10) after a power cycle. They are valid only in the most recently written SAT page 234.

SAT Index Page

A set of SAT index pages 236 provide an index to the location of every valid SAT page 234 in the SAT. An individual SAT index page 236 contains entries 278 defining the locations of valid SAT pages relating to a range of LBA addresses. The range of LBA addresses spanned by a SAT index page 236 does not overlap the range of LBA addresses spanned by any other SAT index page 236. The entries are ordered according to the LBA address range values of the SAT pages to which they relate. A SAT index page 236 contains a fixed number of entries. SAT index pages 236 may be distributed throughout the complete set of SAT blocks without restriction. The SAT index page 236 for any range of LBA addresses may be in any SAT block. A SAT index page 236 comprises a SAT index field and a page index field.

The SAT index field 276 contains SAT index entries for all valid SAT pages within the LBA address range spanned by the SAT index page 236. A SAT index entry 278 relates to a single SAT page 234, and contains the following information: the first LBA indexed by the SAT page 234, the SAT block number containing the SAT page 234 and the page number of the SAT page 234 within the SAT block. The page index field contains page index entries for all valid SAT index pages 236 in the SAT. A page index entry exists for every valid SAT index page 236 in the SAT, and contains the following information: the first LBA indexed by the SAT index page, the SAT block number containing the SAT index page and the page number of the SAT index page within the SAT block. A page index entry is valid only in the most recently written SAT index page 236.

Temporary SAT Data Structures

Although not part of the SAT hierarchy for long term storage of address mapping shown in FIG. 19, additional data structures may be used within a hierarchical procedure for updating the SAT. One such structure is an SAT list comprising LBA entries and corresponding DLBA mappings for new entries for new address mappings resulting from update operations on LBA runs or block flush operations which have not yet been written in a SAT page 234. The SAT list may be a volatile structure in RAM. Entries in the SAT list are cleared when they are written to a SAT page 234 during a SAT page update.

Table Page

A table page is a fixed-size unit of DLBA address space within a SAT block, which is used to store either one SAT page 234 or one SAT index page 236. The minimum size of a table page is one page and the maximum size is one metapage, where page and metapage are units of DLBA address space corresponding to page and metapage in physical memory.

Entry Sizes in SAT

Sizes of entries within a SAT page 234 and SAT index page 236 are shown in Table 1.

TABLE 1

SAT Entry Sizes

| Entry | Range of Addressing | Entry Size in Bytes |
| --- | --- | --- |
| SAT page/LBA field/LBA entry/First LBA | 2048 GB | 4 |
| SAT page/LBA field/LBA entry/Run length | 32 MB | 2 |
| SAT page/LBA field/LBA entry/DLBA entry number | 64K entries | 2 |
| SAT page/DLBA field/DLBA entry/First DLBA | 2048 GB | 4 |
| SAT page/DLBA field/DLBA entry/LBA offset | 32 MB | 2 |
| SAT page/Index buffer field/SAT index entry/First LBA | 2048 GB | 4 |
| SAT page/Index buffer field/SAT index entry/Last LBA | 2048 GB | 4 |
| SAT page/Index buffer field/SAT index entry/SAT block location | 64K blocks | 2 |
| SAT page/Index buffer field/SAT index entry/SAT page location | 64K pages | 2 |
| SAT page/Field pointer | 64K entries | 2 |
| SAT index page/SAT index field/SAT index entry/First LBA | 2048 GB | 4 |
| SAT index page/SAT index field/SAT index entry/SAT block location | 64K blocks | 2 |

TABLE 1-continued

SAT Entry Sizes

| Entry | Range of Addressing | Entry Size in Bytes |
|---|---|---|
| SAT index page/SAT index field/SAT index entry/SAT page location | 64K pages | 2 |
| SAT index page/Page index field/Page index entry/First LBA | 2048 GB | 4 |
| SAT index page/Page index field/Page index entry/SAT block location | 64K blocks | 2 |
| SAT index page/Page index field/Page index entry/SAT page location | 64K pages | 2 |

Address Translation

Figure 24:
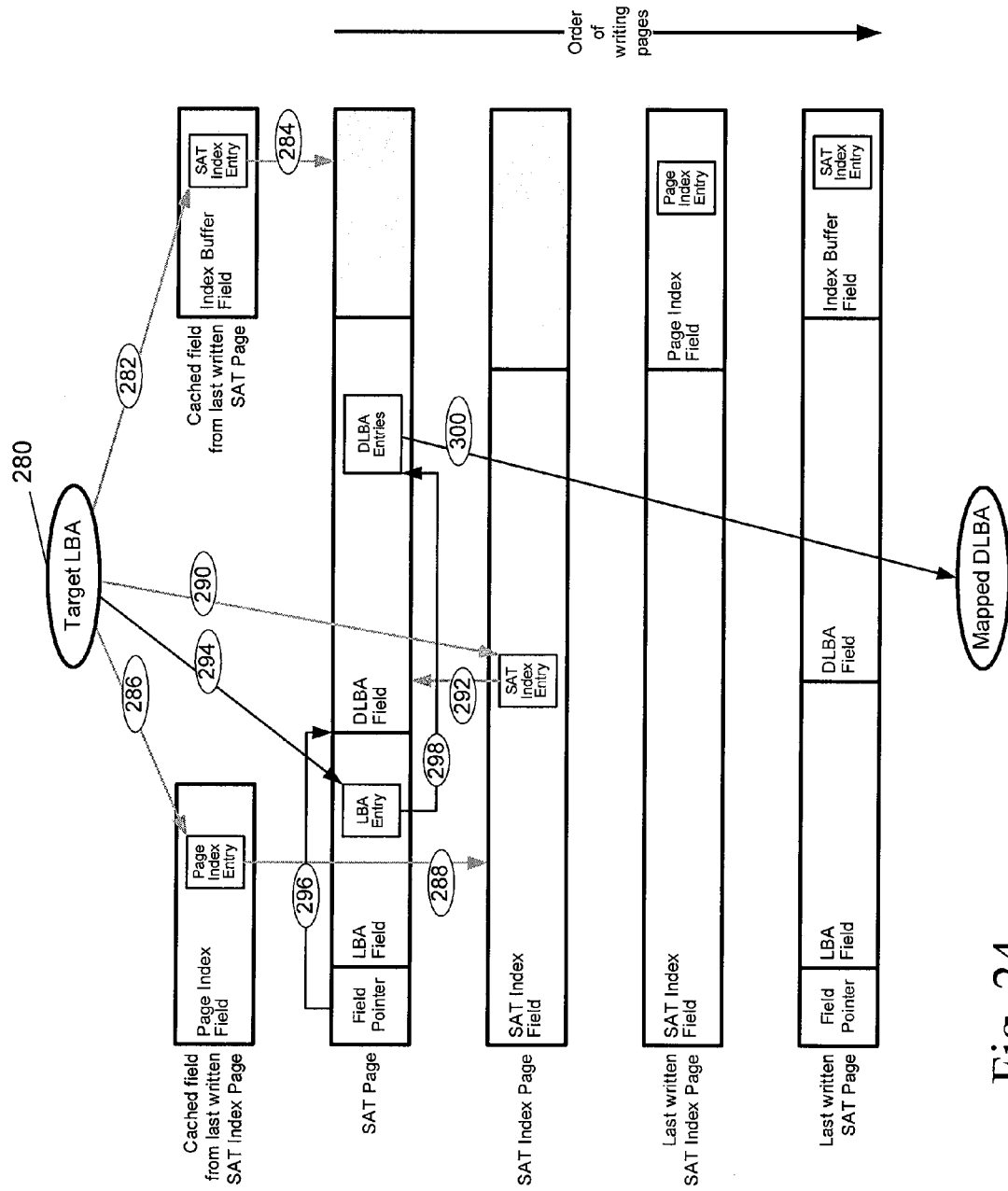
FIG. 24 illustrates a storage address table translation procedure for use in the storage address re-mapping functions of FIGS. 9 and 10.

The SAT is useful for quickly locating the DLBA address corresponding to the host file system's LBA address. In one embodiment, only LBA addresses mapped to valid data are included in the SAT. Because SAT pages 234 are arranged in LBA order with no overlap in LBA ranges from one SAT page 234 to another, a simple search algorithm may be used to quickly home in on the desired data. An example of this address translation procedure is shown in FIG. 24. A target LBA 280 is first received by the controller or processor (depending on whether the storage address re-mapping implementation is configured as in FIG. 9 or FIG. 10, respectively). In other embodiments, it is contemplated that the SAT may include LBA addresses mapped to valid data and obsolete data and track whether the data is valid or obsolete.

FIG. 24, in addition to illustrating the address translation procedure, also shows how the page index field from the last written SAT index page and the index buffer field from the last written SAT page may be configured. In the implementation of FIG. 24, these two fields are temporarily maintained in volatile memory, such as RAM in the storage device or the host. The page index field in the last written SAT index page includes pointers to every SAT index page. The index buffer field may contain a set of index entries for recently written SAT pages that haven't yet been written into an index page.

Mapping information for a target LBA address to a corresponding DLBA address is held in a specific SAT page 234 containing all mapping information for a range of LBA addresses encompassing the target address. The first stage of the address translation procedure is to identify and read this target SAT page. Referring to FIG. 24, a binary search is performed on a cached version of the index buffer field in the last written SAT page, to determine if a SAT index entry for the target LBA is present (at step 282). An entry will be present if the target SAT page has been recently rewritten, but a SAT index page incorporating a SAT index entry recording the new location of the target SAT page has not yet been written. If a SAT index entry for the target LBA is found, it defines the location of the target SAT page and this page is read (at step 284).

If no SAT index entry for the target LBA is found in step 282, a binary search is performed on a cached version of the page index field in the last written SAT index page, to locate the SAT index entry for the target LBA (at step 286). The SAT index entry for the target LBA found in step 286 defines the location of the SAT index page for the LBA address range containing the target LBA. This page is read (at step 288). A binary search is performed to locate the SAT index entry for the target LBA (at step 290). The SAT index entry for the target LBA defines the location of the target SAT page. This page is read (at step 292).

When the target SAT page has been read at either step 284 or step 292, LBA to DLBA translation may be performed as follows. A binary search is performed on the LBA field, to locate the LBA Entry for the target LBA run incorporating the target LBA. The offset of the target LBA within the target LBA run is recorded (at step 294). Information in the field pointer defines the length of the LBA field for the binary search, and also the start of the DLBA field relative to the start of the LBA field (at step 296). The LBA Entry found in step 294 defines the location within the DLBA field of the first DLBA entry that is mapped to the LBA run (at step 298). The offset determined in step 294 is used together with one of more DLBA entries located in step 298, to determine the target DLBA address (at step 300).

In another embodiment, instead of generating a separate LBA entry in the SAT for each run of LBA addresses associated with valid data, LBA address blocks may be mapped in the SAT such that each LBA address block is a single entry on the SAT. In this embodiment, complete LBA address blocks in LBA address space may be recorded in the SAT rather than just individual LBA runs. The LBA entry in this implementation would be a single entry listing the number of DLBA runs in DLBA address space that the LBA address block is mapped to and a pointer to the first DLBA run in the same SAT page. An LBA address block may be mapped to a minimum of one DLBA run or up to a maximum of the number of clusters in the LBA address block, depending on the degree of fragmentation of the data stored in the memory device.

The corresponding DLBA entries for the LBA address block would list both the DLBA block and address offset of each DLBA run and its corresponding LBA offset. Unlike the version of the SAT discussed above that records a separate LBA entry for each LBA run, where only LBA runs associated with valid data are recorded, every LBA run in an LBA address block is recorded. Thus, LBA runs in the LBA address block that are not currently allocated to valid data are recorded as well as LBA runs that are allocated to valid data. In the DLBA entry portion of the SAT page, the LBA offsets marking the beginning of an unallocated set of LBA addresses are paired with a default value in the DLBA address space. This default value for represents unallocated addresses. The same overall SAT structure and functionality, as well as the basic SAT hierarchy discussed with reference to FIGS. 19-20, applies to the LBA address block mapping implementation, however the SAT pages represent LBA address block to DLBA run mapping information rather than individual LBA run to DLBA run information. Also, the SAT index page stores LBA address block to SAT page mapping information in this implementation.

SAT Example

Figure 25:
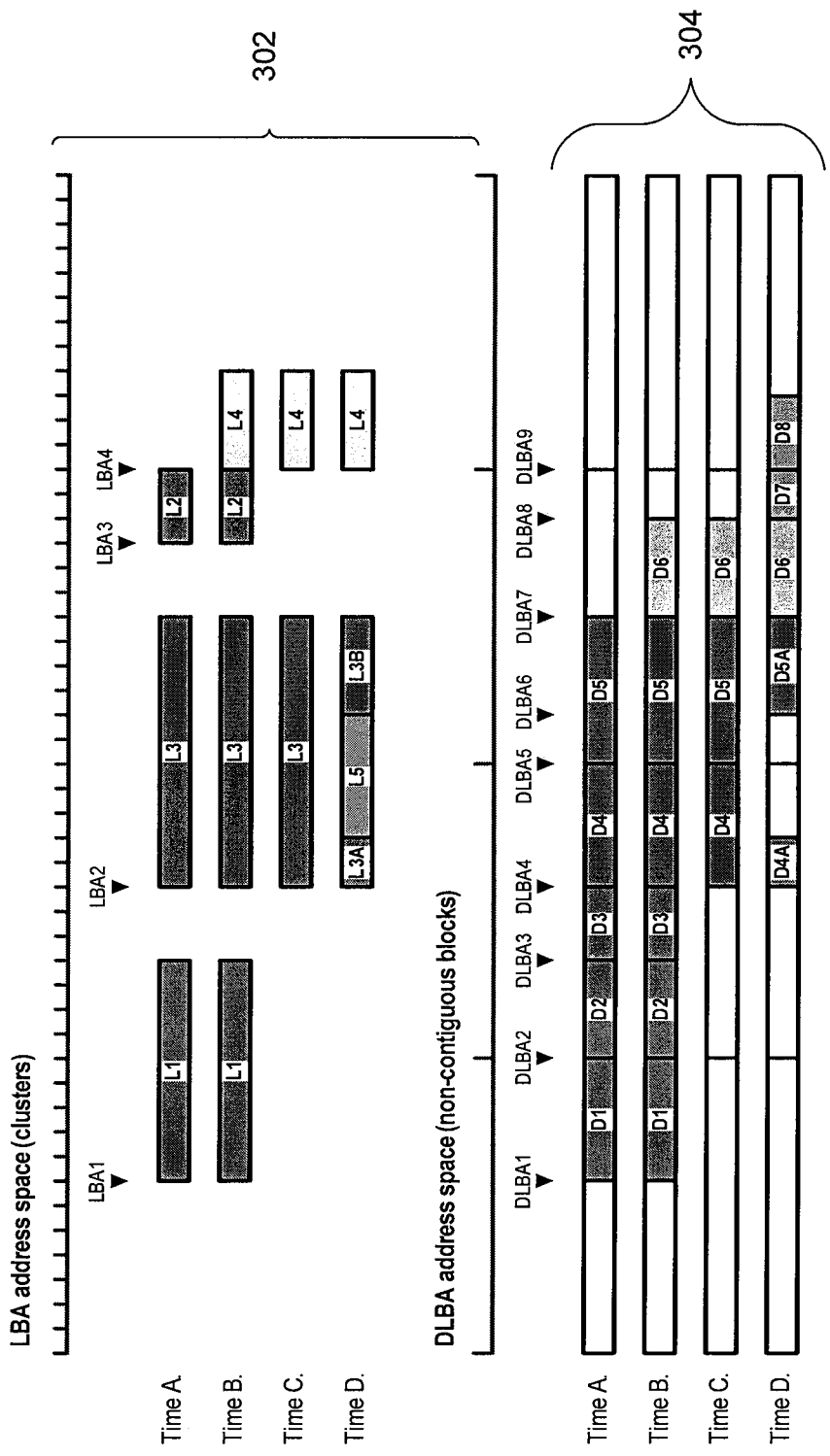
FIG. 25 is an illustration of example data write operations in LBA and DLBA address space at four instances in time.

By way of example, a data write process using the logical-to-logical storage address re-mapping technique of FIG. 9 or 10, using the individual LBA run to DLBA run mapping of FIGS. 19-23, is illustrated in FIG. 25. In FIG. 25 a LBA address space 302 and a DLBA address space 304 are illustrated for times A-D. At time A, data is written by the host in three separate LBA runs, in the sequence L1, L2 and L3. Each data run is separated from the other in LBA space 302. The three LBA runs are then re-mapped to blocks in DLBA address space as shown in the time A in the time order they were received. This example assumes that the first block of clusters in DLBA address space 304 was the current write block. Thus, LBA address run L1 is split up into DLBA address run D1 and, in another white block designated as the write block, D2. Similarly, and sequentially after D2, the LBA address run of L2 is translated into DLBA address space run D3. The last DLBA address space run L3, is then used to complete the block of clusters with DLBA address space run D4 and start a new write block with DLBA address space run D5. Referring to Table A below, the LBA to DLBA translation described so far would result in a SAT at time A where each of the LBA runs is provided with a pointer, a cluster length in LBA address space, and a DLBA pointer.

On the DLBA entry side of the SAT, each DLBA run corresponding to an LBA run is listed. In this example, there are two DLBA runs because the single LBA run of L1 has been broken into two separate blocks in DLBA address space. After each DLBA run an LBA offset number is provided so that an offset from the first LBA cluster and the DLBA marker is provided. Thus, because marker DLBA2 continues with addresses that are 5 clusters into the LBA run L1, its offset is 5 clusters. The LBA2 and LBA3 markers continue to be listed on the LBA entry side of the SAT in LBA order. Accordingly, although the data runs in DLBA address space correspond to L1, L2 and L3 where L1, L2 and L3 represent the order in which these separate runs were written, the LBA entry side of the table is organized by LBA address order and not LBA time order.

TABLE A

| LBA Entry | | | DLBA Entry | |
|---|---|---|---|---|
| LBA | Length | DLBA pointer | DLBA | LBA offset |
| LBA1 | 9 clusters | To [1] | [1] DLBA1 | 0 |
| | | | DLBA2 | 5 clusters |
| LBA2 | 11 clusters | To [2] | [2] DLBA4 | 0 |
| | | | DLBA5 | 5 clusters |
| LBA3 | 3 clusters | To [3] | [3] DLBA3 | 0 |

Referring again to FIG. 25 at time B, an additional LBA address run, L4, has been appended to L2. Runs L2 and L4 actually form a single LBA run, but are identified separately in this example for clarity. Data for L4 is written as DLBA address run D6 in the partially filled third write block after the last entry in D5. As shown at Table B, the SAT after time B simply adds the LBA4 marker at the end of the LBA entry side of the table and points to DLBA7 in the DLBA entry side.

TABLE B

| LBA Entry | | | DLBA Entry | |
|---|---|---|---|---|
| LBA | Length | DLBA pointer | DLBA | LBA offset |
| LBA1 | 9 clusters | To [1] | [1] DLBA1 | 0 |
| | | | DLBA2 | 5 clusters |
| LBA2 | 11 clusters | To [2] | [2] DLBA4 | 0 |
| | | | DLBA5 | 5 clusters |
| LBA3 | 3 clusters | To [3] | [3] DLBA3 | 0 |
| LBA4 | 4 clusters | To [4] | [4] DLBA7 | 0 |

Referring to the activity at time C in FIG. 25, the host has deleted the file or files whose data was written in LBA address runs L1 and L2. In DLBA address space 304, L1 corresponded to D1 and D2 and L2 corresponded to D3. As these runs now refer to obsolete data, the two address blocks that were, in this example, formerly red blocks are now pink blocks because of the mix of valid (red) and obsolete (white) data. As shown in Table C below, the SAT is updated accordingly. All obsolete LBA runs are removed so that only valid LBA runs remain. Because only LBA address space runs L3 and L4 remain, the LBA entry only contains markers LBA2 and LBA4 and the corresponding DLBA pointers. The DLBA entry side of the SAT also only contains the DLBA pointers needed for the valid data.

TABLE C

| LBA Entry | | | DLBA Entry | |
|---|---|---|---|---|
| LBA | Length | DLBA pointer | DLBA | LBA offset |
| LBA2 | 11 clusters | To [2] | [2] DLBA4 | 0 |
| | | | DLBA5 | 5 clusters |
| LBA4 | 4 clusters | To [4] | [4] DLBA7 | 0 |

In the last snapshot of time shown in FIG. 25, time D, the original LBA address space run L3 has been partially updated by the host with information at LBA address space L5. The corresponding DLBA address space translation is to obsolete portions of D4 and D5 so that additional white space is shown and the new LBA run of L5 is then sequentially added at the end of the current write block in DLBA address space until that block is completed and a new write block is identified so that the remainder of the LBA address space run may be translated to DLBA addresses. This results in DLBA runs D7, finishing one write block, and D8, starting a new write block. Referring to Table D below, the tables again are updated so that the LBA2 pointer in LBA space 302 still points to the first of the DLBA pointers in DLBA space 304 but the DLBA entry side includes the additional three DLBA pointers starting the DLBA runs corresponding with the rest of the DLBA addresses corresponding with L3. As no changes were made in LBA address space 302 to L4, the entry for L4, corresponding to LBA4, remains the same. It should be noted that the example of FIG. 25 appears to show contiguous blocks of clusters. Although it is possible that contiguous blocks of clusters could be available, it is expected that blocks of DLBA address space would be separated by one or more intervening blocks. The contiguous DLBA address space blocks are provided merely for convenience of illustration.

TABLE D

| LBA Entry | | | DLBA Entry | |
|---|---|---|---|---|
| LBA | Length | DLBA pointer | DLBA | LBA offset |
| LBA2 | 11 clusters | To [2] | [2] DLBA4 | 0 |
| | | | DLBA8 | 2 clusters |
| | | | DLBA9 | 4 clusters |
| | | | DLBA6 | 7 clusters |
| LBA4 | 4 clusters | To [4] | [4] DLBA7 | 0 |

A SAT flush scheme, similar to that described above for DLBA address blocks for data, is implemented to eliminate obsolete SAT information and create white blocks for reuse.

The storage address re-mapping algorithm operates on the principle that, when the number of white blocks has fallen below a predefined threshold, flush (also referred to as relocation) operations on pink blocks must be performed at a sufficient rate to ensure that usable white capacity that can be allocated for the writing of data is created at the same rate as white capacity is consumed by the writing of host data in the write block. Usable white cluster capacity that can be allocated for the writing of data is the capacity in white blocks, plus the white cluster capacity within the relocation block to which data can be written during flush operations.

If the white cluster capacity in pinks blocks that are selected for flush operations occupies x % of each pink block, the new usable capacity created by a flush operation on one pink block is one complete white block that is created from the pink block, minus (100−x) % of a block that is consumed in the relocation block by relocation of data from the block being flushed. A flush operation on a pink block therefore creates x % of a white block of new usable capacity. Therefore, for each write block that is filled by host data that is written, flush operations must be performed on 100/x pink blocks, and the data that must be relocated is (100−x)/x blocks. The ratio of sectors programmed to sectors written by the host is therefore approximately defined as 1+(100−x)/x.

The percentage of white cluster capacity in an average pink block is determined by the percentage of the total device capacity that is used, and the percentage of the blocks containing data that are red blocks. For example, if the device is 80% full, and 30% of blocks containing data are red blocks, then pink blocks comprise 26.2% white cluster capacity. It is likely unequal distribution of deleting data at LBA addresses in the device will result in some pink blocks having twice the average % of white capacity. Therefore, in this example, pink blocks selected for flush operations will have 52.4% white capacity, i.e. x=52.4, and the ratio of sectors programmed per sector of data written by the host will be 1.90.

When determining which pink blocks to flush, whether host data pink blocks or SAT pink blocks, the storage address re-mapping algorithm may detect designation of unallocated addresses by monitoring the $bitmap file that is written by NTFS. Flush operations may be scheduled in two ways. Preferably, the flush operation acts as a background operation, and thus functions only while the SSD or other portable flash memory device is idle so that host data write speeds are not affected. Alternatively, the flush operation may be utilized in a foreground operation that is active when the host is writing data. If flush operations are arranged as foreground operations, these operations may be automatically suspended when host activity occurs or when a "flush cache" command signifies potential power-down of the SSD or portable flash memory device. The foreground and background flush operation choice may be a dynamic decision, where foreground operation is performed when a higher flush rate is required than can be achieved during the idle state of the memory device. For example, the host or memory device may toggle between foreground and background flush operations so that the flush rate is controlled to maintain constant host data write speed until the memory device is full. The foreground flush operation may be interleaved with host data write operations. For example, if insufficient idle time is available because of sustained activity at the host interface, the relocation of data pages to perform a block flush operation may be interleaved in short bursts with device activity in response to host commands.

SAT Update Procedure

Elements within the SAT data structures are updated using the hierarchical procedure shown in Table 2.

TABLE 2

Hierarchy of Update Structures for the SAT

| Structure | Location | Content | Update Trigger |
| --- | --- | --- | --- |
| DLBA runs | Write block or relocation block | Host data | Determined by host |
| SAT list | RAM | LBA-to-DLBA mapping entries, not yet written in SAT page | When DLBA run is written to write block or relocation block |
| SAT page | SAT write block | LBA-to-DLBA mapping entries | When SAT list is full, or when a specified amount of host data has been written as DLBA runs |
| SAT index buffer | Last written SAT page | SAT index entries, not yet written in SAT index page | When any SAT page is written |
| SAT index page | SAT write block | SAT index entries | When SAT index buffer becomes full, or when a specified number of SAT index pages need to be updated |

As noted in Table 2, except for DLBA run updates, the SAT updates for a particular structure are triggered by activity in a lower order structure in the SAT hierarchy. The SAT list is updated whenever data associated with a complete DLBA run is written to a write block. One or more SAT pages are updated when the maximum permitted number of entries exists in the SAT list. When a SAT page is updated, one or more entries from the SAT list are added to the SAT page, and removed from the SAT list. The SAT pages that are updated when the SAT list is full may be divided into a number of different groups of pages, and only a single group need be updated in a single operation. This can help minimize the time that SAT update operations may delay data write operations from the host. In this case, only the entries that are copied from the SAT list to the group of SAT pages that have been updated are removed from the SAT list. The size of a group of updated SAT pages may be set to a point that does not interfere with the host system's 1 ability to access the memory system 2. In one implementation the group size may be 4 SAT pages.

The SAT index buffer field is valid in the most recently written SAT page. It is updated without additional programming whenever a SAT page is written. Finally, when the maximum permitted number of entries exist in the SAT index buffer, a SAT index page is updated. During an SAT index page update, one or more entries from the SAT index buffer are added to the SAT index page, and removed from the SAT index buffer. As noted above with respect to update of SAT pages, the SAT index pages that must be updated may be divided into a number of different groups of pages, and only a single group need be updated in a single operation. This minimizes the time that SAT update operations may delay data write operations from the host. Only the entries that are copied from the SAT index buffer to the group of SAT index pages that have been updated are removed from the SAT index buffer. The size of a group of updated SAT index pages may be 4 pages in one implementation.

The number of entries that are required within the LBA range spanned by a SAT page or a SAT index page is variable, and may change with time. It is therefore not uncommon for a page in the SAT to overflow, or for pages to become very lightly populated. These situations may be managed by schemes for splitting and merging pages in the SAT.

When entries are to be added during update of a SAT page or SAT index page, but there is insufficient available unused space in the page to accommodate the change, the page is split into two. A new SAT page or SAT index page is introduced, and LBA ranges are determined for the previously full page and the new empty page that will give each a number of entries that will make them half full. Both pages are then written, in a single programming operation, if possible. Where the pages are SAT pages, SAT index entries for both pages are included in the index buffer field in the last written SAT page. Where the pages are SAT index pages, page index entries are included in the page index field in the last written SAT index page.

When two or more SAT pages, or two SAT index pages, with adjacent LBA ranges are lightly populated, the pages may be merged into a single page. Merging is initiated when the resultant single page would be no more than 80% filled. The LBA range for the new single page is defined by the range spanned by the separate merged pages. Where the merged pages are SAT pages, SAT index entries for the new page and merged pages are updated in the index buffer field in the last written SAT page. Where the pages are SAT index pages, page index entries are updated in the page index field in the last written SAT index page.

After a power cycle, i.e. after power has been removed and restored, it is necessary to reconstruct the SAT list in RAM to exactly the same state it was in prior to the power cycle. This may be accomplished by scanning all write blocks and relocation blocks to identify additional data that has been written since the last SAT page update, from the LBA address information in the data headers. The locations of these blocks and the positions of write and relocation pointers within them at the time of the last SAT page update are also recorded in a field in the last written SAT page. Scanning need therefore only be started at the positions of these pointers.

Flushing SAT Blocks

Figure 26:
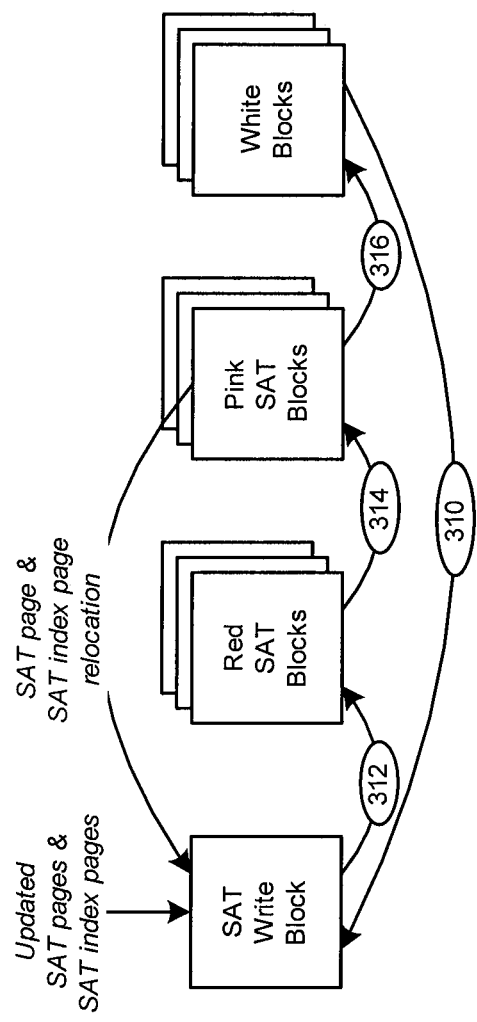
FIG. 26 illustrates a state diagram of SAT block transitions.

The process of flushing SAT blocks is similar to the process described above for data received from the host, but operates only on SAT blocks. Updates to the SAT brought about by the storage address re-mapping write and flush algorithms cause SAT blocks to make transitions between block states as shown in FIG. 26. First, a white block from the white block list is allocated as the SAT write block (at 310). When the last page in the SAT write block has been allocated, the block becomes a red SAT block (at 312). It is possible that the SAT write block may also make the transition to a pink SAT block if some pages within it have already become obsolete. However, for purposes of clarity, that transition is not shown in FIG. 26. One or more pages within a red SAT block are made obsolete when a SAT page or SAT index page is updated and the red SAT block becomes a pink SAT block (at 314). When a flush operation on a selected pink SAT block has been completed, the pink SAT block becomes a white block (at 316).

The process of selecting which SAT blocks will be subject to a flushing procedure will now be described. A SAT block containing a low number of valid pages or clusters is selected as the next SAT block to be flushed. The block should be amongst the 5% of SAT blocks with the lowest number of valid pages. Selection of a block may be accomplished by a background process that builds a list of the 16 SAT blocks with lowest valid page count values. This process should preferably complete one cycle in the time occupied by M scheduled SAT block flush operations.

Figure 27:
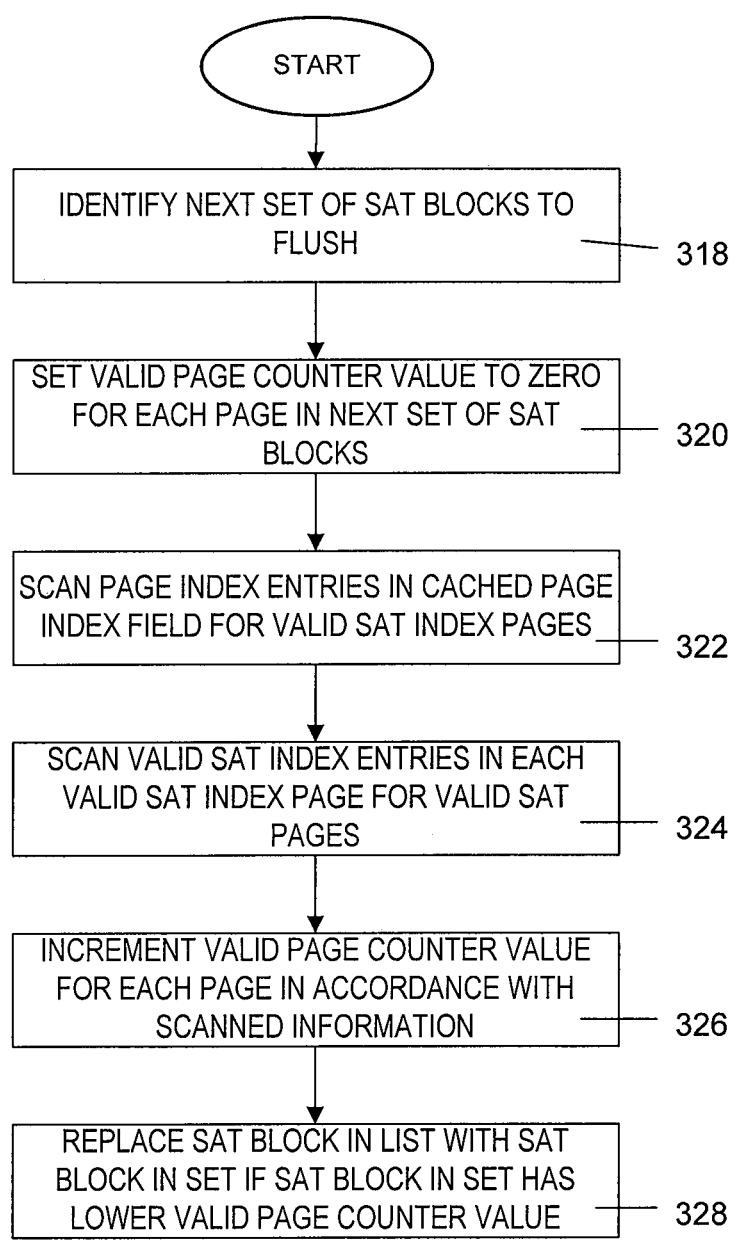
FIG. 27 is a flow diagram of a process for determining SAT block flush order.

An example of the activity taking place in one cycle of the background process for determining which SAT blocks to flush next is illustrated in FIG. 27. First, the block information table (BIT) is scanned to identify the next set of N SAT blocks, following the set of blocks identified during the previous process cycle (at step 318). The first set of SAT blocks should be identified in the first process cycle after device initialisation. The value of N may be selected as appropriate for the particular application and is preferably greater than the value selected for M in order to ensure the availability of SAT flush blocks. As one example, M may be 4 and N may be 8. A valid page count value is set to zero for each of the SAT blocks in the set (at step 320). Page index entries are then scanned in the cached page index field, to identify valid SAT index pages that are located in any SAT block in the set (at step 322). Valid page count values are incremented accordingly. SAT index entries are scanned in each SAT index page in turn, to identify valid SAT pages that are located in any SAT block in the set (at step 324). Valid page count values are incremented accordingly (at step 326). After the page index and SAT index pages are scanned to determine the valid page count values, the valid page count values for each of the SAT blocks in the set are evaluated against those for SAT blocks in the list for low valid page count values, and blocks in the list are replaces by blocks from the set, if necessary (at step 328). When a SAT block flush operation should be scheduled, the block with the lowest valid page count value in the list is selected.

In a SAT block flush operation, all valid SAT index pages and SAT pages are relocated from the selected block to the SAT write pointer 242. The page index field is updated only in the last written SAT index page. In order for the number of SAT blocks to be kept approximately constant, the number of pages in the SAT consumed by update operations on SAT pages and SAT index pages must be balanced by the number of obsolete SAT pages and SAT index pages recovered by SAT block flush operations. The number of pages of obsolete information in the SAT block selected for the next SAT flush operation is determined as discussed with reference to FIG. 27 above. The next SAT block flush operation may be scheduled to occur when the same number of valid pages of information has been written to the SAT since the previous SAT flush operation.

Block Information Table (BIT)

The Block Information Table (BIT) is used to record separate lists of block addresses for white blocks, pink blocks, and SAT blocks. A BIT write block contains information on where all other BIT blocks are located. In one implementation, it is desirable for the storage address re-mapping algorithm and associated system to maintain a list of white blocks to allow selection of blocks to be allocated as write blocks, relocation blocks or SAT blocks. It is also desirable to maintain a list of pink blocks, to allow selection of pink blocks and SAT blocks to be the subject of block flush operations. These lists are maintained in a BIT whose structure closely mirrors that of the SAT.

BIT Data Structures

The BIT is implemented within blocks of DLBA addresses known as BIT blocks. Block list information is stored within BIT pages, and "DLBA block to BIT page" indexing information is stored within BIT index pages. BIT pages and BIT index pages may be mixed in any order within the same BIT block. The BIT may consist of multiple BIT blocks, but BIT information may only be written to the single block that is currently designated as the BIT write block. All other BIT blocks have previously been written in full, and may contain a combination of valid and obsolete pages. A BIT block flush scheme, identical to that for SAT blocks described above, is implemented to eliminate pages of obsolete BIT information and create white blocks for reuse.

BIT Block

Figure 28:
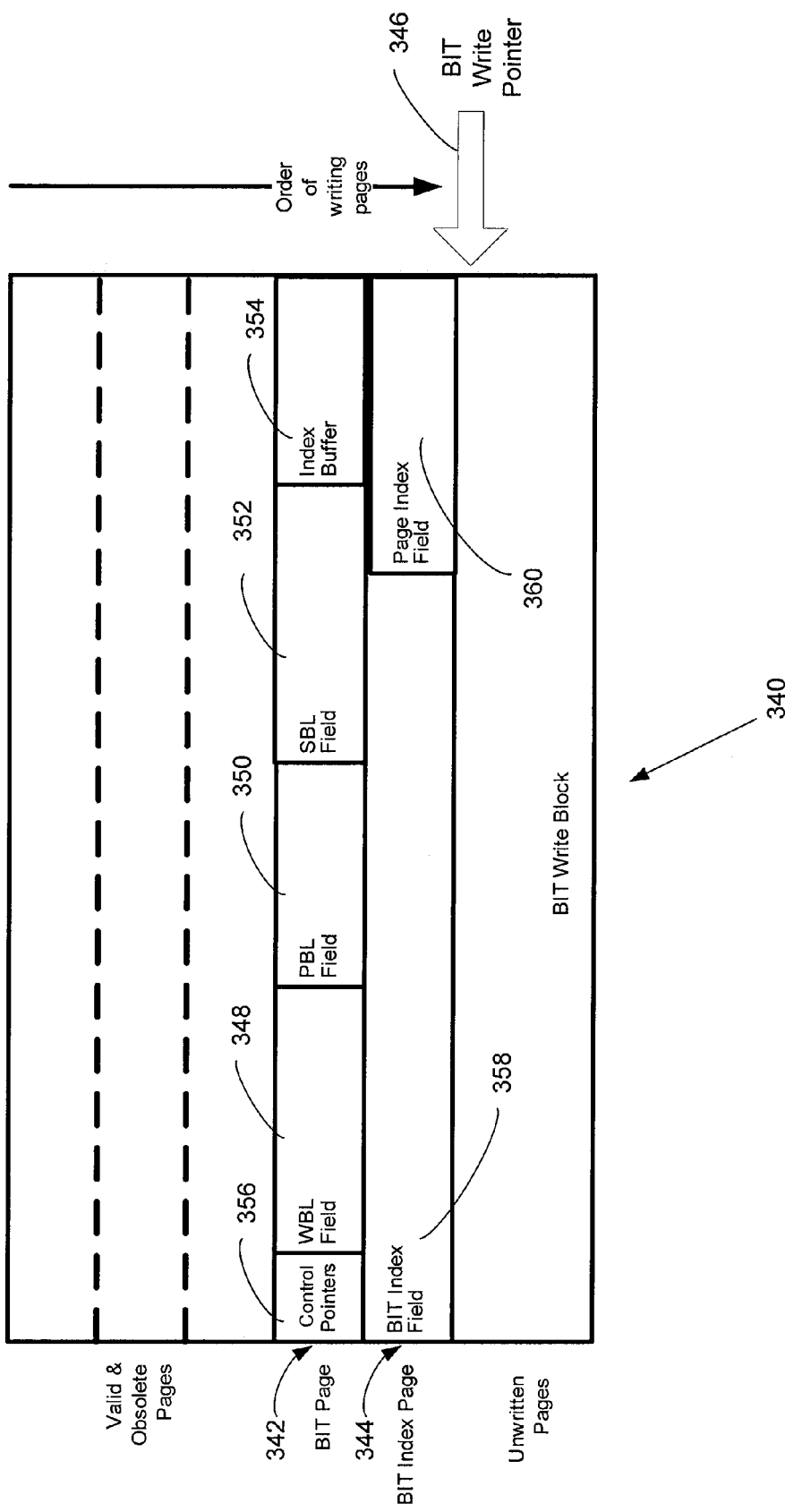
FIG. 28 illustrates a block information table (BIT) write block.

A BIT block, as shown in FIG. 28, is a block of DLBA addresses that is dedicated to storage of BIT information. It may contain BIT pages 342 and BIT index pages 344. A BIT block may contain any combination of valid BIT pages, valid BIT index pages, and obsolete pages. BIT information may only be written to the single BIT block that is designated as the BIT write block 340. BIT information is written in the BIT write block 340 at sequential locations defined by an incremental BIT write pointer 346. When the BIT write block 340 has been fully written, a white block is allocated as the new BIT write block. The blocks composing the BIT are each identified by their BIT block location, which is their block address within the population of blocks in the device. A BIT block is divided into table pages, into which a BIT page 342 or BIT index page 344 may be written. A BIT page location is addressed by its sequential number within its BIT block. BIT information may be segregated from non-BIT information in different blocks of flash memory, may be segregated to a different type of block (e.g. binary vs. MLC) than non-BIT information, or may be mixed with non-BIT information in a block.

BIT Page

A BIT page 342 is the minimum updatable unit of block list information in the BIT. An updated BIT page is written at the location defined by the BIT write pointer 346. A BIT page 342 contains lists of white blocks, pink blocks and SAT blocks with DLBA block addresses within a defined range, although the block addresses of successive blocks in any list need not be contiguous. The range of DLBA block addresses in a BIT page does not overlap the range of DLBA block addresses in any other BIT page. BIT pages may be distributed throughout the complete set of BIT blocks without restriction. The BIT page for any range of DLBA addresses may be in any BIT block. A BIT page comprises a white block list (WBL) field 348, a pink block list (PBL) field 350, a SAT block list (SBL) field 352 and an index buffer field 354, plus two control pointers 356. Parameter backup entries also contain values of some parameters stored in volatile RAM.

The WBL field 348 within a BIT page 342 contains entries for blocks in the white block list, within the range of DLBA block addresses relating to the BIT page 342. The range of DLBA block addresses spanned by a BIT page 342 does not overlap the range of DLBA block addresses spanned by any other BIT page 342. The WBL field 348 is of variable length and contains a variable number of WBL entries. Within the WBL field, a WBL entry exists for every white block within the range of DLBA block addresses indexed by the BIT page 342. A WBL entry contains the DLBA address of the block.

The PBL field 350 within a BIT page 342 contains entries for blocks in the pink block list, within the range of DLBA block addresses relating to the BIT page 342. The range of DLBA block addresses spanned by a BIT page 342 does not overlap the range of DLBA block addresses spanned by any other BIT page 342. The PBL field 350 is of variable length and contains a variable number of PBL entries. Within the PBL field 350, a PBL entry exists for every pink block within the range of DLBA block addresses indexed by the BIT page 342. A PBL entry contains the DLBA address of the block.

The SBL 352 field within a BIT page contains entries for blocks in the SAT block list, within the range of DLBA block addresses relating to the BIT page 342. The range of DLBA block addresses spanned by a BIT page 342 does not overlap the range of DLBA block addresses spanned by any other BIT page 342. The SBL field 352 is of variable length and contains a variable number of SBL entries. Within the SBL field 352, a SBL entry exists for every SAT block within the range of DLBA block addresses indexed by the BIT page 352. A SBL entry contains the DLBA address of the block.

An index buffer field 354 is written as part of every BIT page 342, but remains valid only in the most recently written BIT page. The index buffer field 354 of a BIT page 342 contains BIT index entries. A BIT index entry exists for every BIT page 342 in the BIT which does not currently have a valid entry in the relevant BIT index page 344. A BIT index entry is created or updated whenever a BIT page 342 is written, and is deleted when the relevant BIT index page 344 is updated. The BIT index entry may contain the first DLBA block address of the range indexed by the BIT page 342, the last DLBA block address of the range indexed by the BIT page 342, the BIT block location containing the BIT page 342 and the BIT page location of the BIT page within the BIT block. The index buffer field 354 has capacity for a fixed number of BIT index entries, provisionally defined as 32. This number determines the relative frequencies at which BIT pages 342 and BIT index pages 344 may be written.

The control pointers 356 of a BIT page 342 define the offsets from the start of the WBL field 348 of the start of the PBL field 350 and the start of the SBL field 352. The BIT page 342 contains offset values as a number of list entries.

BIT Index Page

A set of BIT index pages 344 provide an index to the location of every valid BIT page 342 in the BIT. An individual BIT index page 344 contains entries defining the locations of valid BIT pages relating to a range of DLBA block addresses. The range of DLBA block addresses spanned by a BIT index page does not overlap the range of DLBA block addresses spanned by any other BIT index page 344. The entries are ordered according to the DLBA block address range values of the BIT pages 342 to which they relate. A BIT index page 344 contains a fixed number of entries.

BIT index pages may be distributed throughout the complete set of BIT blocks without restriction. The BIT index page 344 for any range of DLBA block addresses may be in any BIT block. A BIT index page 344 comprises a BIT index field 358 and a page index field 360. The BIT index field 358 contains BIT index entries for all valid BIT pages within the DLBA block address range spanned by the BIT index page 344. A BIT index entry relates to a single BIT page 342, and may contain the first DLBA block indexed by the BIT page, the BIT block location containing the BIT page and the BIT page location of the BIT page within the BIT block.

The page index field 360 of a BIT index page 344 contains page index entries for all valid BIT index pages in the BIT. A BIT page index entry exists for every valid BIT index page 344 in the BIT, and may contain the first DLBA block indexed by the BIT index page, the BIT block location containing the BIT index page and the BIT page location of the BIT index page within the BIT block.

Maintaining the BIT

A BIT page 342 is updated to add or remove entries from the WBL 348, PBL 350 and SBL 352. Updates to several entries may be accumulated in a list in RAM and implemented in the BIT in a single operation, provided the list may be restored to RAM after a power cycle. The BIT index buffer field is valid in the most recently written BIT page. It is updated without additional programming whenever a BIT page is written. When a BIT index page is updated, one or more entries from the BIT index buffer are added to the BIT index page, and removed from the BIT index buffer. One or more BIT index pages 344 are updated when the maximum permitted number of entries exists in the BIT index buffer.

The number of entries that are required within the DLBA block range spanned by a BIT page 342 or a BIT index page 344 is variable, and may change with time. It is therefore not uncommon for a page in the BIT to overflow, or for pages to become very lightly populated. These situations are managed by schemes for splitting and merging pages in the BIT.

When entries are to be added during update of a BIT page 342 or BIT index page 344, but there is insufficient available unused space in the page to accommodate the change, the page is split into two. A new BIT page 342 or BIT index page 344 is introduced, and DLBA block ranges are determined for the previously full page and the new empty page that will give each a number of entries that will make them half full. Both pages are then written, in a single programming operation, if possible. Where the pages are BIT pages 342, BIT index entries for both pages are included in the index buffer field in the last written BIT page. Where the pages are BIT index pages 344, page index entries are included in the page index field in the last written BIT index page.

Conversely, when two or more BIT pages 342, or two BIT index pages 344, with adjacent DLBA block ranges are lightly populated, the pages may be merged into a single page. Merging is initiated when the resultant single page would be no more than 80% filled. The DLBA block range for the new single page is defined by the range spanned by the separate merged pages. Where the merged pages are BIT pages, BIT index entries for the new page and merged pages are updated in the index buffer field in the last written BIT page. Where the pages are BIT index pages, page index entries are updated in the page index field in the last written BIT index page.

Flushing BIT Blocks

The process of flushing BIT blocks closely follows that described above for SAT blocks and is not repeated here.

Control Block

In other embodiments, BIT and SAT information may be stored in different pages of the same block. This block, referred to as a control block, may be structured so that a page of SAT or BIT information occupies a page in the control block. The control block may consist of page units having an integral number of pages, where each page unit is addressed by its sequential number within the control block. A page unit may have a minimum size in physical memory of one page and a maximum size of one metapage. The control block may contain any combination of valid SAT pages, SAT index pages, BIT pages, BIT Index pages, and obsolete pages. Thus, rather than having separate SAT and BIT blocks, both SAT and BIT information may be stored in the same block or blocks. As with the separate SAT and BIT write blocks described above, control information (SAT or BIT information) may only be written to a single control write block, a control write pointer would identify the next sequential location for receiving control data, and when a control write block is fully written a write block is allocated as the new control write block. Furthermore, control blocks may each be identified by their block address in the population of binary blocks in the memory system 2. Control blocks may be flushed to generate new unwritten capacity in the same manner as described for the segregated SAT and BIT blocks described above, with the difference being that a relocation block for a control block may accept pages relating to valid SAT or BIT information. Selection and timing of an appropriate pink control block for flushing may be implemented in the same manner as described above for the SAT flush process.

Monitoring LBA Allocation Status

The storage address re-mapping algorithm records address mapping information only for host LBA addresses that are currently allocated by the host to valid data. It is therefore necessary to determine when clusters are de-allocated from data storage by the host, in order to accurately maintain this mapping information.

In one embodiment, a command from the host file system may provide information on de-allocated clusters to the storage address re-mapping algorithm. For example, a "Dataset" Command has been proposed for use in Microsoft Corporation's Vista operating system. A proposal for "Notification of Deleted Data Proposal for ATA8-ACS2" has been submitted by Microsoft to T13. This new command is intended to provide notification of deleted data. A single command can notify a device of deletion of data at contiguous LBA addresses, representing up to 2 GB of obsolete data.

Interpreting NTFS Metadata

If a host file system command such as the trim command is not available, LBA allocation status may be monitored by tracking information changes in the $bitmap system file written by NTFS, which contains a bitmap of the allocation status of all clusters on the volume. One example of tracking the $bitmap changes in personal computers (PCs) is now discussed.

Partition Boot Sector

The partition boot sector is sector 0 on the partition. The field at byte offset 0x30 contains the logical cluster number for the start of the Master File Table (MFT), as in the example to Table 3.

TABLE 3

| Byte offset in partition boot sector | | | | | | | | MFT |
|---|---|---|---|---|---|---|---|---|
| 0x30 | 0x31 | 0x32 | 0x33 | 0x34 | 0x35 | 0x36 | 0x37 | cluster |
| D2 | 4F | 0C | 00 | 00 | 00 | 00 | 00 | 0xC4FD2 |

A $bitmap Record in MFT

A system file named $bitmap contains a bitmap of the allocation status of all clusters on the volume. The record for the $bitmap file is record number 6 in the MFT. An MFT record has a length of 1024 bytes. The $bitmap record therefore has an offset of decimal 12 sectors relative to the start of the MFT. In the example above, the MFT starts at cluster 0xC4FD2, or 806866 decimal, which is sector 6454928 decimal. The $bitmap file record therefore starts at sector 6454940 decimal.

The following information exists within the $bitmap record (in the example being described). The field at byte offset 0x141 to 0x142 contains the length in clusters of the first data attribute for the $bitmap file, as in the example of Table 4.

TABLE 4

| Byte offset in $bitmap record | | Data attribute |
|---|---|---|
| 0x141 | 0x142 | length |
| FB | 00 | 0xFB |

The field at byte offset 0x143 to 0x145 contains the cluster number of the start of the first data attribute for the $bitmap file, as in the example of Table 5.

TABLE 5

| Byte offset in $bitmap record | | | Data attribute |
|---|---|---|---|
| 0x143 | 0x144 | 0x145 | cluster |
| 49 | 82 | 3E | 0x3E8249 |

The field at byte offset 0x147 to 0x148 contains the length in clusters of the second data attribute for the $bitmap file, as in the example of Table 6.

TABLE 6

| Byte offset in $bitmap record | | Data attribute |
|---|---|---|
| 0x147 | 0x148 | length |
| C4 | 00 | 0xC4 |

The field at byte offset 0x149 to 0x148 contains the number of clusters between the start of the first data attribute for the $bitmap file and the start of the second data attribute, as in the example of Table 7.

TABLE 7

| Byte offset in $bitmap record | | | Data attribute cluster |
|---|---|---|---|
| 0x149 | 0x14A | 0x14B | jump |
| 35 | 82 | 3E | 0x3E8235 |

Data Attributes for $bitmap File

The sectors within the data attributes for the $bitmap file contain bitmaps of the allocation status of every cluster in the volume, in order of logical cluster number. '1' signifies that a cluster has been allocated by the file system to data storage, '0' signified that a cluster is free. Each byte in the bitmap relates to a logical range of 8 clusters, or 64 decimal sectors. Each sector in the bitmap relates to a logical range of 0x100 (4096 decimal) clusters, or 0x8000 (32768 decimal) sectors. Each cluster in the bitmap relates to a logical range of 0x8000 (32768 decimal) clusters, or 0x40000 (262144 decimal) sectors.

Maintaining Cluster Allocation Status

Whenever a write operation from the host is directed to a sector within the data attributes for the $bitmap file, the previous version of the sector must be read from the storage device and its data compared with the data that has just been written by the host. All bits that have toggled from the "1" state to the "0" state must be identified, and the corresponding logical addresses of clusters that have been de-allocated by the host determined. Whenever a command, such as the proposed trim command, or NTFS metadata tracking indicates that there has been cluster deallocation by the host, the storage address table (SAT) must be updated to record the de-allocation of the addresses for the designated clusters.

Logical to Physical Mapping

The above discussion has focused primarily on an implementation of storage address re-mapping where a logical to logical mapping, from host LBA address space to DLBA address space (also referred to as storage LBA space), is desired. As noted above, the embodiment of FIG. 8, where the mapping algorithm is incorporated into the memory manager of the memory device rather than in a separate application on the memory device or host as in FIGS. 9-10, respectively, maps from host LBA to physical addresses in the memory system 2. In the embodiment of FIG. 8, the DLBA discussed above is replaced physical memory address rather than an intermediate logical address. The storage re-mapping algorithm in the arrangement of FIG. 8 is part of the memory controller 8 in the memory system 2 rather than a separate application on the memory system 2 or the host 1 (FIGS. 9 and 10, respectively).

Figure 29:
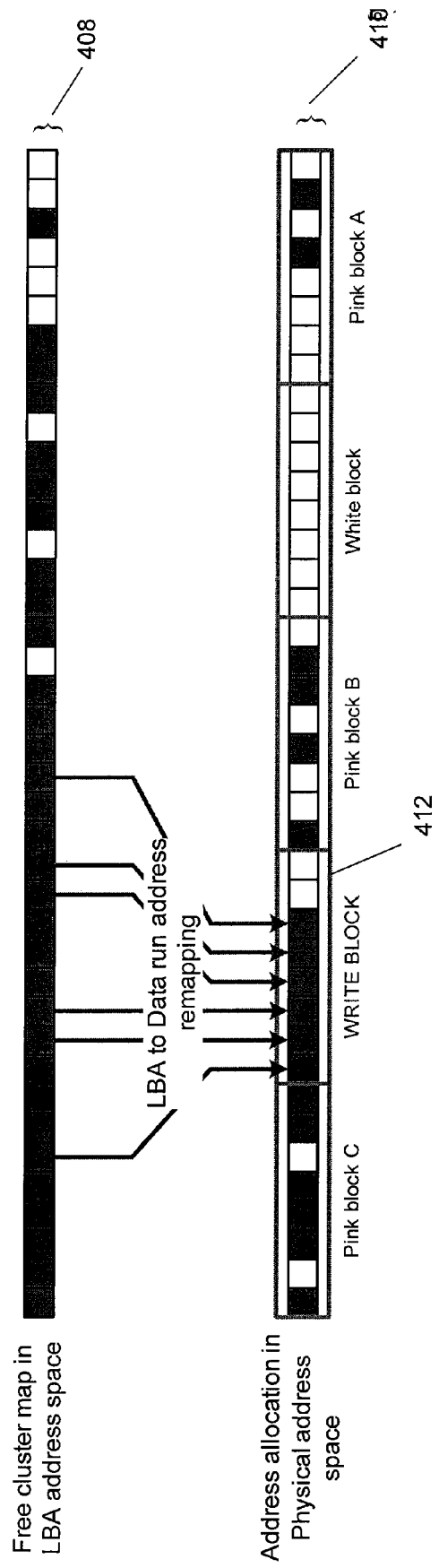
FIG. 29 illustrates an example of LBA to physical address mapping for data received from a host.

Differences between the logical to physical mapping arrangement of FIG. 8 and the logical to logical mapping arrangements of FIGS. 9-10, may be noted with reference to FIGS. 29-32. FIG. 29 shows how the logical to physical storage address re-mapping algorithm allocates one of the available white blocks in the physical memory to be the write block 412, and how each LBA address in LBA address space 408 is mapped to a sequential location in physical address space 410 available in the write block 412. The write block 412 in physical address space 410 is written to in the order the LBA addresses are received, regardless of the LBA address position. In this example, as in the parallel logical to logical mapping example of FIG. 15, it is assumed that the time order in which the host used free LBA clusters is the same as the address order for ease of illustration, however the storage address re-mapping algorithm would assign physical addresses in the write block 412 in the time order LBA addresses are used, regardless of the LBA address number order. Data is written in a write block in one or more data runs. A data run is a set of contiguous physical addresses that are mapped to contiguous LBA addresses in the same LBA run. A data run terminates at a block boundary in physical address space 410. When a write block 412 becomes filled, a new white block is allocated as the next write block 412. Thus, rather than assign an intermediate logical address, the logical to physical arrangement reorders incoming data as it is written directly to physical memory.

Figure 30:
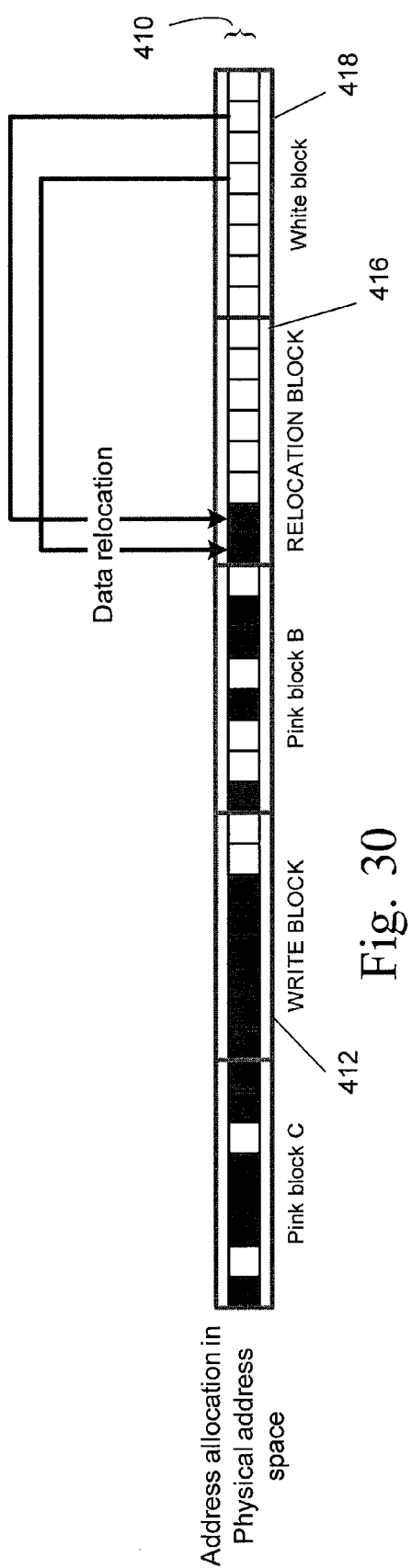
FIG. 30 illustrates a flush operation in physical address space based on the data distribution illustrated in FIG. 29.

Similar to the logical to logical mapping arrangements of FIGS. 9-10, the storage address re-mapping algorithm for the logical to physical arrangement of FIG. 8 operates to ensure that a sufficient supply of white blocks is available for the sequential write algorithm to operate. The storage address re-mapping algorithm manages the creation of white blocks by flushing data from pink blocks to a relocation block 416 (FIG. 30). The pink block currently selected for flushing is referred to as the flush block.

Figure 31:
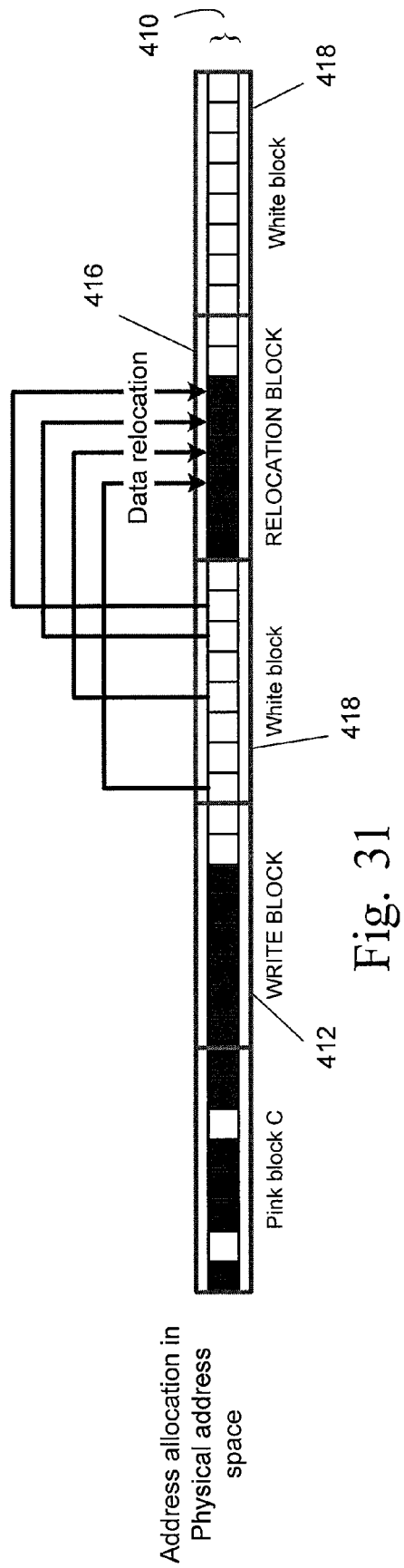
FIG. 31 illustrates a second flush operation following the flush operation of FIG. 30.

As shown in FIGS. 29-30, an illustration of a block flush process is shown. The storage address re-mapping algorithm designates a white block as the relocation block 416, to which data is to be flushed from selected pink blocks to create additional white blocks. Data is relocated from locations containing valid data, also referred to as red data, in the flush block (pink block A of FIG. 29) to sequential addresses in the relocation block 416, to convert the flush block to a white block 418. A next flush block (pink block B of FIG. 30) is identified from the remaining pink blocks as illustrated in FIG. 31. The pink block with the least valid data (the fewest red data), or a pink block selected from a list of pink blocks currently having less than an average amount of valid data or less than some pre-determined threshold amount, is again designated as the flush block and the red data (valid data) of the pink block are transferred to sequential physical locations in the open relocation block 416 in the order the valid data occurs in the pink block. The flush operations on pink blocks are performed as background operations to create white blocks 418 at a rate sufficient to compensate for the consumption of white blocks 418 that are designated as write blocks. The example of FIGS. 29-31 illustrate how a write block and a relocation block may be separately maintained, for new data from the host and for relocated data from pink blocks. In other implementations, the new data and the relocated data may be transferred to a single write block without the need for separate write and relocation blocks.

SAT for Logical to Physical Re-Mapping

Figure 32:
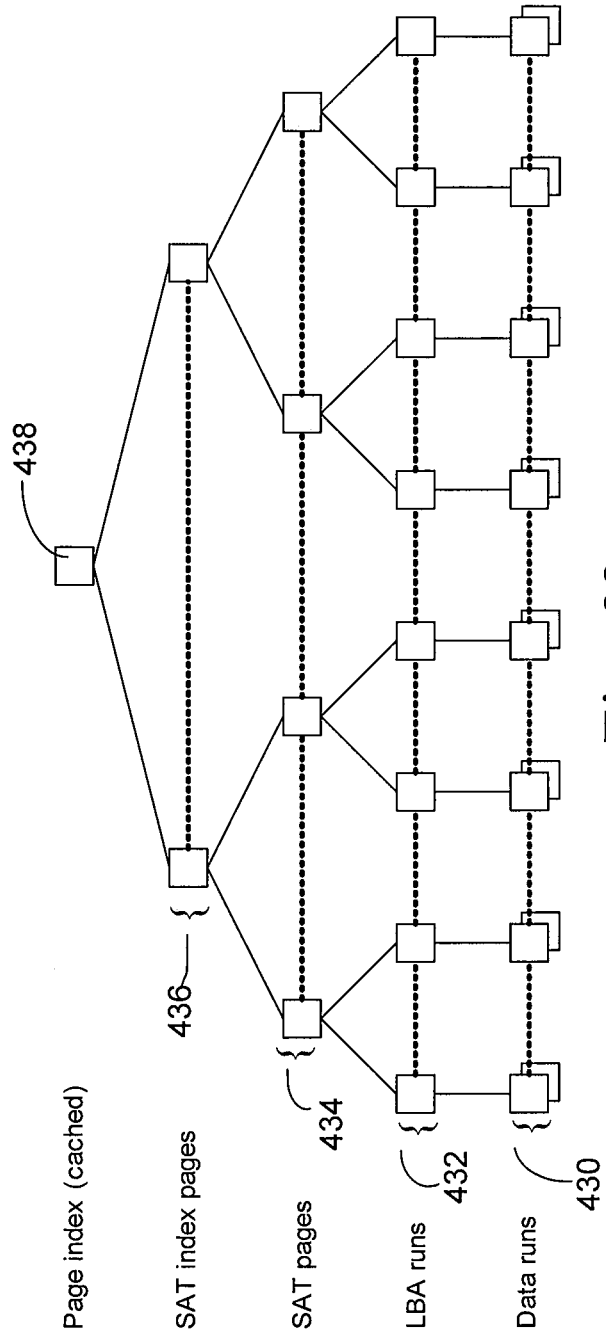
FIG. 32 illustrates a storage address table (SAT) hierarchy in an arrangement where runs of host logical addresses are mapped to physical addresses of data runs.

A SAT is also used for the logical to physical arrangement of FIG. 8. The SAT has the same basic structure here as in the logical to logical storage address re-mapping arrangements, with the DLBA (also referred to as storage LBA) address information replaced by physical addresses of data runs. A hierarchy of the SAT indexing and mapping structures for the logical to physical arrangement is illustrated in FIG. 32. The LBA 432 and corresponding data runs 430 are shown. LBA to physical mapping information is contained in the SAT pages 434. LBA to SAT page indexing information is contained in the SAT index pages 436 and a master page index 438 is cached in RAM associated with the in RAM associated with the controller 8. The SAT may comprise multiple SAT blocks or may only be written to a single block currently designated the SAT write block. All other SAT blocks have been written in full, and may contain a combination of valid and obsolete pages. A SAT block flush scheme, similar to that for blocks of host data, is implemented to eliminate pages of obsolete SAT information and create white blocks for reuse.

As with the logical-to-logical SAT mapping described above, the SAT in the logical-to-physical arrangement of FIG. is a variable size table that is automatically scalable up to the maximum number because the number of entries in the SAT will adjust itself according to the fragmentation of the LBAs assigned by the host. Thus, if the host assigns highly fragmented LBAs, the SAT will include more entries than if the host assigns less fragmented groups of LBAs to data. Accordingly, if the host LBAs become less fragmented, the size of the SAT will decrease. Less fragmentation results in fewer separate runs to map and fewer separate runs leads to fewer entries in the SAT because the SAT maps a run of host LBA addresses to one or more data runs (physical address runs) in an entry rather than rigidly tracking and updating a fixed number logical addresses. A run of host LBA addresses may be mapped to two or more data runs, where the host LBA run is a set of contiguous logical addresses that is allocated to valid data and the data (or physical address) run is a contiguous set of physical addresses within the same metablock and mapped to the same host LBA run.

SAT Block

Figure 33:
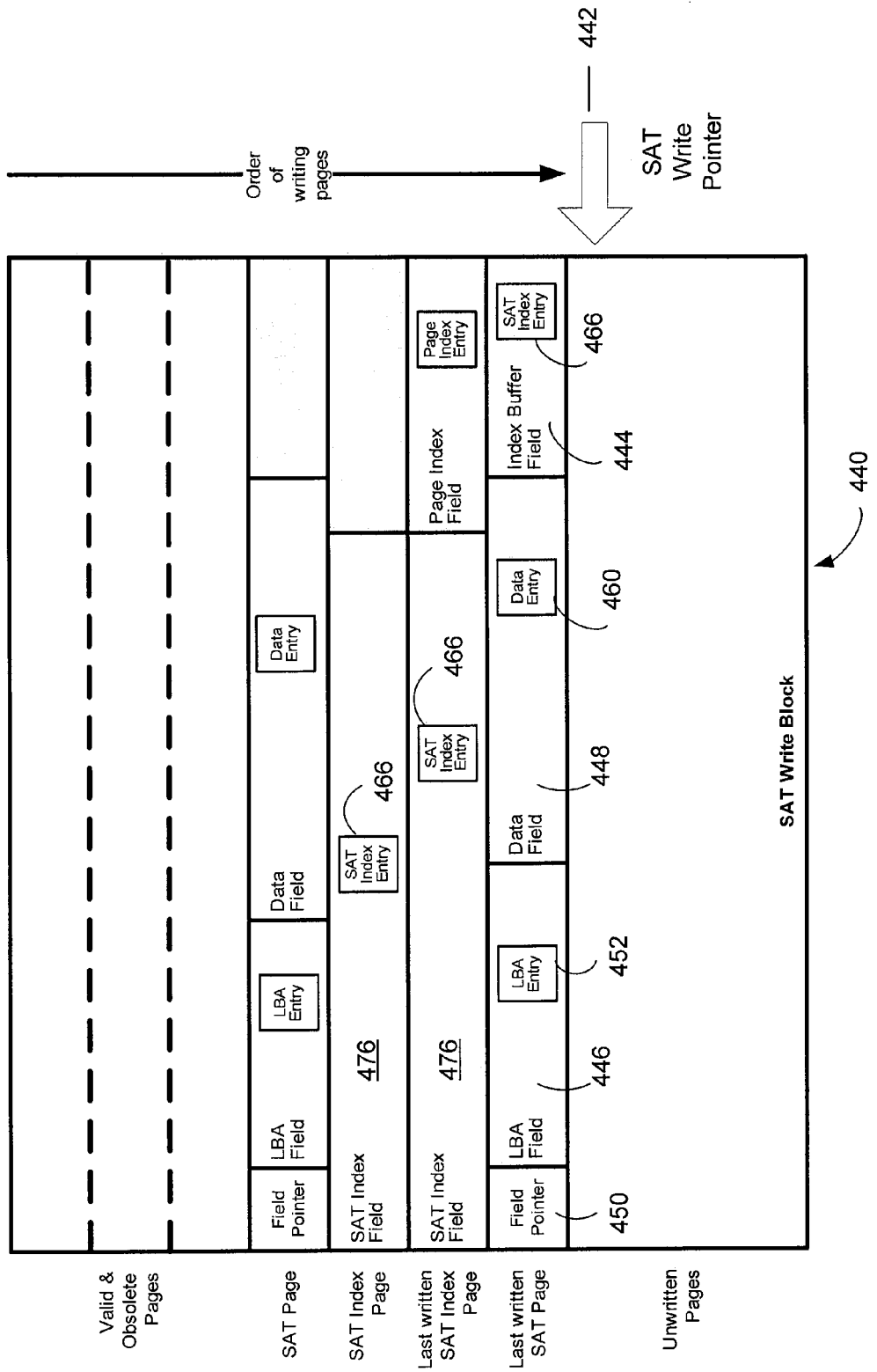
FIG. 33 illustrates a storage address table (SAT) write block used in tracking logical to physical mapping.

Each SAT block is a block of physical addresses that is dedicated to storage of SAT information. A SAT block is divided into table pages, into which a SAT page 434 or SAT index page 436 may be written. A SAT block may contain any combination of valid SAT pages 434, valid SAT index pages 436 and obsolete pages. Referring to FIG. 33, the SAT write block 440 is shown. Data is written in the SAT write block 440 at sequential locations defined by an incremental SAT write pointer 442. Data may only be written to the single SAT block that is designated as the SAT write block 440. Data is written in the SAT write block 440 as sequential locations defined by an incremental SAT write pointer 442. In the same fashion as for host data write blocks described previously (e.g. item 212 in FIGS. 15-17), when the SAT write block 440 has been fully written, a white block is allocated as the new SAT write block 440. A SAT page location is addressed by its sequential number within its SAT block. SAT blocks may be intermingled among blocks of non-SAT information or may be further segregated in a special type of block, such as binary flash blocks, while non-SAT information is stored in MLC flash blocks. In other embodiments, the SAT information may be mingled with non-SAT information in the same block.

SAT Page

A SAT page 434 is the minimum updatable unit of mapping information in the SAT. An updated SAT page 434 is written at the location defined by the SAT write pointer 442. A SAT page 434 contains mapping information for a set of LBA runs with incrementing LBA addresses, although the addresses of successive LBA runs need not be contiguous. The range of LBA addresses in a SAT page 434 does not overlap the range of LBA addresses in any other SAT page 434. SAT pages 434 may be distributed throughout the complete set of SAT blocks without restriction. The SAT page 434 for any range of LBA addresses may be in any SAT block. A SAT page 434 may include an index buffer field 444, LBA field 446, a data run field 448 and a control pointer 450. Parameter backup entries also contain values of some parameters stored in volatile RAM.

The LBA field 446 within a SAT page 434 contains entries for runs of contiguous LBA addresses that are allocated for data storage, within a range of LBA addresses. The range of LBA addresses spanned by a SAT page 434 does not overlap the range of LBA entries spanned by any other SAT page 434. The LBA field is of variable length and contains a variable number of LBA entries. Within an LBA field 446, an LBA entry 452 exists for every LBA run within the range of LBA addresses indexed by the SAT page 434. An LBA run is mapped to one or more data runs.

Figure 34:
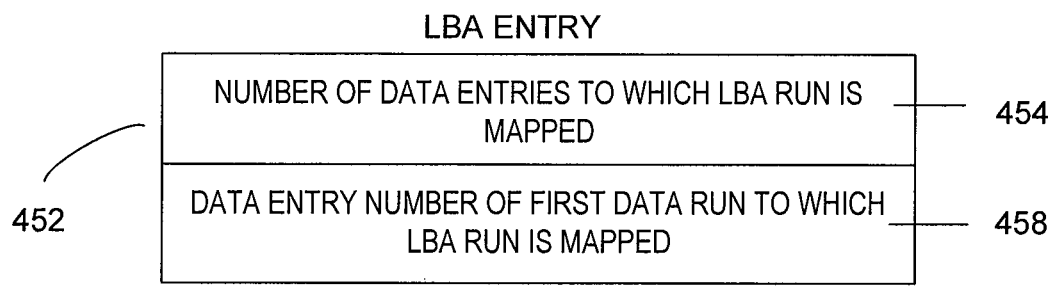
FIG. 34 is an LBA entry for use in a SAT page of the SAT table of FIG. 33.
Figure 35:
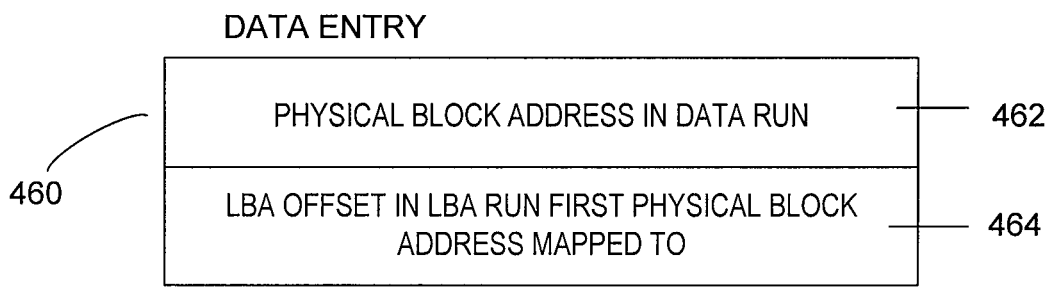
FIG. 35 is a Data entry for use in a SAT page of the SAT table of FIG. 33.
Figure 36:
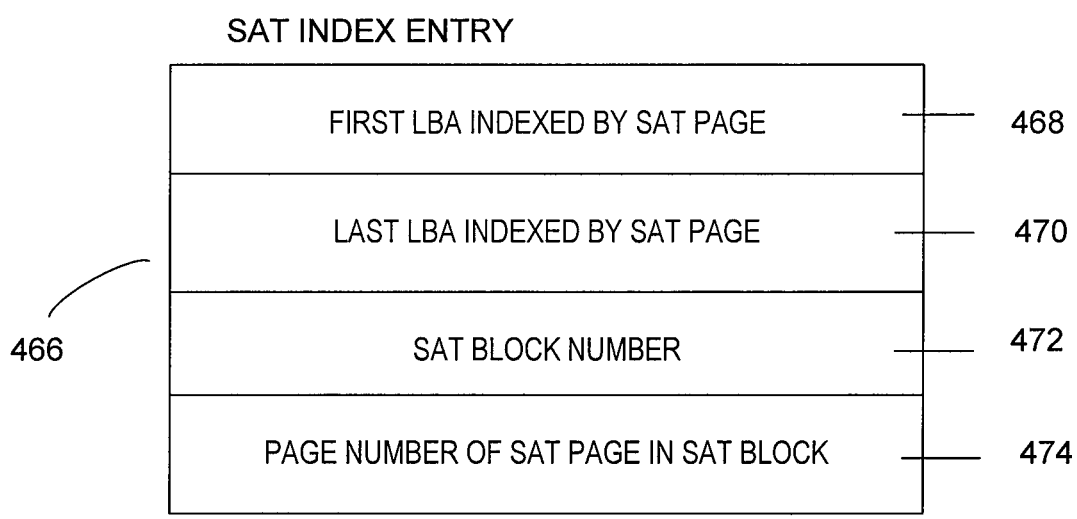
FIG. 36 is a SAT index entry for use in a SAT page of the SAT table of FIG. 33.

As shown in FIGS. 34-36, the entries for the SAT in the logical to physical arrangement vary in several aspects from the logical to logical address re-mapping arrangement. Referring to FIG. 34, an LBA entry 452 contains the following information: the number of data entries to which it is mapped 454, and the data entry number 458, within the data field 448 in the same SAT page 434, of the first data run to which LBA run is mapped.

The data field 448 within a SAT page 434 contains entries for all runs of data addresses that are mapped to LBA runs within the LBA field 446 in the same SAT page 434. The data field 448 is of variable length and contains a variable number of data entries 460. Within a data field 448, a data entry 460 exists for every data run that is mapped to an LBA run within the LBA field 246 in the same SAT page 434. Each data entry 460, as shown in FIG. 35, contains the following information: the first data address in the run 462; and LBA offset in the LBA run to which the first data address is mapped 464. The SAT page/index buffer field that is written as part of every SAT page 434, but remains valid only in the most recently written SAT page 434, contains SAT index entries 466.

A SAT index entry 466 exists for every SAT page 434 in the SAT which does not currently have a valid entry in the relevant SAT index page 436. Referring to FIG. 36, a SAT index entry is created or updated whenever a SAT page 434 is written, and is deleted when the relevant SAT index page 436 is updated. It contains the first LBA indexed 468 by the SAT page 434, the last LBA indexed 470 by the SAT page 434, SAT block number 472 containing the SAT page 434, and a page number 474 of the SAT page 434 within the SAT block. The SAT index field 476 has capacity for a fixed number of SAT index entries 466. This number determines the relative frequencies at which SAT pages 434 and SAT index pages 436 may be written. In one implementation, this fixed number may be 32.

The SAT page field pointer 450 defines the offset from the start of the LBA field to the start of the data field. It contains the offset value as a number of LBA entries. Parameter backup entries in an SAT page 434 contain values of parameters stored in volatile RAM. These parameter values are used during initialization of information in RAM (associated with the controller 8 for the implementations of FIGS. 8-9 after a power cycle. They are valid only in the most recently written SAT page 434.

Figure 37:
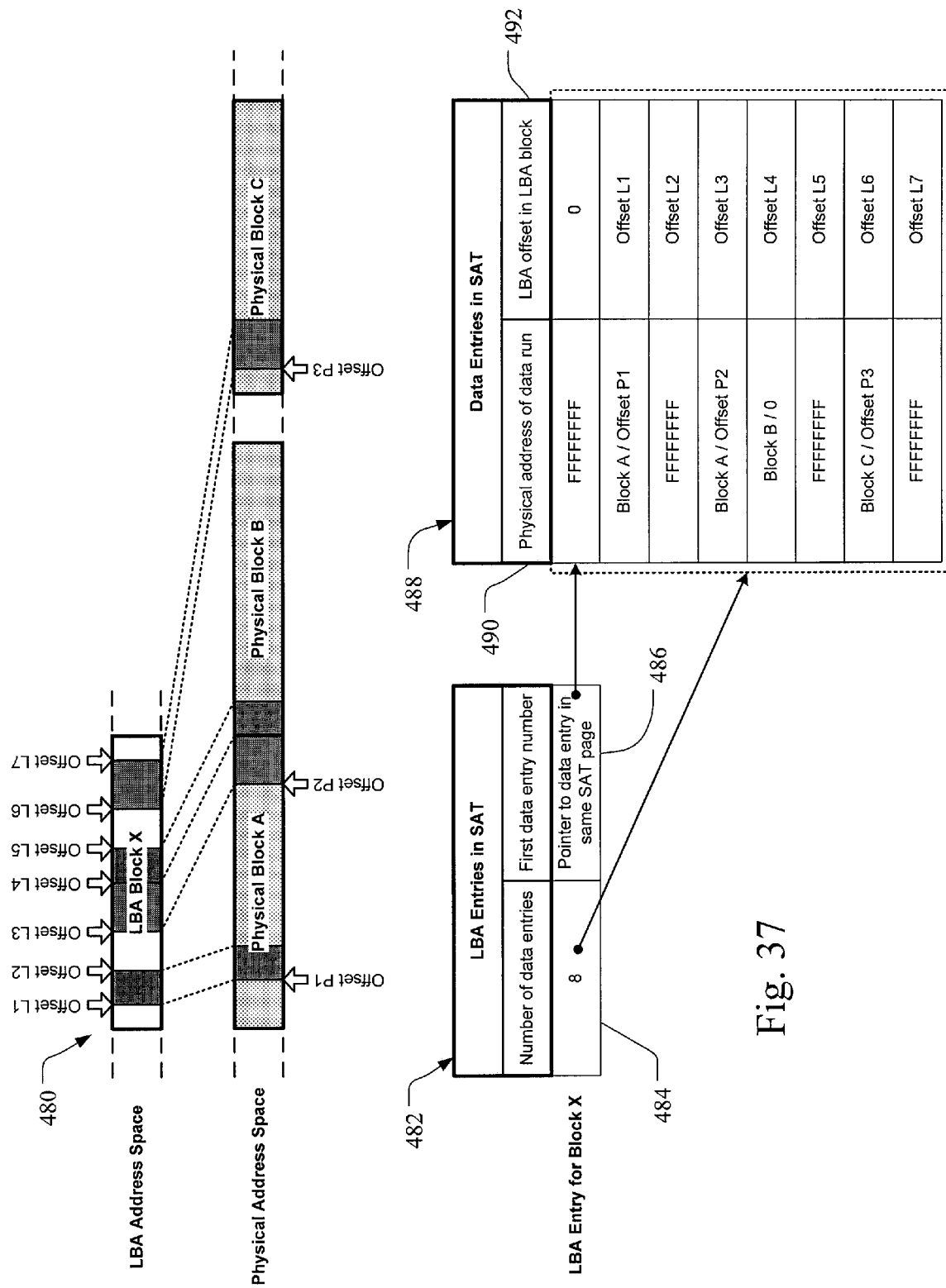
FIG. 37 illustrates an alternative embodiment of the SAT of FIGS. 32-36 where complete blocks of logical addresses are mapped to data runs.

In another embodiment, instead of generating a separate LBA entry in the SAT for each run of LBA addresses associated with valid data, LBA address blocks may be mapped in the SAT such that each LBA address block is a single entry on the SAT. As illustrated in FIG. 37, a complete LBA address block 480 in LBA address space may be recorded in the SAT. The LBA entry 482 in this implementation would be a single entry listing the number of data runs 484 in physical address space that the LBA address block 480 is mapped to and a pointer 486 to the first data run in the same SAT page. An LBA address block may be mapped to a minimum of one data run or up to a maximum of the number of clusters in the LBA address block, depending on the degree of fragmentation of the data stored in the memory device.

In the example of FIG. 37, the LBA address block 480 includes 8 LBA runs, where 4 runs are allocated to valid data (shaded portions beginning at LBA offsets L1, L3, L4 and L6) and 4 runs are unallocated address runs (white portions beginning at LBA offsets 0, L2, L5 and L7). The corresponding data entries 488 for the LBA address block 480 relate the physical address 490 of the data run, denoted by physical block and address offset (P1-P3) to the corresponding LBA offset 492. Unlike the version of the SAT discussed above that records a separate LBA entry for each LBA run, where only LBA runs associated with valid data are recorded, every LBA run in an LBA address block is recorded. Thus, LBA runs in the LBA address block 480 that are not currently allocated to valid data are recorded as well as LBA runs that are allocated to valid data. In the data entry portion 488 of the SAT page shown in FIG. 37, the LBA offsets marking the beginning of an unallocated set of LBA addresses are paired with an "FFFFFFFF" value in the physical address space. This represents a default hexadecimal number indicative of a reserve value for unallocated addresses. The same overall SAT structure and functionality described previously, as well as the basic SAT hierarchy discussed with reference to FIG. 32, applies to the LBA address block mapping implementation, however the SAT pages represent LBA address block to data run mapping information rather than individual LBA run to data run information. Also, the SAT index page stores LBA address block to SAT page mapping information in this implementation.

SAT Index Page

Referring again to FIGS. 34-36, a set of SAT index pages 436 provide an index to the location of every valid SAT page 434 in the SAT. An individual SAT index page 436 contains entries 466 defining the locations of valid SAT pages relating to a range of LBA addresses. The range of LBA addresses spanned by a SAT index page 436 does not overlap the range of LBA addresses spanned by any other SAT index page 436. The entries are ordered according to the LBA address range values of the SAT pages to which they relate. A SAT index page 436 contains a fixed number of entries. SAT index pages 436 may be distributed throughout the complete set of SAT blocks without restriction. The SAT index page 436 for any range of LBA addresses may be in any SAT block. A SAT index page 436 comprises a SAT index field and a page index field.

The SAT index field 476 contains SAT index entries for all valid SAT pages within the LBA address range spanned by the SAT index page 436. A SAT index entry 466 relates to a single SAT page 434, and contains the following information: the first LBA indexed by the SAT page 434, the SAT block number containing the SAT page 434 and the page number of the SAT page 434 within the SAT block. The page index field contains page index entries for all valid SAT index pages 436 in the SAT. A page index entry exists for every valid SAT index page 436 in the SAT, and contains the following information: the first LBA indexed by the SAT index page, the SAT block number containing the SAT index page and the page number of the SAT index page within the SAT block.

Temporary SAT Data Structures

The temporary SAT data structures described for logical to logical storage address re-mapping, as well as the table page and address translation, are the same for the logical to physical arrangement of FIG. 8, with the exception that physical addresses replace reference to logical addresses (DLBAs) in the prior discussion. For example, the SAT translation procedure of FIG. 24 and the SAT creation and update examples of FIG. 25 and Tables A-D also apply to the logical to physical arrangement of FIG. 8 when to the second logical address space (DLBAs) is replaced with physical addresses or address runs. Similarly, the logical to physical arrangement of FIG. 8 utilizes the same BIT structures but where the BIT references physical addresses rather than logical (DLBA) addresses.

Modified Allocation of Host Logical Block Addresses

The configuration of FIG. 11 integrates a portion of the features of FIGS. 8-10 directly within the host file system, however the storage address mapping arrangement of FIG. 11 does not translate from a first logical address space into a second logical address space. Instead, the initial host file system method of allocating host LBA addresses is modified to reduce fragmentation.

The address mapping in FIG. 11 creates a data mapping in physical memory that is similar to that created by the configurations of FIGS. 8-10. Unlike a typical host file system that is only aware of host LBA space in terms of clusters, the host file system 10 in this embodiment is aware of block sizes corresponding to the size of physical blocks in the memory system 2. Host LBA addresses are allocated for data storage from within selected blocks corresponding to physical memory blocks. All free cluster addresses existing within a selected block are allocated in sequential order. The mapping algorithm allows the amount of data consolidation that is required in update blocks in physical memory to be kept to a minimum. Allocation of free clusters for data storage is managed in blocks within LBA address space. The host file system ranks blocks according to the number of free clusters contained within them. The block with the highest number of free clusters is selected as the next allocation block.

Figure 38:
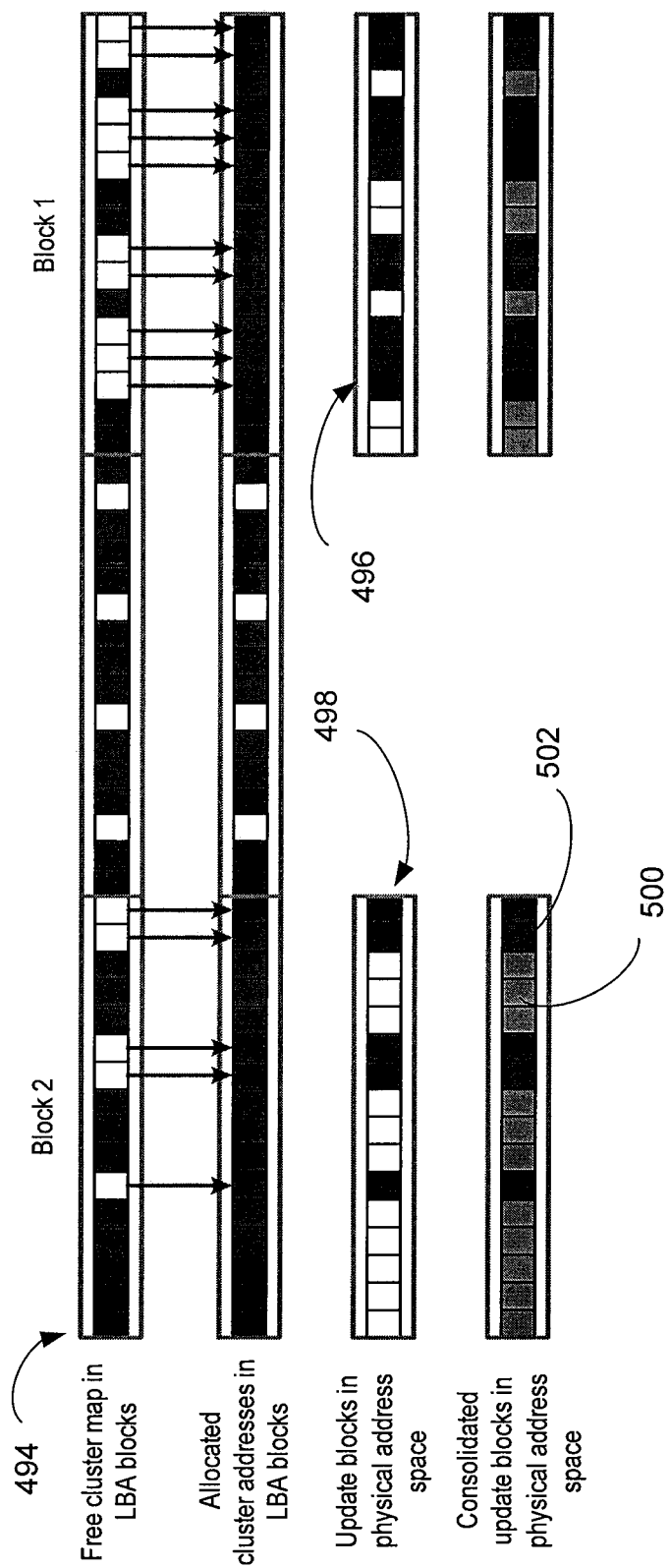
FIG. 38 illustrates an implementation of storage address re-mapping in a system utilizing the configuration of FIG. 11.

Referring to FIG. 38, an example of address mapping that may be implemented in the host file system configuration of FIG. 11 is shown. The address mapping implemented by the configuration of FIG. 11 takes place in the host file system on the host and is preferably executed by the CPU 9 of the host 1. As in the examples of the configurations of FIGS. 9 and 10, allocation of free clusters for data storage is managed in blocks that correspond in size to the physical memory blocks of the flash memory in the memory system. Unlike the examples of FIGS. 9-10, the address mapping implemented in the configuration of FIG. 11 manages allocation of free clusters within the host LBA address space and does not re-map the host LBA address space into a storage LBA address space. Instead, as set forth below, the address mapping algorithm executed by the host file system is optimized to utilize available addresses in the host LBA address space to fully assign available addresses in one block of host LBA addresses before assigning addresses to in a next block of host LBA addresses.

In the example of FIG. 38, blocks in the host LBA address space 494 are ranked according to the number of free clusters contained within them. Referring to FIG. 1, if the host file system 10 is an NTFS file system, the ranking of blocks may be based on the allocation map in the NTFS $bitmap file that the host file system 10 stores and updates on the memory system 2. Upon retrieving the allocation map from the NTFS $bitmap file, the host file system 10 will select the block with the highest number of free (obsolete) clusters as the next allocation block. In the example of FIG. 38, Block 1 is selected as the allocation block because it contains the highest number of obsolete (and thus free) clusters. The host LBA addresses of the obsolete clusters are allocated to data in sequential order from within Block 1, where each of the arrows in FIG. 38 illustrates an assignment of the available address to new data from the host 1. Only when all free clusters in Block 1 have been allocated, is Block 2 selected as the next allocation block. Addresses for free clusters in Block 2 are then assigned to new data in sequential order.

The sequential order of assigning addresses in the host LBA address space 494 may be from lowest available address value to highest available address value in a block, or may be a "wrap-around" sequence of available address values in a block. For example, assuming the address values for Block 1 in FIG. 38 are 1 through 16, the addresses in that block that are available are address values (left to right) 3-5, 7-8, 11-13 and 15-16. Assignment of addresses from lowest to highest would involve assigning each available address in sequence starting with address value 3. The wrap-around alternative would involve starting assignment of addresses at some point other than address value 3, assigning the addresses in increasing value from that first selected address value, and then continuing to assign available addresses in the host LBA block from the lowest available address until all addresses in the current host LBA block have been assigned. Thus, if address 12 in block 1 was first assigned in this example, addresses 13, 15-16, 3-5, 7-8 and 11 would be the order in which the remainder are assigned.

At the memory system 2, which may be any of a number of known memory systems using a standard LBA interface, data written to allocated cluster addresses is stored in a physical update block 496 corresponding to Block 1. The memory system 2 would also allocate a separate physical update block 498 corresponding to Block 2. Data 500 that is still valid in original blocks corresponding to the selected allocation blocks is consolidated with new host data 502 that has been written in update blocks. This consolidation may occur after new host data has been written in an update block or, more commonly, interleaved with new host data that is being written, as pages in a physical block of flash memory are typically programmed in sequential order. The process of consolidation of data for a host LBA block into a single flash block may be managed by controller 8 in the memory system 2. Because the host file system selects blocks with the highest number of free clusters as the allocation block, the amount of consolidated data is controlled to be a minimum. However, unlike the flush process discussed with respect to the embodiments of FIGS. 8-10, where the valid data flushed from one block is sequentially written to a relocation block which may have data associated with different address ranges from other blocks, the allocation process of FIG. 11 results in a garbage collection process where blocks of addresses are maintained by merging remaining valid data for a block with updated data for the same address range.

When the address mapping allocation algorithm is implemented in a host file system 185 such as shown in FIGS. 11 and 38, the amount of data consolidated in a block of physical memory may be the same as the amount of data that would be relocated from an equivalent block by the storage address re-mapping described in the embodiments of FIGS. 8-10. As no re-mapping of host LBA addresses allocated by the file system occurs in the embodiment of FIG. 11, no SAT is required in this implementation. Also, as is normal practice for a host file system, addresses allocated for storage of file data are recorded in data structures for the purpose, such as $MFT files for the NTFS file system or File Allocation Table (FAT) structures for the FAT file system.

Advantages of the address mapping and re-mapping systems and methods discussed herein may include reduction or elimination of memory manager level garbage collection and reduced stress on the flash memory. When a memory management algorithm is used that does not use intermediate DLBA addresses, and maps a block of contiguous LBA addresses to a single physical block as shown in FIG. 8, garbage collection operations are required when data is written to a run of LBA addresses that is smaller than the physical block size. During such garbage collection, all data with addresses in the LBA block is consolidated into the same physical block. For example, when the average size of a file being written is 40 KB and the physical block size is 4 MB, the ratio of sectors programmed per sector of data written by the host will be 100, if the file system allocation algorithm and the fragmentation of free cluster space result in each file being written as an isolated fragment in a separate block.

With conventional logical-to-physical block mapping, a body of data has to be relocated during a garbage collection operation whenever a fragment of host data is written in isolation to a block of logical addresses. With the storage address re-mapping algorithm, data is always written to sequential addresses until a block (logical or physical) is filled and therefore no garbage collection is necessary. The flush operation in the storage address re-mapping disclosed herein is not triggered by a write process but only in response to data being made obsolete. Thus, the data relocation overhead should be lower in a system having the storage address re-mapping functionality described herein. In other embodiments, the memory system may be configured to maintain certain ranges of LBA addresses separately such that, within each range of host LBA addresses, the storage address re-mapping techniques described above may be applied. Thus, each assigned range of LBA addresses would have its own write block and relocation block and a new white block would be allocated to a particular assigned range of host LBA addresses as a write block or relocation block when the prior write block or relocation block for that particular assigned range of host LBA addresses is completely written.

Systems and methods for storage address re-mapping have been described that can increase performance of memory systems in random write applications, which are characterised by the need to write short bursts of data to unrelated areas in the LBA address space of a device, that may be experienced in solid state disk applications in personal computers. In certain embodiments of the storage address re-mapping disclosed, host data is mapped from a first logical address assigned by the host to blocks of contiguous logical addresses in a second logical address space. As data associated with fully programmed blocks of addresses is made obsolete, a flushing procedure is disclosed that selects a pink block from a group of pink blocks having the least amount of valid data, or having less than a threshold amount of valid data, and relocates the valid data in those blocks so to free up those blocks for use in writing more data. The relocated data is contiguously written to a relocation block in the order it occurred in the block needing flushing regardless of the logical address assigned by the host. In this manner, overhead may be reduced by not purposely consolidating logical address runs assigned by the host. A storage address table is used to track the mapping between the logical address assigned by the host and the second logical address and subsequent changes in the mapping due to flushing. In an embodiment where the logical address assigned by the host is directly mapped into physical addresses, the storage address table tracks that relation and a block information table is maintained to track, for example, whether a particular block is a pink block having both valid and obsolete data or a white block having only unwritten capacity.

The SAT maps every run of addresses in logical address space that are allocated to valid data by the host file system to one or more runs of addresses in the device address space (a physical address space for the arrangement of FIG. 8; logical storage address space for the arrangements of FIGS. 9-10). Variable length units of contiguous address space (LBA runs) used by the host are mapped to one or more variable length units of contiguous device address space. The use of a run-to-run address mapping scheme may provide benefits relative to a mapping scheme based on fixed size units. The number of mapping entries required in the SAT is inversely proportional the average number of clusters in runs of data written by the host. This minimises the number of SAT data structures, and minimises the average time to update these data structures as the host writes and deletes file data.

It is therefore intended that the foregoing detailed description be regarded as illustrative rather than limiting, and that it be understood that it is the following claims, including all equivalents, that are intended to define the spirit and scope of this invention.

The invention claimed is:

1. A method of transferring data between a host system and a re-programmable non-volatile mass storage memory system, the method comprising:
   in the mass storage memory system, the mass storage memory system having re-programmable non-volatile memory cells arranged in a plurality of blocks of memory cells that are erasable together and a controller in communication with the plurality of blocks of memory cells, the controller, for any data that is associated with host logical block address (LBA) addresses and that is received at the mass storage memory system from the host system:
      allocating a block of contiguous storage LBA addresses for addressing the data associated with the host LBA addresses, the block of contiguous storage LBA addresses addressing only unwritten capacity upon allocation; and
      re-mapping each of the host LBA addresses for the received data to the block of contiguous storage LBA addresses, wherein each storage LBA address is sequentially assigned in a contiguous manner to the received data in an order the received data is received regardless of the host LBA address.

2. The method of claim 1, further comprising allocating a second block of contiguous storage LBA addresses for re-mapping additional received data in a contiguous manner, the second block of contiguous storage LBA addresses associated with only unwritten capacity upon allocation, wherein the allocation of the second block is made only upon completely assigning the block of contiguous storage LBA addresses.

3. The method of claim 1, wherein allocating a block of contiguous storage LBA addresses comprises allocating a block of contiguous storage LBA addresses for each of a plurality of ranges of host LBA addresses, wherein each block of contiguous storage LBA addresses is associated with only unwritten capacity upon allocation.

4. The method of claim 3, wherein re-mapping comprises re-mapping each of the host LBA addresses for the received data in a respective one of the plurality of ranges of host LBA addresses to a respective allocated block of storage LBA addresses, wherein each storage LBA address in an allocated block of contiguous storage LBA addresses is sequentially assigned in a contiguous manner to received data falling within a respective one of the plurality of ranges in an order that the data is received regardless of the host LBA address within the respective one of the plurality of ranges.

5. The method of claim 4, further comprising, for each of the plurality of ranges, allocating a second block of contiguous storage LBA addresses for re-mapping additional received data in a contiguous manner, the second block of contiguous storage LBA addresses associated with only unwritten capacity upon allocation, wherein allocation of the second block of contiguous storage LBA addresses is made for a particular range of host LBA addresses only upon completely assigning the block of contiguous storage LBA addresses currently associated with the particular range of host LBA addresses.

6. The method of claim 1, further comprising writing the data associated with the block of contiguous storage LBA addresses to contiguous physical address locations in a physical block of addresses currently associated with the block of contiguous storage LBA addresses.

7. The method of claim 1, wherein the mass storage memory system receives the data associated with the host LBA addresses, re-maps the host LBA addresses and writes the data associated with the storage LBA addresses without ever initiating a garbage collection operation.

8. The method of claim 1, wherein the re-mapping step further comprises generating correlation data correlating host LBA address and storage LBA address locations and assigning respective contiguous storage LBA addresses to the correlation data in a second block of contiguous storage LBA addresses.

9. The method of claim 8, wherein the block of contiguous storage LBA addresses is exclusively associated with data from the host system and the second block of contiguous storage LBA addresses is exclusively associated with correlation data.

10. The method of claim 1, further comprising:
    identifying obsolete data associated with the block of contiguous storage LBA addresses, wherein the obsolete data represents host deallocated data;
    selecting a relocation block of contiguous storage LBA addresses with which to contiguously re-map valid data from the block of contiguous storage LBA addresses; and
    reassigning valid data associated with the block of contiguous storage LBA addresses to contiguous storage LBA addresses in the relocation block.

11. The method of claim 10, further comprising:
    identifying obsolete data associated with an additional block of contiguous storage LBA addresses;

reassigning storage LBA addresses for valid data from the additional block of contiguous storage LBA addresses to contiguous storage LBA addresses in the relocation block, wherein when the relocation block is full, a new relocation block having only unwritten capacity is selected and remaining valid data from the additional block is reassigned to contiguous storage LBA addresses in the new relocation block.

12. The method of claim 10, wherein the relocation block of contiguous storage LBA addresses is exclusively associated with re-mapped valid host data.

13. The method of claim 9, further comprising:
identifying obsolete correlation data associated with the second block of contiguous storage LBA addresses;
selecting a relocation block of contiguous storage LBA addresses with which to contiguously re-map valid correlation data from the second block of contiguous storage LBA addresses; and
reassigning valid correlation data from the second block of contiguous storage LBA addresses to contiguous storage LBA addresses in the relocation block.

14. The method of claim 13, further comprising:
identifying obsolete correlation data associated with an additional block of contiguous storage LBA addresses exclusively associated with correlation data; and
reassigning storage LBA addresses for valid correlation data from the additional block of contiguous storage LBA addresses to contiguous storage LBA addresses in the relocation block, wherein when the relocation block is full, a new relocation block having only unwritten capacity is selected and remaining valid correlation data associated with the additional block is reassigned to contiguous storage LBA addresses in the new relocation block.

15. The method of claim 1, further comprising tracking a status of a plurality of blocks of contiguous storage LBA addresses having a white or pink status, wherein white status identifies any blocks associated with only unwritten capacity and pink status identifies any blocks associated with both valid and obsolete data.

16. The method of claim 15, wherein tracking the status comprises maintaining a block information table comprising an initial block of contiguous storage LBA addresses for exclusively addressing block information table data relating to the status of each of the plurality of blocks of contiguous storage LBA addresses.

17. The method of claim 16, wherein maintaining the block information table comprises allocating an additional block of contiguous storage LBA addresses for use in addressing block information table data in a contiguous manner, the additional block of contiguous storage LBA addresses addressing only unwritten capacity upon allocation, wherein the allocation of the additional block is made only upon completely assigning the initial block of contiguous storage LBA addresses.

18. A mass storage memory system, comprising:
re-programmable non-volatile memory cells, the memory cells being arranged in a plurality of blocks of memory cells that are erasable together;
a controller in communication with the plurality of blocks of memory cells, the controller configured to, for any data associated with host logical block address (LBA) addresses and that is received at the mass storage memory system from a host system:
allocate a block of contiguous storage LBA addresses for receiving the data from the host system; and
re-map each of the host LBA addresses for the received data to the block of contiguous storage LBA addresses, wherein the controller is arranged to sequentially assign each contiguous storage LBA address to the received data in an order the received data is received regardless of a host LBA address associated with the received data.

19. The system of claim 18, wherein the controller is further configured to:
allocate a second block of contiguous storage LBA addresses for re-mapping additional received data in a contiguous manner, the second block of contiguous storage LBA addresses corresponding only to unwritten capacity upon allocation; and
wherein the controller is configured to allocate data to the second block only upon completely assigning the block of contiguous storage LBA addresses.

20. The system of claim 18, wherein the controller is further configured to allocate a block of contiguous storage LBA addresses for each of a plurality of ranges of host LBA addresses, wherein each block of contiguous storage LBA addresses corresponds to only unwritten capacity upon allocation.

21. The system of claim 20, wherein the controller is further configured to re-map each of the host LBA addresses for the received data in a respective one of the plurality of ranges of host LBA addresses to a respective allocated block of storage LBA addresses, wherein the controller sequentially assigns storage LBA address in an allocated block of contiguous storage LBA addresses in a contiguous manner to received data falling within a respective one of the plurality of ranges in an order that the data is received regardless of the host LBA address within the respective one of the plurality of ranges.

22. The system of claim 21, wherein the controller is configured, for each of the plurality of ranges, to allocate a second block of contiguous storage LBA addresses for re-mapping additional received data in a contiguous manner, the second block of contiguous storage LBA addresses addressing only unwritten capacity, wherein allocation of the second block of contiguous storage LBA addresses is made for a particular range of host LBA addresses only upon completely assigning the block of contiguous storage LBA addresses currently associated with the particular range of host LBA addresses.

23. The system of claim 18, wherein the controller is further configured to write the data associated with the block of contiguous storage LBA addresses to contiguous physical address locations in a physical block of addresses currently associated with the block of contiguous storage LBA addresses.

24. The system of claim 18, wherein the controller is further configured to generate correlation data correlating host LBA address and storage LBA address locations and to assign respective contiguous storage LBA addresses to the correlation data in a second block of contiguous storage LBA addresses.

25. The system of claim 24, wherein the block of contiguous storage LBA addresses comprises exclusively data associated with the host LBA addresses and the second block of contiguous storage LBA addresses comprises exclusively correlation data.

26. The system of claim 18, wherein the controller is further configured to:
identify obsolete data associated with the block of contiguous storage LBA addresses, wherein obsolete data represents host deallocated data;

select a relocation block of contiguous storage LBA addresses with which to contiguously re-map valid data from the block of contiguous storage LBA addresses; and reassign storage LBA addresses for valid data from the block of contiguous storage LBA addresses to contiguous storage LBA addresses in the relocation block.

27. The system of claim 26, wherein the controller is further configured to:
   identify obsolete data associated with an additional block of contiguous storage LBA addresses having host deallocated data;
   reassign storage LBA addresses for valid data from the additional block of contiguous storage LBA addresses to contiguous storage LBA addresses in the relocation block; and
   when the relocation block is full, select a new relocation block having only unwritten capacity and reassign remaining valid data from the additional block to contiguous storage LBA addresses in the new relocation block.

28. The system of claim 26, wherein the relocation block of contiguous storage LBA addresses is exclusively associated with re-mapped valid host data.

29. The system of claim 25, wherein the controller is further configured to:
   identify obsolete data associated with the second block of contiguous storage LBA addresses;
   select a relocation block of contiguous storage LBA addresses with which to contiguously re-map valid data from the second block of contiguous storage LBA addresses; and
   reassign valid data from the second block of contiguous storage LBA addresses to contiguous storage LBA addresses in the relocation block.

30. The system of claim 27, wherein the controller is further configured to:
   identify obsolete data associated with an additional block of contiguous storage LBA addresses exclusively associated with correlation data; and
   reassign valid data associated with the additional block of contiguous storage LBA addresses to contiguous storage LBA addresses in the relocation block, wherein when the relocation block is full, the controller selects a new relocation block having no valid data and reassigns remaining valid data associated with the additional block to contiguous storage LBA addresses in the new relocation block.

31. The system of claim 18, wherein the controller is further configured to track a status of each of a plurality of blocks of contiguous storage LBA addresses having a white, or a pink status, wherein white status identifies any blocks having only unwritten capacity and pink status identifies any blocks having both obsolete and valid data.

32. The system of claim 31, wherein the controller is configured to maintain a block information table comprising an initial block of contiguous storage LBA addresses for exclusively addressing block information table data relating to the status of each of the plurality of blocks of contiguous storage LBA addresses.

33. The system of claim 32, wherein the controller is configured to allocate an additional block of contiguous storage LBA addresses for use in addressing block information table data in a contiguous manner, the additional block of contiguous storage LBA addresses addressing no valid data upon allocation, wherein the controller is configured to allocate the additional block only upon completely assigning the initial block of contiguous storage LBA addresses.

* * * * *